United States Patent
Ikuta et al.

(10) Patent No.: US 10,802,691 B2
(45) Date of Patent: Oct. 13, 2020

(54) CONTENT RETRIEVAL DEVICE, OPERATING METHOD THEREOF, AND CONTENT RETRIEVAL SYSTEM FOR ENLARGING CONTENT

(71) Applicant: FUJIFILM Corporation, Tokyo (JP)

(72) Inventors: Mayuko Ikuta, Tokyo (JP); Toshita Hara, Tokyo (JP); Rena Kamoda, Tokyo (JP); Yuki Okabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/256,006

(22) Filed: Jan. 24, 2019

(65) Prior Publication Data

US 2019/0163354 A1 May 30, 2019

Related U.S. Application Data

(63) Continuation of application No. PCT/JP2017/026740, filed on Jul. 24, 2017.

(30) Foreign Application Priority Data

Jul. 26, 2016 (JP) .................. 2016-146238

(51) Int. Cl.
*G06F 3/0484* (2013.01)
*G06F 3/0482* (2013.01)
(Continued)

(52) U.S. Cl.
CPC ........ *G06F 3/04845* (2013.01); *G06F 3/0482* (2013.01); *G06F 3/0484* (2013.01);
(Continued)

(58) Field of Classification Search
CPC .... G06F 16/248; G06F 3/04845; G06F 16/26; G06F 16/904; G06F 3/0482; G06F 3/0484; G06Q 30/0643
See application file for complete search history.

(56) References Cited

U.S. PATENT DOCUMENTS 8,489,641 B1 * 7/2013 Seefeld .................. G06F 16/29
707/792
9,489,400 B1 * 11/2016 Haitani ................. G06F 16/583
(Continued)

FOREIGN PATENT DOCUMENTS

GB 2458646 A 9/2009
JP 2004-178384 A 6/2004
(Continued)

OTHER PUBLICATIONS

The extended European search report issued by the European Patent Office dated Jul. 11, 2019, which corresponds to European Patent Application No. 17834264.8 and is related to U.S. Appl. No. 16/256,006.
(Continued)

*Primary Examiner* — Beau D Spratt
(74) *Attorney, Agent, or Firm* — Studebaker & Brackett PC

(57) ABSTRACT

A first-middle screen obtained by deleting images of clothes outside a selection area and a second-middle screen on which an interval between images of clothes in the selection area is enlarge-displayed in a state where a relative positional relationship therebetween is secured on a first map are inserted between a screen before enlargement and a screen after enlargement on which the images of the clothes in the selection area and the images of the clothes in the selection area that are in a non-display state on the screen before enlargement are displayed.

19 Claims, 45 Drawing Sheets

(51) Int. Cl.
  *G06F 16/26* (2019.01)
  *G06F 16/904* (2019.01)
  *G06F 16/248* (2019.01)
  *G06Q 30/06* (2012.01)

(52) U.S. Cl.
  CPC ............ *G06F 16/248* (2019.01); *G06F 16/26* (2019.01); *G06F 16/904* (2019.01); *G06Q 30/0643* (2013.01)

(56) References Cited

U.S. PATENT DOCUMENTS

| | | | |
|---|---|---|---|
| 2008/0243803 A1 | 10/2008 | Kobayashi et al. | |
| 2009/0110300 A1 | 4/2009 | Kihara et al. | |
| 2012/0089920 A1* | 4/2012 | Eick | G06T 11/206 715/739 |
| 2012/0299965 A1* | 11/2012 | Agarwal | G06F 16/26 345/660 |
| 2012/0324357 A1* | 12/2012 | Viegers | G06F 3/0481 715/730 |
| 2013/0031506 A1* | 1/2013 | Diaz | G06F 16/9537 715/781 |
| 2014/0164913 A1 | 6/2014 | Jaros et al. | |
| 2014/0344115 A1 | 11/2014 | Yatsuda et al. | |
| 2015/0046449 A1* | 2/2015 | Langseth | G06F 3/04817 707/736 |

FOREIGN PATENT DOCUMENTS

| | | |
|---|---|---|
| JP | 2007-179400 A | 7/2007 |
| JP | 2008-250857 A | 10/2008 |
| JP | 2009-110360 A | 5/2009 |

OTHER PUBLICATIONS

International Search Report issued in PCT/JP2017/026740; dated Sep. 12, 2017.
Written Opinion issued in PCT/JP2017/026740; dated Sep. 12, 2017.

* cited by examiner

FIG. 15
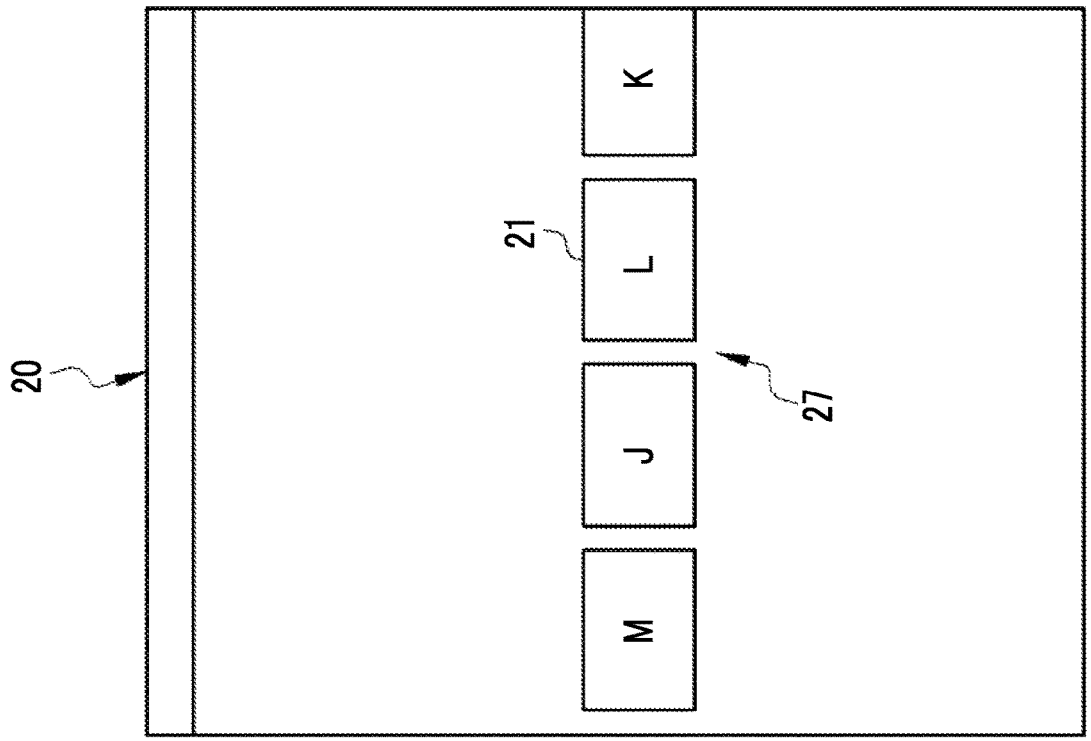
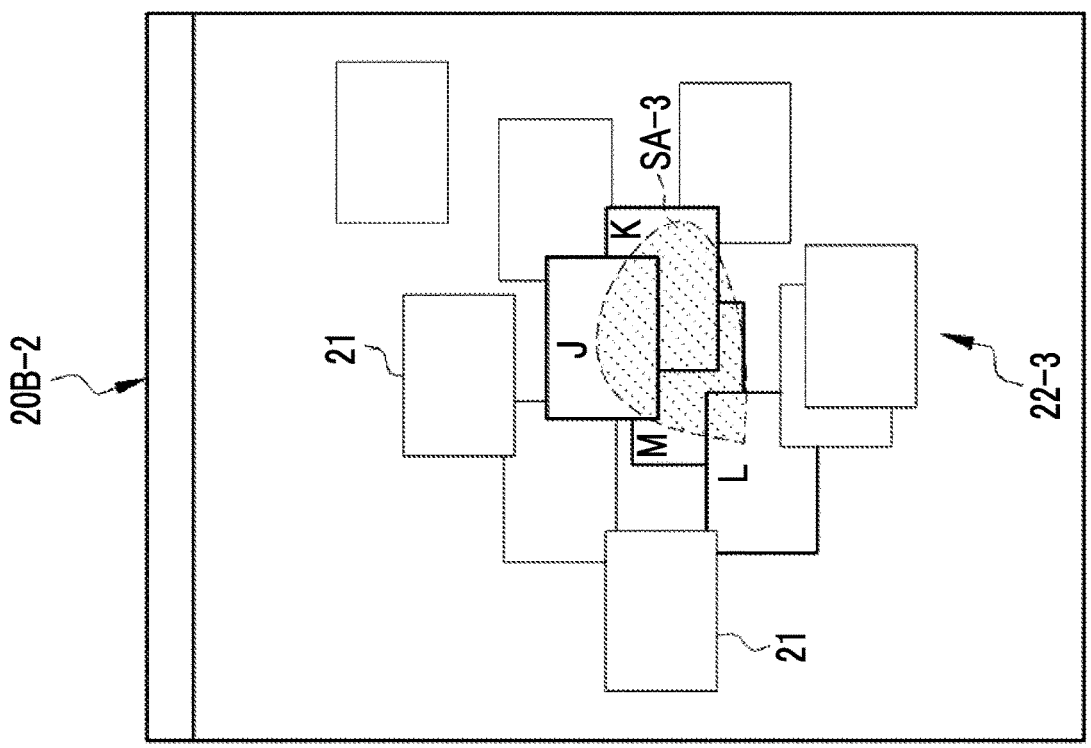

| GROUP | IMAGE NUMBER |
|---|---|
| SMALLER THAN 5000 YEN | 2, 7, 9, 14, 17, 18 |
| EQUAL TO OR GREATER THAN 5000 YEN AND SMALLER THAN 10000 YEN | 1, 3, 5, 8, 11, 15 |
| EQUAL TO OR GREATER THAN 10000 YEN | 4, 6, 10, 12, 13, 16 |

CONTENT RETRIEVAL DEVICE, OPERATING METHOD THEREOF, AND CONTENT RETRIEVAL SYSTEM FOR ENLARGING CONTENT

CROSS-REFERENCE TO RELATED APPLICATIONS

This application is a Continuation of PCT International Application No. PCT/JP2017/026740 filed on 24 Jul. 2017, which claims priority under 35 U.S.C § 119(a) to Japanese Patent Application No. 2016-146238 filed on 26 Jul. 2016. The above application is hereby expressly incorporated by reference, in its entirety, into the present application.

BACKGROUND OF THE INVENTION

1. Field of the Invention

The present invention relates to a content retrieval device, an operating method thereof, and a content retrieval system.

2. Description of the Related Art

In the related art, for example, in a case where a user retrieves desired content from a plurality of pieces of content such as products displayed on an internet shopping site, a variety of techniques for easily performing the retrieval have been considered. For example, JP2007-179400A discloses a technique for displaying a retrieval screen having a map in which content is placed on a two-dimensional coordinate space on the basis of attribute information of the content.

In JP2007-179400A, music data is shown as the content. Further, the attribute information includes, for example, basic information on an artist name, a music title, an album title, or the like, information based on objective evaluations such as a genre such as rock or pops, an age such as 1980's or 1990's, or a year chart, and information based on sensible evaluations such as a powerful song image, a bright song image, or a positive song image. Two pieces of content are selected by a user from the plurality of pieces of attribute information, and are allocated onto coordinate axes in the two-dimensional coordinate space that forms a map. For example, the year chart is allocated onto a longitudinal axis, and the age is allocated onto a lateral axis.

The content is placed at a position on a map corresponding to each piece of attribute information. The user may visually recognize an attribute information difference between the pieces of content on the basis of the positions of the pieces of content on the map. Thus, the user may retrieve content having desired attribute information.

The retrieval screen disclosed in JP2007-179400A includes an enlarge-display function. More specifically, for example, in a case where a user selects an area of a map in which a plurality of pieces of content are placed on the retrieval screen on which the entirety of the map is displayed, a retrieval screen on which the selected area is enlarge-displayed is displayed. Hereinafter, a retrieval screen before enlarge-display is referred to as a screen before enlargement, the area of the map selected by the user is referred to as a selection area, and a retrieval screen after enlarge-display is referred to as a screen after enlargement.

In JP2007-179400A, immediately after the selection area is selected on the screen before enlargement, the screen is changed to the screen after enlargement. Further, JP2007-179400A discloses a configuration in which two pieces of content having the same or similar attribute information displayed in a state where they overlap each other on the screen before enlargement are displayed in a state where they do not overlap each other due to an enlarged interval between the pieces of content on the screen after enlargement.

SUMMARY OF THE INVENTION

The position of the content on the map is very important information for visually recognizing an attribute information difference between the plurality of pieces of content from the user, and the user retrieves desired content using the position of the content on the map. Accordingly, in a case where the user loses the position of content that is currently focused on from the map, there is a difficulty in retrieval of the content.

In JP2007-179400A, the configuration in which pieces of content having the same or similar attribute information are displayed on the screen before enlargement in a state where they overlap each other is disclosed, but in a case where the number of the pieces of content having the same or similar attribute information is large, there is a case where the entirety of the content cannot be displayed on the screen before enlargement. This is a problem that noticeably occurs in a case where content is displayed with a certain size for securing visibility of the content in a smartphone with a small display size. In order to cope with the problem, a display configuration in which only a part of pieces of content having the same or similar attribute information is displayed on a screen before enlargement, and after enlargement of the screen, content that cannot be displayed on the screen before enlargement appears on a screen after enlargement in which a blank is generated due to enlargement of an interval between the pieces of content, has been reviewed.

Here, in the display configuration, the content displayed on the screen before enlargement and the content that newly appears are mixed on the screen after enlargement. In JP2007-179400A, the screen before enlargement is directly changed to the screen after enlargement as described above. Here, in a case where the above-described display configuration is employed, it is difficult to distinguish the content displayed on the screen before enlargement from the content that newly appears on the screen after enlargement, and thus, there is a concern that the user may lose the content focused on in the map on the screen after enlargement.

In a case where a user retrieves desired content from a plurality of pieces of content using the technique disclosed in JP2007-179400A, it is considered that selection of a selection area is repeatedly performed. Thus, it is desirable to improve the problem that there is the concern that the user may lose the content focused on in the map on the screen after enlargement in order to improve convenience of the user.

An object of the invention is to provide a content retrieval device, an operating method thereof, and a content retrieval system capable of reducing, in a case where a selection area selected by a user is enlarge-displayed on a retrieval screen having a map in which content is placed on the basis of attribute information, a concern that the user may lose content focused on in the map on the retrieval screen after the enlarge-display.

In order to solve the above-mentioned problems, there is provided a content retrieval device that retrieves at least one piece of content from a plurality of pieces of content, comprising: a screen output controller that controls output, on a display, of a retrieval screen having a map that includes at least one coordinate axis to which attribute information on the content is allocated and in which the content is placed at a position corresponding to the attribute information; a command reception section that receives a selection command for an area in the map through the retrieval screen; and a screen editing section that performs a screen change of the retrieval screen in accordance with the selection command, in which the screen editing section changes a screen before enlargement that is the retrieval screen before the selection command is received to a first-middle screen obtained by deleting the content outside a selection area that is the area selected according to the selection command, changes the first-middle screen to a second-middle screen on which an interval between the plurality of pieces of content in the selection area is enlarge-displayed in a state where a relative positional relationship therebetween is secured on the map, and changes the second-middle screen to a screen after enlargement that is the retrieval screen on which the content in the selection area that has not been displayed on the screen before enlargement is displayed in a blank generated as the interval is enlarged.

It is preferable that the attribute information includes first attribute information based on a sensible evaluation of the content, and the map includes a first map having the coordinate axis to which the first attribute information is allocated.

It is preferable that the attribute information includes second attribute information based on an objective evaluation of the content, in addition to the first attribute information.

It is preferable that the screen output controller displays a group designation user interface for designating a group in a range where the objective evaluations indicated by the second attribute information are the same on the retrieval screen having the first map, and sets display forms of corresponding content that is the content corresponding to the group set by the group designation user interface and non-corresponding content that is the content that does not correspond to the group to be different from each other.

It is preferable that the screen output controller displays the corresponding content at the front in a case where the corresponding content and the non-corresponding content are displayed in an overlapping manner in the first map. Further, it is preferable that the screen output controller sets the non-corresponding content to be in a non-display state in the first map.

It is preferable that the command reception section receives the selection command a plurality of times, and the screen editing section performs a screen change for changing the screen before enlargement to the screen after enlargement through the first-middle screen and the second-middle screen a plurality of times, in accordance with the plurality of times of the selection commands, and the screen output controller displays the group designation user interface on the screen after enlargement displayed after the selection command is received at least one time.

It is preferable that the map includes a second map having the coordinate axis to which the second attribute information is allocated, in addition to the first map, and the screen output controller selectively performs switching between displays of the first map and the second map on the retrieval screen.

It is preferable that the command reception section receives the selection command a plurality of times, the screen editing section performs a screen change for changing the screen before enlargement to the screen after enlargement through the first-middle screen and the second-middle screen a plurality of times, in accordance with the plurality of times of the selection commands, and the screen output controller displays the first map until the number of times of reception of the selection command reaches a set number of times, and performs switching from the first map to the second map in a case where the number of times of reception reaches the set number of times.

It is preferable that the screen output controller displays a map switching user interface for performing the switching between the displays of the first map and the second map on the retrieval screen, and displays one of the first map and the second map selected by the map switching user interface.

It is preferable that the command reception section receives the selection command a plurality of times, the screen editing section performs a screen change for changing the screen before enlargement to the screen after enlargement through the first-middle screen and the second-middle screen a plurality of times, in accordance with the plurality of times of the selection commands, and the screen output controller displays the map switching user interface on the screen after enlargement displayed after the selection command is received at least one time.

It is preferable that the screen output controller displays a map in which the content is placed in a line at a position corresponding to the second attribute information, along the one coordinate axis to which one piece of the second attribute information is allocated, as the second map.

It is preferable that the screen output controller displays a map in which the content is placed in a plurality of lines at positions corresponding to the second attribute information, along the one coordinate axis to which one piece of the second attribute information is allocated, as the second map, and places the content of the group in the range where the objective evaluations indicated by the second attribute information are the same in a direction orthogonal to the coordinate axis.

It is preferable that the screen output controller displays the content in such a display form that the group in the range where the objective evaluations indicated by the second attribute information are the same is distinguishable in the second map.

It is preferable that the screen editing section displays the content to have the same size on the screen before enlargement and the screen after enlargement.

It is preferable that the screen output controller delivers the retrieval screen to a mobile client terminal having the display in accordance with a delivery request from the mobile client terminal.

There is provided an operating method of a content retrieval device that retrieves at least one piece of content from a plurality of pieces of content, comprising: a screen output control step of controlling output, on a display, of a retrieval screen having a map that includes at least one coordinate axis to which attribute information on the content is allocated and in which the content is placed at a position corresponding to the attribute information; a command reception step of receiving a selection command for an area in the map through the retrieval screen; and a screen editing step of performing a screen change of the retrieval screen in accordance with the selection command, in which the screen editing step includes changing a screen before enlargement that is the retrieval screen before the selection command is received to a first-middle screen obtained by deleting the content outside a selection area that is the area selected according to the selection command, changing the first-middle screen to a second-middle screen on which an interval between the plurality of pieces of content in the selection area is enlarge-displayed in a state where a relative positional relationship therebetween is secured on the map, and changing the second-middle screen to a screen after enlargement that is the retrieval screen on which the content in the selection area that has not been displayed on the screen before enlargement is displayed in a blank generated as the interval is enlarged.

There is provided a content retrieval system that includes a content retrieval device that retrieves at least one piece of content from a plurality of pieces of content and a client terminal connected to the content retrieval device through a network, comprising: a screen output controller that controls output, on a display, of a retrieval screen having a map that includes at least one coordinate axis to which attribute information on the content is allocated and in which the content is placed at a position corresponding to the attribute information; a command reception section that receives a selection command for an area in the map through the retrieval screen; and a screen editing section that performs a screen change of the retrieval screen in accordance with the selection command, in which the screen editing section changes a screen before enlargement that is the retrieval screen before the selection command is received to a first-middle screen obtained by deleting the content outside a selection area that is the area selected according to the selection command, changes the first-middle screen to a second-middle screen on which an interval between the plurality of pieces of content in the selection area is enlarge-displayed in a state where a relative positional relationship therebetween is secured on the map, and changes the second-middle screen to a screen after enlargement that is the retrieval screen on which the content in the selection area that has not been displayed on the screen before enlargement is displayed in a blank generated as the interval is enlarged.

According to the invention, on a retrieval screen having a map in which content is placed on the basis of attribute information, between a screen before enlargement that is a retrieval screen before a selection area selected by a user is enlarge-displayed and a screen after enlargement that is a retrieval screen on which content displayed in the selection area on the screen before enlargement and content in the selection area that is in a non-display state on the screen before enlargement are displayed, a first-middle screen obtained by deleting content outside the selection area and a second-middle screen on which an interval between the pieces of content in the selection area is enlarge-displayed in a state where a relative positional relationship therebetween is secured on the map are inserted. Thus, it is possible to cause the user to have an impression of a difference between the content displayed on the screen before enlargement and content that newly appear. Accordingly, it is possible to provide a content retrieval device, an operating method thereof, and a content retrieval system capable of reducing, in a case where a selection area selected by a user is enlarge-displayed on a retrieval screen having a map in which content is placed on the basis of attribute information, a concern that the user may lose content focused on in the map on the retrieval screen after the enlarge-display.

BRIEF DESCRIPTION OF THE DRAWINGS

FIG. 15 is a diagram showing a state in which a map displayed on a retrieval screen is switched from the first map to the second map.

DESCRIPTION OF THE PREFERRED EMBODIMENTS

First Embodiment

Figure 1:
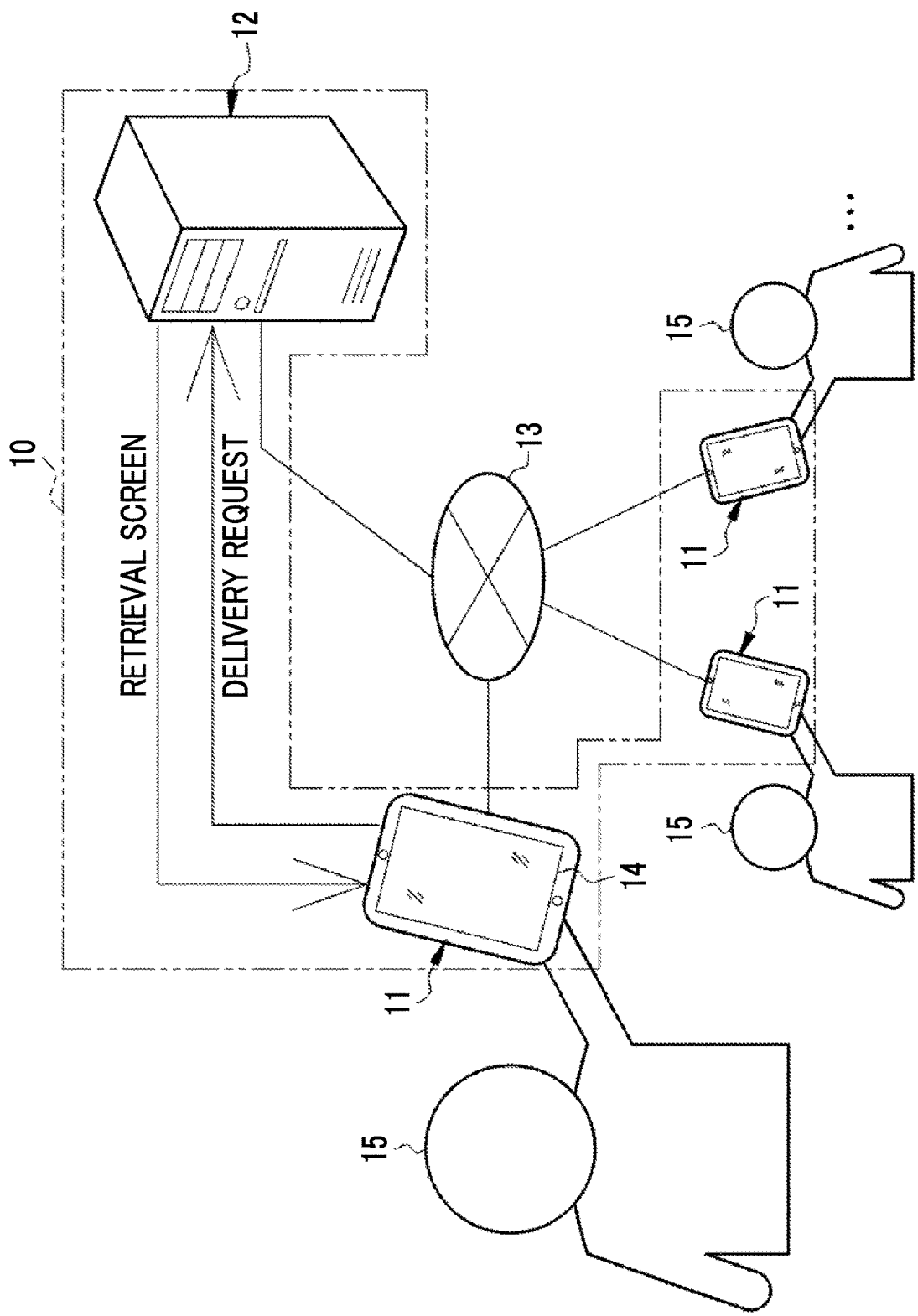
FIG. 1 is a diagram showing a content retrieval system.

In FIG. 1, a content retrieval system 10 comprises a client terminal 11 and a content retrieval server 12 that corresponds to a content retrieval device. The client terminal 11 and the content retrieval server 12 are connected to communicate with each other through a network 13 such as the Internet or a wide area network (WAN) called a public communication network. In the network 13, in consideration of information security, a virtual private network (VPN) is constructed, or a communication protocol with a high security level such as a hypertext transfer protocol secure (HTTPS) is used.

The client terminal 11 and the content retrieval server 12 are formed by installing a control program such as an operating system or a variety of application programs (hereinafter, referred to as AP) in a base device such as a server computer, a personal computer, or a computer called as a work station.

The client terminal 11 is a smartphone or a tablet computer having a touch panel display (hereinafter, referred to as a touch panel) 14, for example, and capable of being portable by a user 15. The touch panel 14 has a screen size of about 5 inches to about 15 inches, for example, and displays a variety of screens operated by the user 15. A screen thereof forms a graphical user interface (GUI). The client terminal 11 receives an input of a variety of operating commands from the user 15 through a variety of screens displayed on the touch panel 14.

The content retrieval server 12 is managed by an internet online shopping company that handles content. The internet online shopping company establishes a content shopping site on the Internet. The user 15 is given an access right to the shopping site.

The client terminal 11 accesses the content retrieval server 12 through the network 13 in accordance with an operating command of the user 15. The content retrieval server 12 delivers an access authentication screen for a shopping site to the client terminal 11. The access authentication screen includes details for asking the user 15 user identification data (ID) and a password for identifying each user 15. The user 15 performs access authentication by inputting the user ID and the password on the access authentication screen.

After the access authentication, the client terminal 11 transmits a delivery request for a retrieval screen 20 (see FIG. 2) for retrieving at least one piece of content from a plurality of pieces of content to the content retrieval server 12, in accordance with an operating command of the user 15. The content retrieval server 12 delivers the retrieval screen 20 to the client terminal 11 that is a delivery request source in accordance with the delivery request.

The retrieval screen 20 is a screen capable of being viewed on a web browser of the client terminal 11. Specifically, the content retrieval server 12 outputs the retrieval screen 20 in a web deliver screen data format created by a markup language such as an extensible markup language (XML). Instead of XML, another data description language such as JavaScript (registered trademark) Object Notation (JSON) may be used. The content retrieval server 12 outputs a variety of screens including the access authentication screen in addition to the retrieval screen 20 to the client terminal 11 in a web deliver screen data form.

Figure 2:
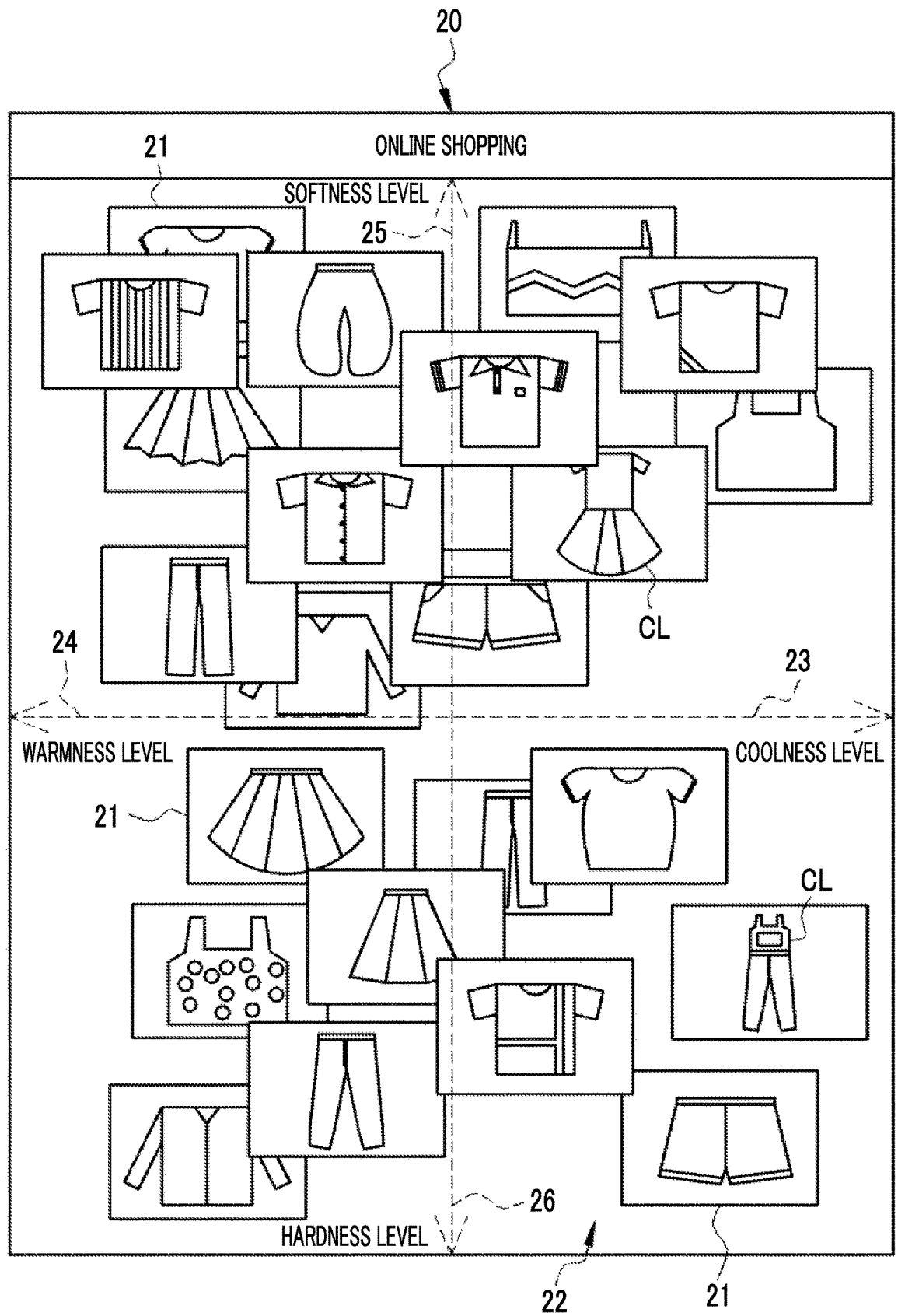
FIG. 2 is a diagram showing a retrieval screen having a first map.

In FIG. 2, a first map 22 in which female clothes CL that correspond to content are placed in the form of images 21 is displayed on the retrieval screen 20. The first map 22 includes four coordinate axes 23, 24, 25, and 26. The coordinate axes 23 to 26 have the center of the retrieval screen 20 as the origin. The coordinate axis 23 represents a lateral axis that is directed rightwards, the coordinate axis 24 represents a lateral axis that is directed leftwards, the coordinate axis 25 represents a longitudinal axis that is directed upwards, and the coordinate axis 26 represents a longitudinal axis that is directed downwards.

First attribute information based on sensible evaluations of the clothes CL is allocated onto the coordinate axes 23 to 26. That is, a coolness level is allocated onto the coordinate axis 23, a warmness level is allocated onto the coordinate axis 24, a softness level is allocated onto the coordinate axis 25, and a hardness level is allocated onto the coordinate axis 26. The images 21 of the clothes CL are placed at positions of the first map 22 corresponding to four pieces of first attribute information of the coolness level, the warmness level, the softness level, and the hardness level.

The coolness level, the warmness level, the softness level, and the hardness level represent images of the clothes CL recalled from colors, styles, textures, or the like of the clothes CL. The coolness level, the warmness level, the softness level, and the hardness level are obtained in general consideration of results obtained by analyzing the images 21 of the clothes CL, information on the styles or the textures of the clothes CL, and the like, in the content retrieval server 12. For example, cold-colored clothes CL have a high coolness level, and contrarily, warm-colored clothes CL have a high warmness level. Further, light-colored clothes CL have a high softness level, but dark-colored clothes CL have a high hardness level. In addition, for example, silk clothes CL have a high coolness level, and wool clothes CL have a high warmness level. The coolness level, the warmness level, the softness level, and the hardness level may be input by a manufacturer of the clothes CL or an internet online shopping company.

As described above, the touch panel 14 has a screen size of about 5 inches to about 15 inches. In the touch panel 14 having such a relatively small screen size, in order to secure visibility of the image 21, the images 21 of the clothes CL having the same or similar first attribute information are displayed in an overlapping manner on the first map 22. Further, there is a limit in the number of images 21 capable of being displayed at one time on the first map 22, and images 21 that cannot be displayed are in a non-display state. That is, it should not be interpreted that all the clothes CL handled on the shopping site are displayed on the first map 22. Selection of images 21 to be displayed on the first map 22 and images 21 not to be displayed may be randomly performed, or may be performed on the basis of a preset criterion (for example, images of clothes CL with a high evaluation of the user 15 are preferentially displayed). The coordinate axes 23 to 26 are not displayed on the retrieval screen 20 in reality (see FIG. 3). For this reason, the coordinate axes 23 to 26 are drawn by broken lines in FIG. 2.

Figure 3:
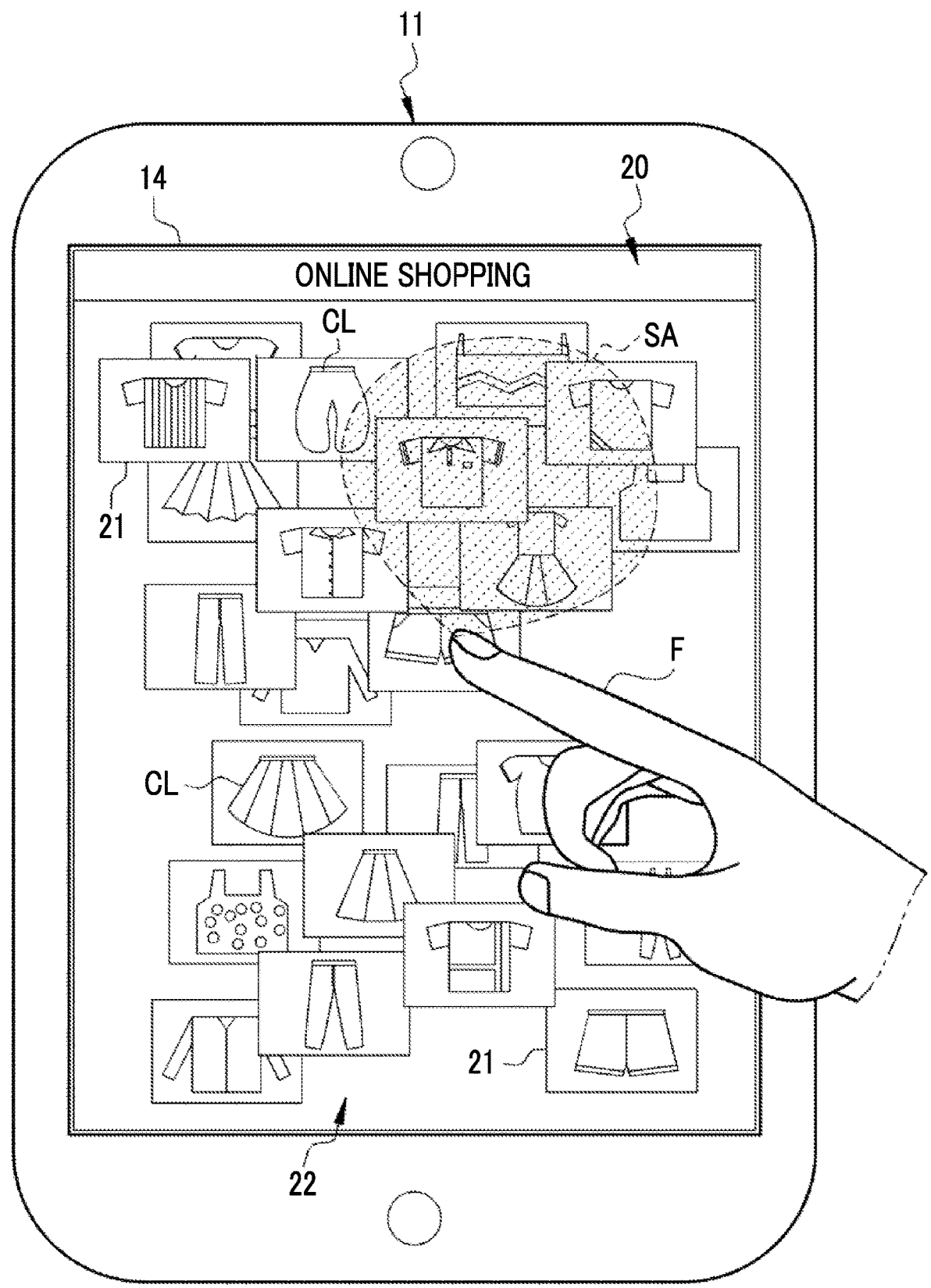
FIG. 3 is a diagram showing a state in which a selection command for an area in the first map is performed.

As shown in FIG. 3, on the retrieval screen 20, by tracing an edge of a desired area SA in the first map 22 using a finger F of the user 15, a selection command for the area SA is performed. Hereinafter, the area SA selected by the user 15 is referred to as a selection area SA.

In a case where there is a selection command, the selection area SA is enlarge-displayed (details of which will be described later). On the retrieval screen 20 after enlarge-display, that is, on a screen after enlargement, the images 21 of the clothes CL that have not been displayed on the retrieval screen 20 before enlarge-display, that is, on a screen before enlargement are displayed. The selection command may be performed a number of times that is set in advance (hereinafter, referred to as a set number of times). Hereinafter, for ease of distinction, the screen before enlargement is given reference numeral 20A, and the screen after enlargement is given reference numeral 20B (see FIGS. 11 to 14).

Figure 4:
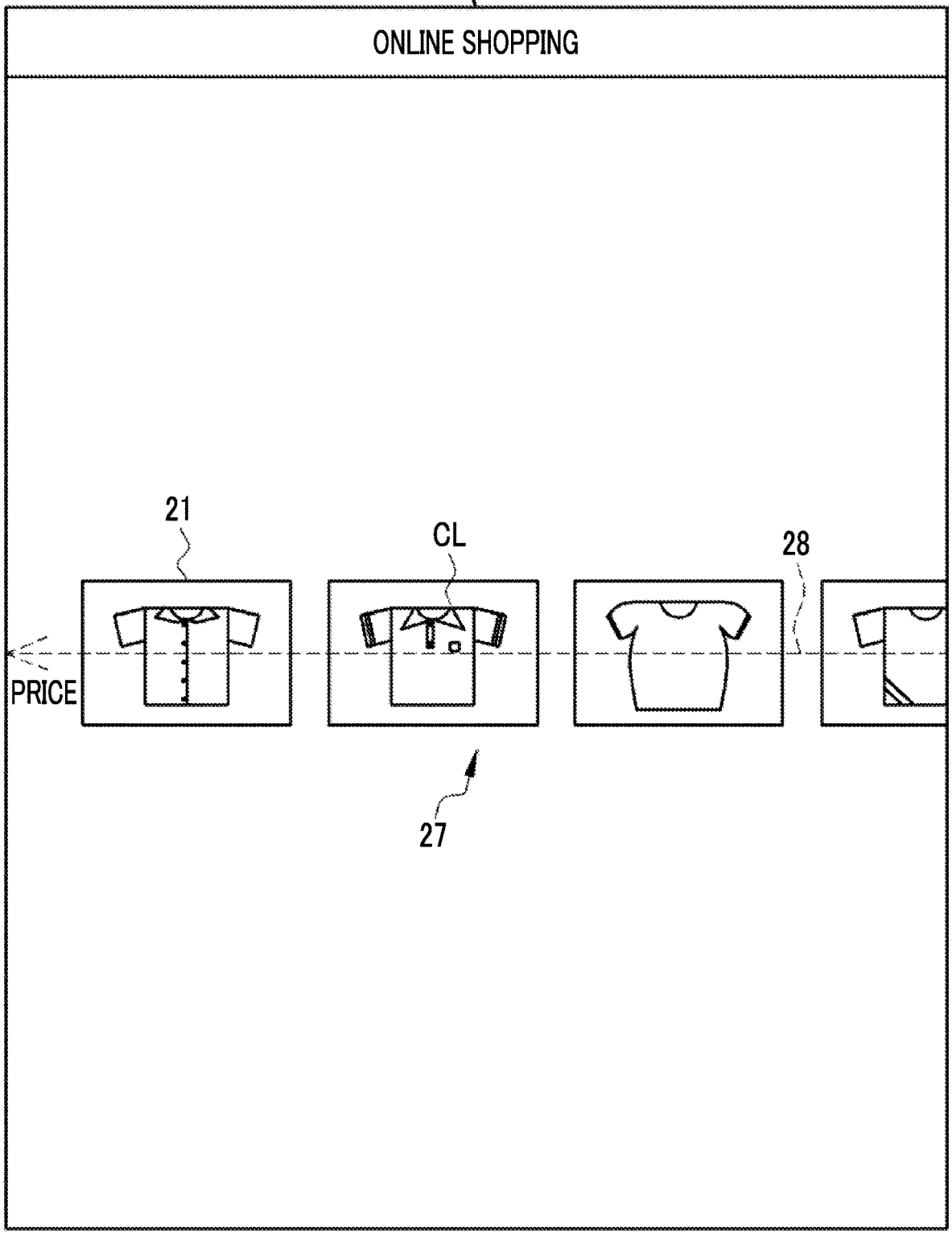
FIG. 4 is a diagram showing a retrieval screen having a second map.

In a case where the selection command is performed the set number of times, a second map 27 is displayed on the retrieval screen 20, instead of the first map 22, as shown in FIG. 4. The second map 27 has one coordinate axis 28. The coordinate axis 28 is a lateral axis that passes through the center of the retrieval screen 20.

Second attribute information based on objective evaluations of the clothes CL is allocated onto the coordinate axis 28. That is, the second map 27 is a map having the coordinate axis 28 to which the second attribute information is allocated, differently from the first map 22 having the coordinate axes 23 to 26 to which the first attribute information is allocated. Here, prices of the clothes CL are employed as the second attribute information. The images 21 of the clothes CL are placed in a line at positions of the second map 27 corresponding to respective pieces of second attribute information along the coordinate axis 28. The size of each image 21 in the second map 27 is the same as that in the first map 22.

Since the images 21 are placed in a line along the coordinate axis 28 on the second map 27, there is a case where all the images 21 cannot be displayed at one time in accordance with the number of images 21. In this case, similar to the case of the first map 22, some images 21 are in a non-display state. Thus, the non-displayed images 21 may be scroll-displayed in accordance with an operation for horizontally sliding the finger F on the touch panel 14 (a so-called swiping operation). The coordinate axis 28 is not displayed on the retrieval screen 20 in reality, similar to the coordinate axes 23 to 26 of the first map 22 (see FIG. 15). For this reason, the coordinate axis 28 is drawn by a broken line in FIG. 3.

The images 21 of the clothes CL in the second map 27 may be selected by the finger F of the user 15. In a case where an image 21 is selected, the retrieval screen 20 is switched to a retrieval result display screen (not shown).

On the retrieval result display screen, the image 21 with a full size of the clothes CL, a coolness level, a warmness level, a softness level and a hardness level (first attribute information) of the clothes CL, the price (second attribute information) of the clothes CL, a button for asking a purchase intention for the clothes CL of the user 15 (for example, a button for "putting the clothes CL into a cart"), and the like are displayed. In a case where the user 15 has an intention for purchasing the clothes CL displayed on the retrieval result display screen, the user 15 selects the button to proceed to a purchase procedure. On the other hand, in a case where the user 15 does not have the intention for purchasing the clothes CL displayed on the retrieval result display screen and wants to retrieve other clothes CL again, the user 15 selects a return button on the web browser to return to the retrieval screen 20.

Figure 5:
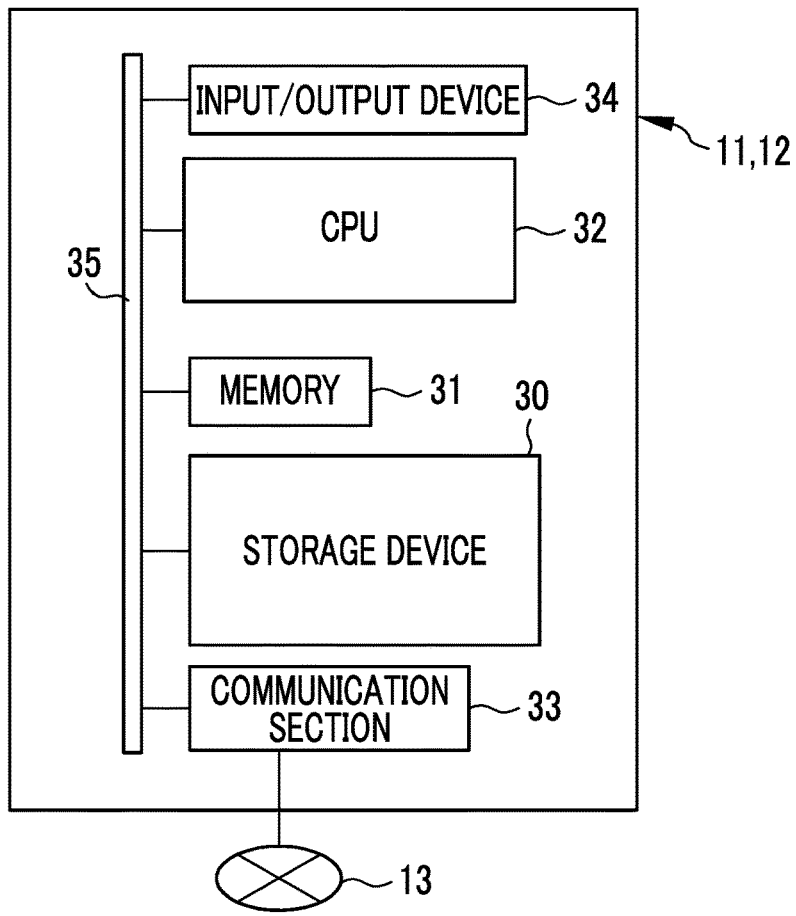
FIG. 5 is a block diagram showing a computer that forms a client terminal and a content retrieval server.

In FIG. 5, computers that form the client terminal 11 and the content retrieval server 12 comprises the same basic configuration, and comprise a storage device 30, a memory 31, a central processing unit (CPU) 32, a communication section 33, and an input/output device 34, respectively. These components are connected to each other through a data bus 35.

The storage device 30 is a hard disk drive that is built in the computer that forms the client terminal 11 or the like or is connected through a cable or a network, or a disk array in which a plurality of hard disk drives are mounted. The storage device 30 stores a control program such as an operating system, a variety of APs, a variety of data associated with the programs, and the like.

The memory 31 is a work memory for executing a process by the CPU 32. The CPU 32 loads the program stored in the storage device 30 to the memory 31 to execute a process based on the program, to thereby generally control the respective sections of the computer. The communication section 33 is a network interface for performing a transmission control of a variety of information through the network 13. The input/output device 34 is the touch panel 14 in the case of the client terminal 11, and is an operating section such as a display and a keyboard or a mouse in the case of the content retrieval server 12 (all of which are not shown).

In the following description, for ease of distinction, subscript "A" is attached to each section of the computer that forms the client terminal 11, and subscript "B" is attached to each section of the computer that forms the content retrieval server 12.

Figure 6:
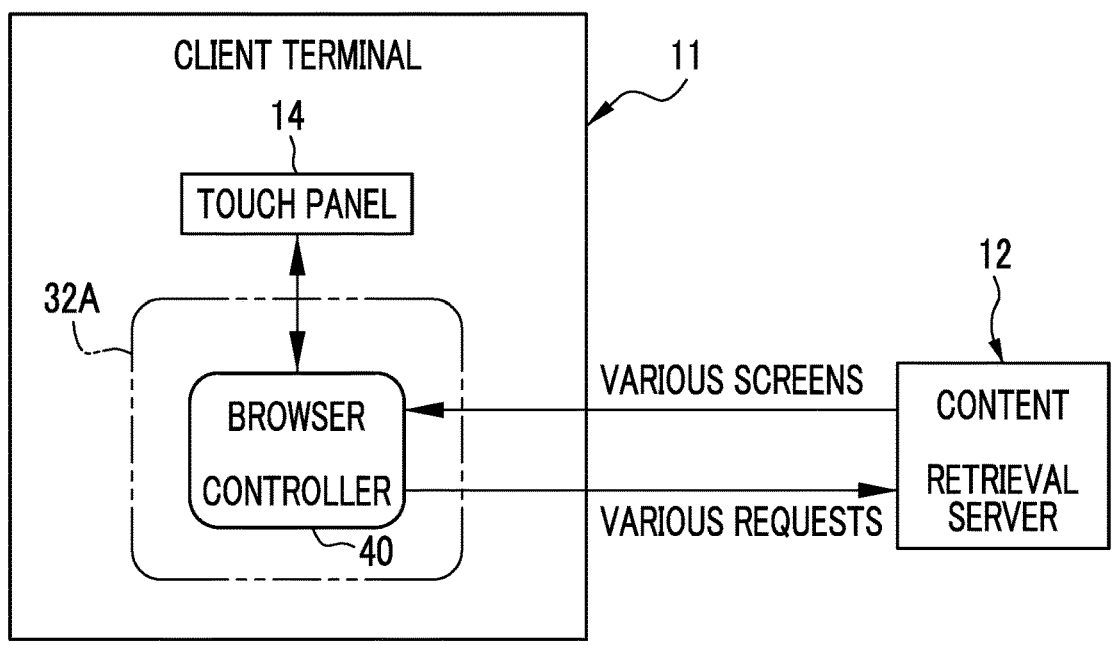
FIG. 6 is a block diagram showing a CPU of the client terminal.

In FIG. 6, in a case where a web browser is started, a CPU 32A of the client terminal 11 functions as a browser controller 40 in cooperation with the memory 31, or the like. The browser controller 40 controls an operation of the web browser. The browser controller 40 receives screen data on a variety of screens from the content retrieval server 12. The browser controller 40 reproduces the variety of screens displayed on the web browser on the basis of the screen data, and displays the result on the touch panel 14.

Further, the browser controller 40 receives a variety of operating commands input by the user 15 through the variety of screens. The operating commands include an access command to a shopping site of the clothes CL, a deliver command for the retrieval screen 20, a selection command for the selection area SA shown in FIG. 3, and the like. The browser controller 40 issues a variety of requests according to the operating commands to the content retrieval server 12.

The access command includes an address for identifying each client terminal 11, a user ID and a password input by the user 15 on an access authentication screen. In a case where the access command is present, the browser controller 40 issues an access request including the address, the user ID, and the password of the client terminal 11 to the content retrieval server 12.

The deliver command for the retrieval screen 20 includes the address of the client terminal 11. In a case where the deliver command is present, the browser controller 40 issues a delivery request including the address of the client terminal 11 to the content retrieval server 12.

The selection command for the selection area SA includes the address of the client terminal 11 and information on the selection area SA. The information on the selection area SA represents XY coordinates of an edge of the selection area SA in an XY coordinate space using the center of the retrieval screen 20 as the origin, for example. In a case where the selection command is present, the browser controller 40 issues an enlarge-display request including the address of the client terminal 11 and the information on the selection area SA to the content retrieval server 12.

Figure 7:
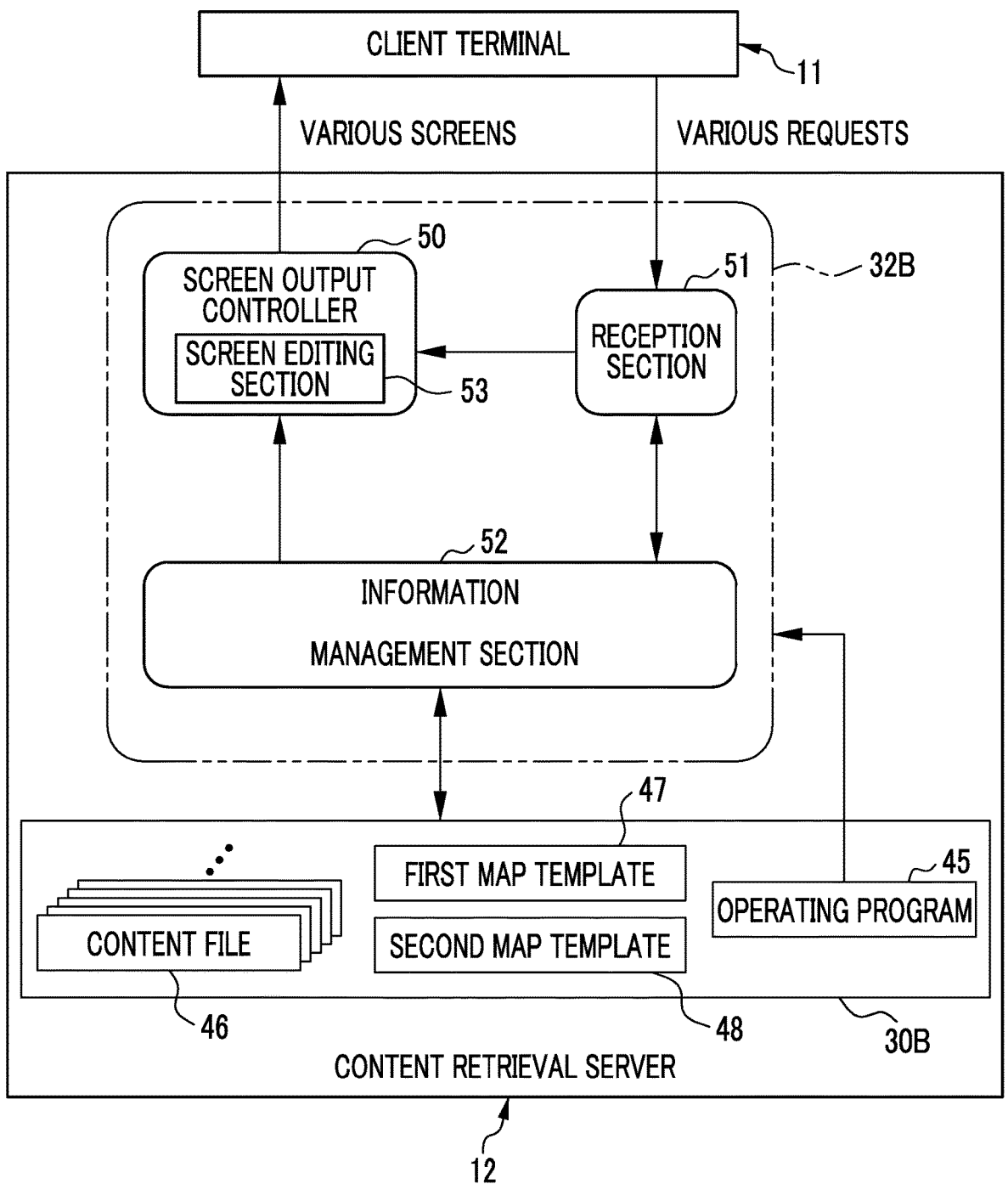
FIG. 7 is a block diagram showing a CPU of the content retrieval server.

In FIG. 7, a storage device 30B of the content retrieval server 12 stores an operating program 45 as an AP. The operating program 45 is an AP for causing a computer that forms the content retrieval server 12 to function as a content retrieval device. The storage device 30B stores a content file 46, a first map template 47, and a second map template 48, in addition to the operating program 45.

In a case where the operating program 45 is started, a CPU 32B of the content retrieval server 12 functions as a screen output controller 50, a reception section 51, and an information management section 52 in cooperation with the memory 31, or the like. The screen output controller 50 includes a screen editing section 53.

The screen output controller 50 performs a screen output control function for controlling output of a variety of screens including the retrieval screen 20 to the client terminal 11. More specifically, the screen output controller 50 generates screen data on a variety of screens for web deliver, and delivers the screen data to the client terminal 11 that is a delivery request source.

The reception section 51 receives a variety of requests from the client terminal 11 including a delivery request or an enlarge-display request. As described above, the enlarge-display request includes the information on the selection area SA based on a selection command. Accordingly, the reception section 51 corresponds to a command reception section that performs a command reception function for receiving the selection command. The reception section 51 outputs the received variety of requests to the information management section 52.

Further, the reception section 51 counts the number of times of reception of the enlarge-display request, that is, the number of times of reception of the selection command after the delivery request is received. In a case where the number of times of reception of the selection command reaches a set number of times, the reception section 51 outputs the fact to the screen output controller 50. Here, the set number of times is 3.

The information management section 52 manages a variety of information stored in the storage device 30B, such as the content file 46, the first map template 47, or the second map template 48. The number of content files 46 that is present is the same as the number of clothes CL handled at a shopping site. The first map template 47 is a template for generating the first map 22. The second map template 48 is a template for generating the second map 27. The information management section 52 transmits the content file 46, the first map template 47, and the second map template 48 to the screen output controller 50.

The storage device 30B stores information on a user ID and a password necessary for access authentication, a set number of times to be compared with the number of times of reception of the selection command, or the like, in addition to the above-mentioned information. The information management section 52 transmits a user ID and a password to an authentication section (not shown) that collates the user ID and the password with a user ID and a password included in an access request. Further, the information management section 52 transmits information on the set number of times to the reception section 51.

The screen editing section 53 performs a screen editing function for performing a screen change of the retrieval screen 20 in accordance with a selection command. More specifically, the screen editing section 53 inserts two middle screens that are a first-middle screen 20M1 and a second-middle screen 20M2 (see FIGS. 11 to 14), between a screen before enlargement 20A before the selection area SA is enlarge-displayed and a screen after enlargement 20B after the selection area SA is enlarge-displayed.

Figure 8:
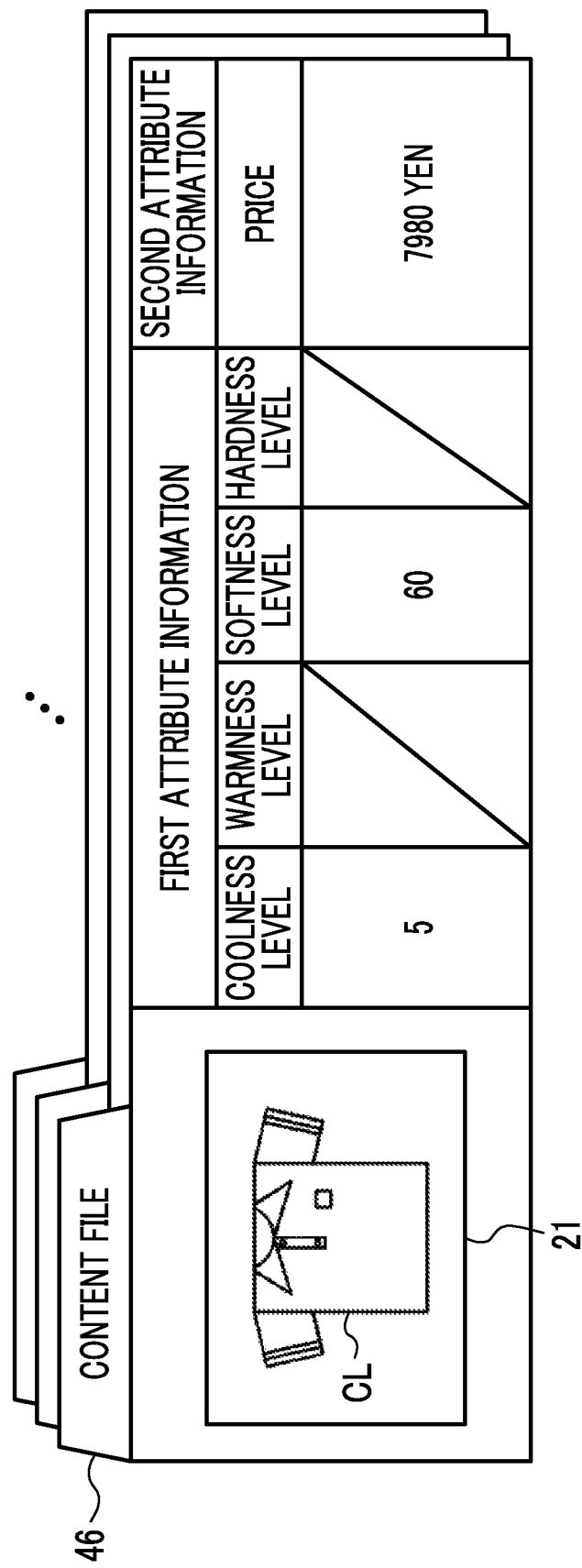
FIG. 8 is a diagram showing a content file.

In FIG. 8, in the content file 46, an image 21, first attribute information, and second attribute information are registered. The image 21 is displayed on the retrieval screen 20 as shown in FIGS. 2 and 4, or is displayed on a retrieval result display screen. The first attribute information corresponds to the coolness level, the warmness level, the softness level, and the hardness level shown in FIG. 2. Here, numerical values of 0 to 100 indicating degrees thereof are registered. Since the coolness level and the warmness level are in a contradictory relationship, in a case where one of the coolness level and the warmness level is registered, the other one is not registered to leave an empty section. This is similarly applied to the softness level and the hardness level. In the content file 46 shown in FIG. 8, the coolness level is registered as 5 and the softness level is registered as 60, and the warmness level and the hardness level are not registered to leave empty sections.

The second attribute information represents the price of the clothes CL shown in FIG. 4. In the content file 46 shown in FIG. 8, 7980 yen is registered. In the content file 46, a product name, a product number, a type, a texture and a manufacturing source of the clothes CL, a review and an evaluation of the user 15 with respect to the clothes CL, and the like are registered, in addition to the image 21, the first attribute information, and the second attribute information.

Figure 9:
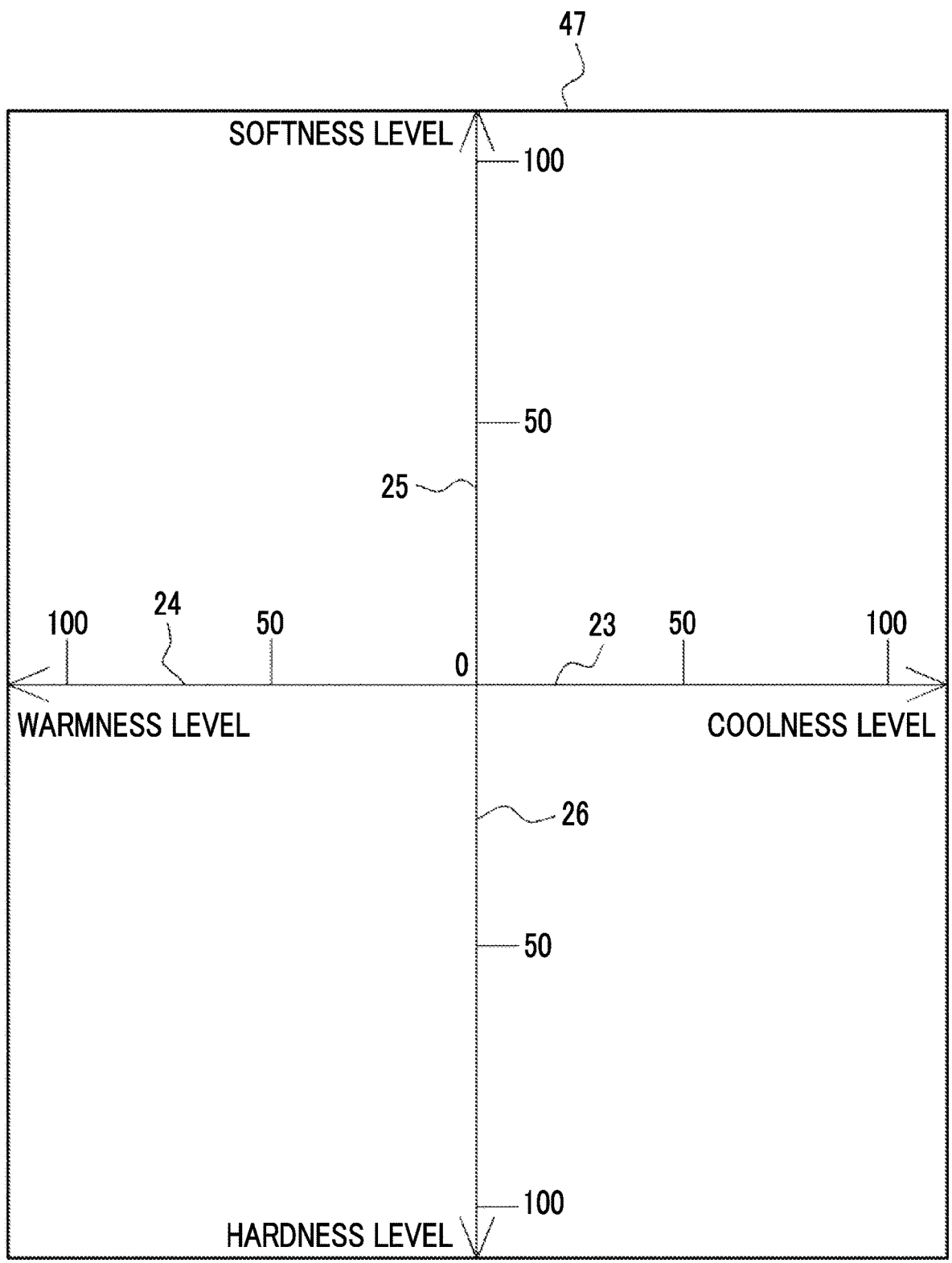
FIG. 9 is a diagram showing a first map template.

In FIG. 9, since the first map template 47 defines a display form of the first map 22 on the retrieval screen 20, the respective coordinate axes 23 to 26 in the first map 22 shown in FIG. 2 are fit in a frame of the retrieval screen 20. Scales of numerical values using the center of the retrieval screen 20 as the origin are attached to the respective coordinate axes 23 to 26. The screen output controller 50 places the image 21 of the clothes CL at a position based on the first attribute information of the content file 46 in accordance with the first map template 47 to generate the first map 22.

Figure 10:
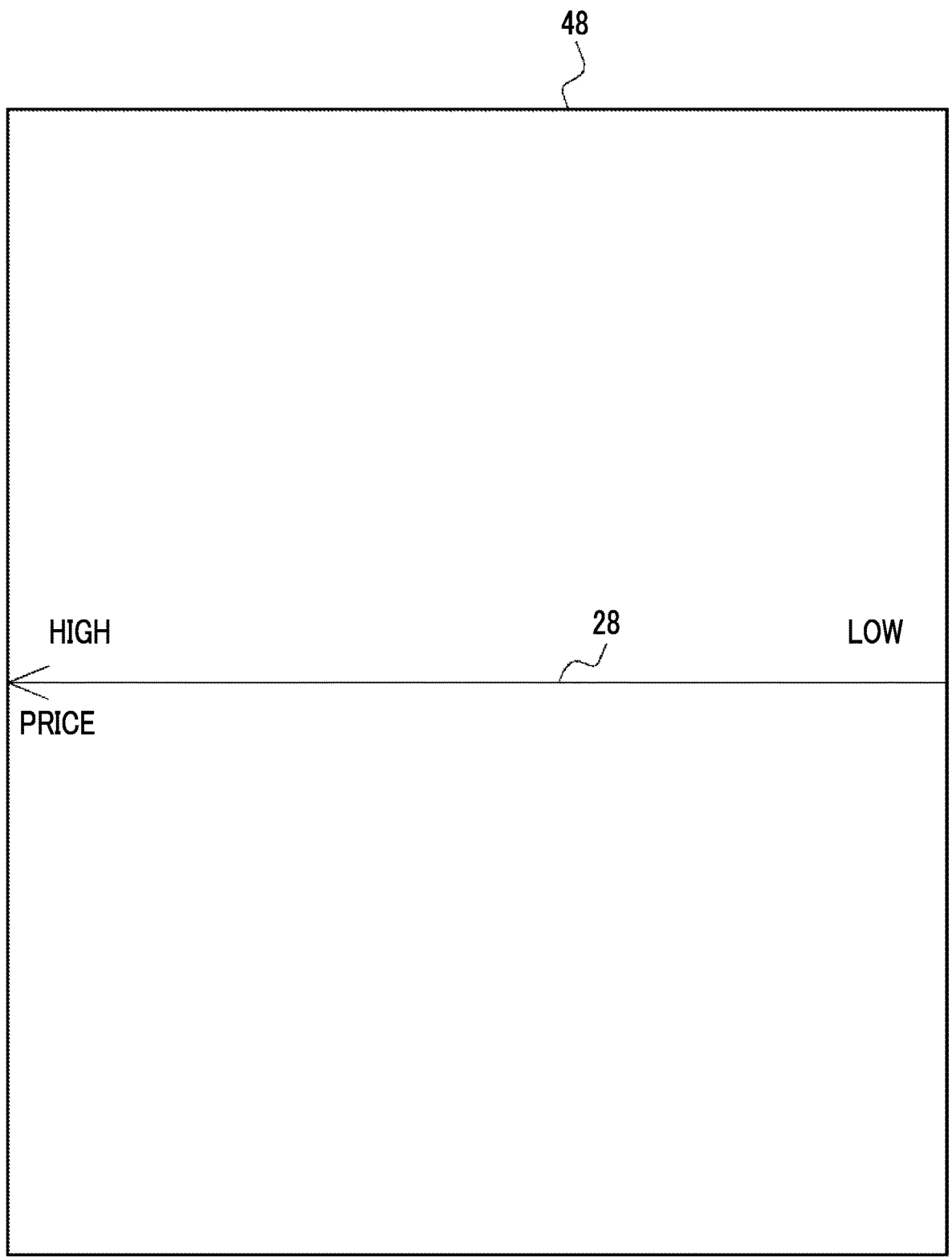
FIG. 10 is a diagram showing a second map template.

In FIG. 10, since the second map template 48 defines a display form of the second map 27 on the retrieval screen 20, the coordinate axis 28 shown in FIG. 4 is fit in the frame of the retrieval screen 20. The price of the coordinate axis 28 is set to become higher as it goes leftwards. The screen output controller 50 places the image 21 of the clothes CL at a position based on the second attribute information of the content file 46 in accordance with the second map template 48 to generate the second map 27.

Numerical values as in the coordinate axes 23 to 26 are not displayed onto the coordinate axis 28, and instead, only the setting that the price becomes higher as it goes leftwards is shown. For this reason, the screen output controller 50 displays the image 21 of the clothes CL having a relatively high price on a left side of the second map 27. Further, in a case where there are a plurality of suits of clothes CL having the same price, the screen output controller 50 does not display the images 21 in a state where the images 21 overlap each other as in the first map 22, and displays the images 21 one by one in a row. Accordingly, there may be a case where the prices of the clothes CL of the images 21 that are contiguously arranged in the second map 27 are the same.

Figure 11:
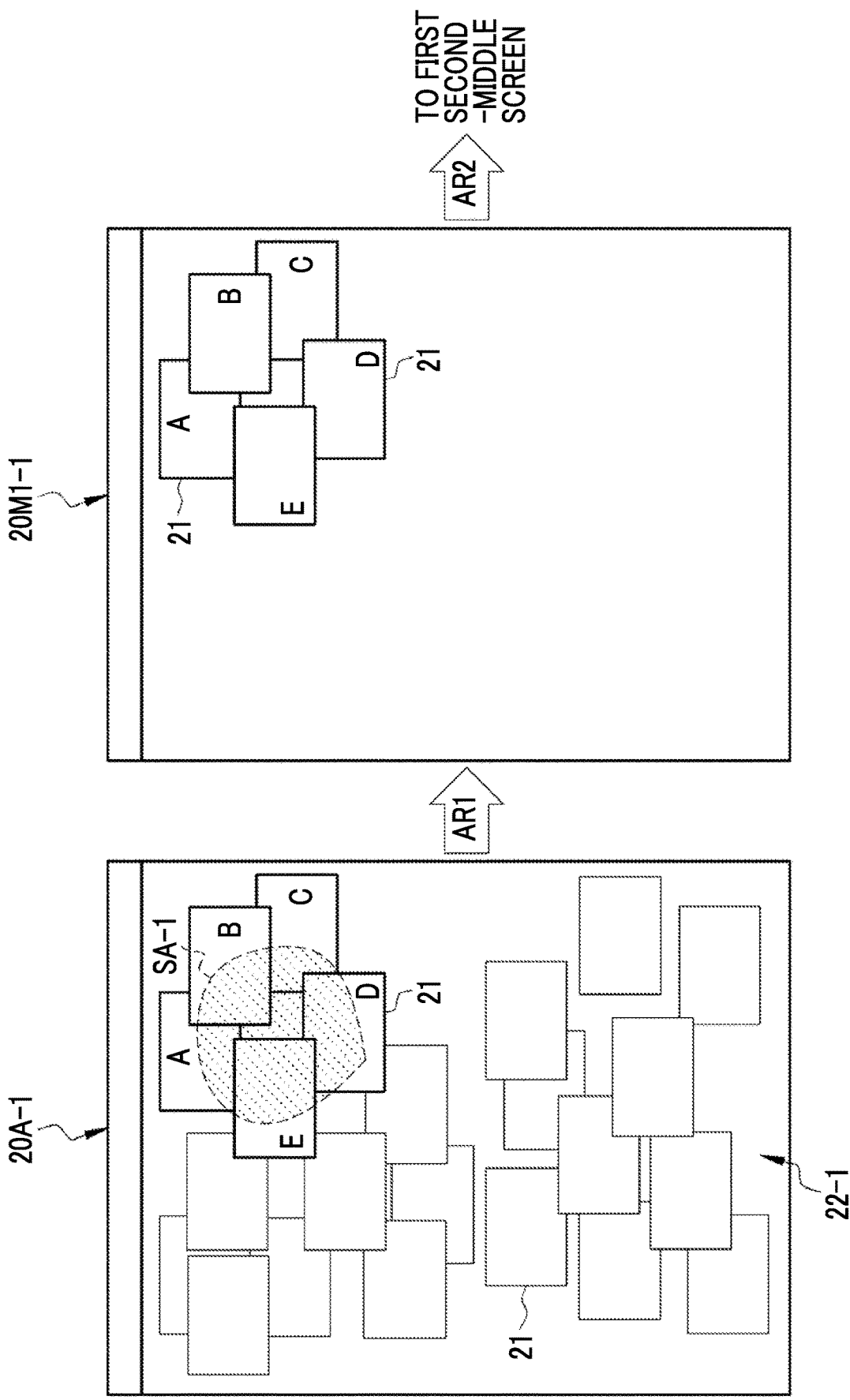
FIG. 11 is a diagram showing a screen change from an initial screen before enlargement to a first first-middle screen.

FIGS. 11 to 14 show screen change states from the screen before enlargement 20A to the screen after enlargement 20B performed by the screen editing section 53. First, a screen before enlargement 20A-1 shown on a left side of an arrow AR1 in FIG. 11 represents a retrieval screen 20 that is first delivered from the content retrieval server 12 in accordance with a delivery request. This shows a case where a selection area SA-1 is selected in a first map 22-1 of the first screen before enlargement 20A-1. The selection area SA-1 includes five images 21 of A, B, C, D, and E.

Then, as shown on a right side of the arrow AR1, the screen editing section 53 changes the first screen before enlargement 20A-1 to a first first-middle screen 20M1-1. The first first-middle screen 20M1-1 is formed by leaving the five images 21 of A to E in the selection area SA-1 and deleting the images 21 outside the selection area SA-1.

Subsequently, as shown on a right side of an arrow AR2 in FIG. 12, the screen editing section 53 changes the first first-middle screen 20M1-1 to a first second-middle screen 20M2-1. The first second-middle screen 20M2-1 is a screen on which an interval between the five images 21 of A to E in the selection area SA-1 left on the first first-middle screen 20M1-1 is enlarge-displayed in a state where a relative positional relationship therebetween is secured on the first map 1.

More specifically, the screen editing section 53 moves the five images 21 of A to E, and causes the center of the selection area SA-1 derived from information on the selection area SA-1 to match the origin (the center of the retrieval screen 20) of the coordinate axes 23 to 26. Further, the five images 21 of A to E are respectively placed again on extended lines of lines drawn to the center of the five images 21 of A to E from the origin of the coordinate axes 23 to 26. By enlarging the interval of the images 21 in the selection area SA-1 as described above, a large blank BL-1 is generated between the five images 21 of A to E displayed in a state where the images 21 overlap each other on the first screen before enlargement 20A-1.

As shown on a right side of an arrow AR3, the screen editing section 53 changes the first second-middle screen 20M2-1 to a first screen after enlargement 20B-1. The first screen after enlargement 20B-1 has a first map 22-2 on which new images 21N-1 that are images 21 in the selection area SA-1 that have not been displayed on the first screen before enlargement 20A-1 are displayed as blanks BL-1. Further, the size of the image 21 on the first screen after enlargement 20B-1 is the same as that of the first screen before enlargement 20A-1.

Figure 12:
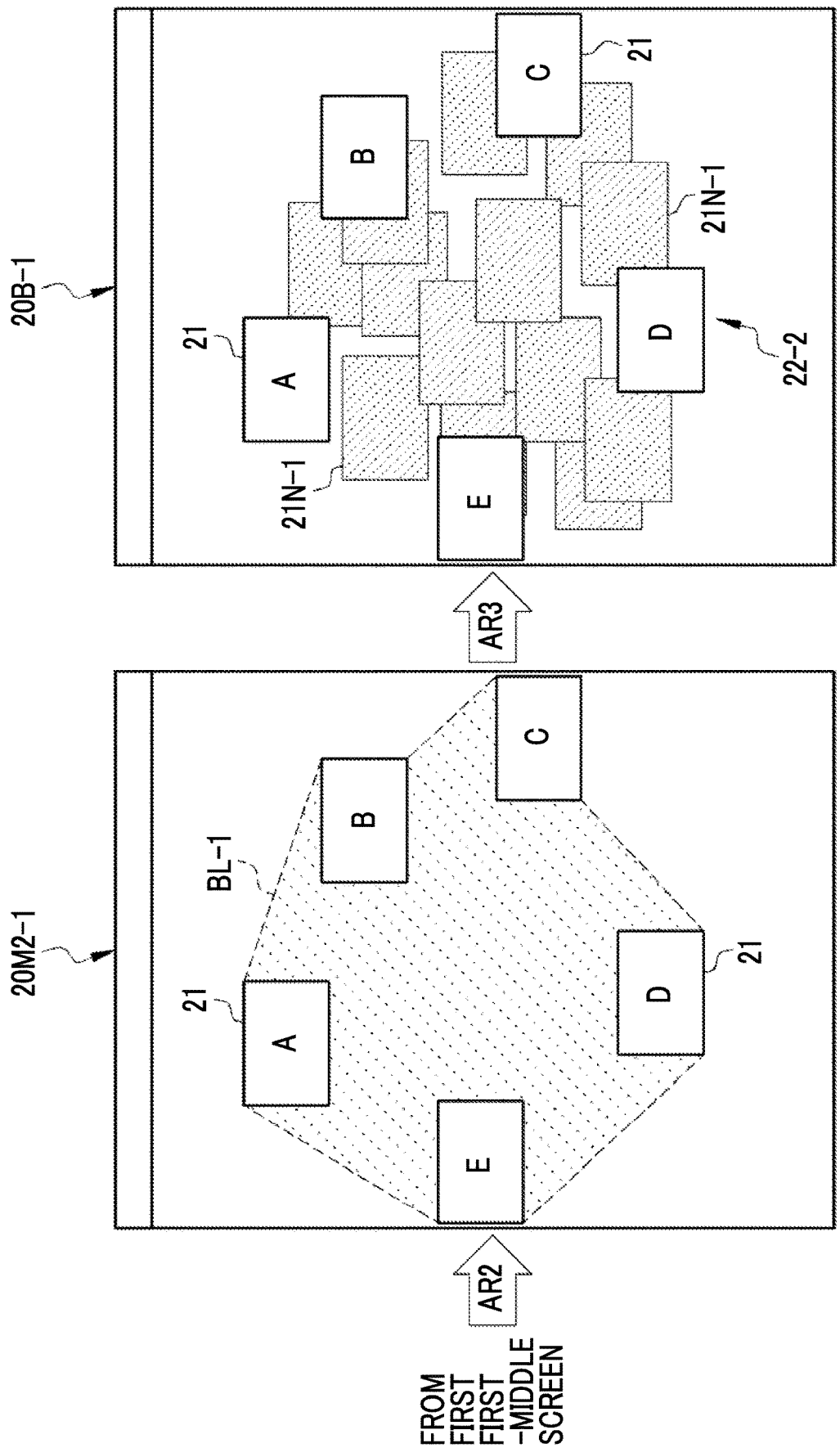
FIG. 12 is a diagram showing a screen change from a first second-middle screen to a first screen after enlargement.
Figure 13:
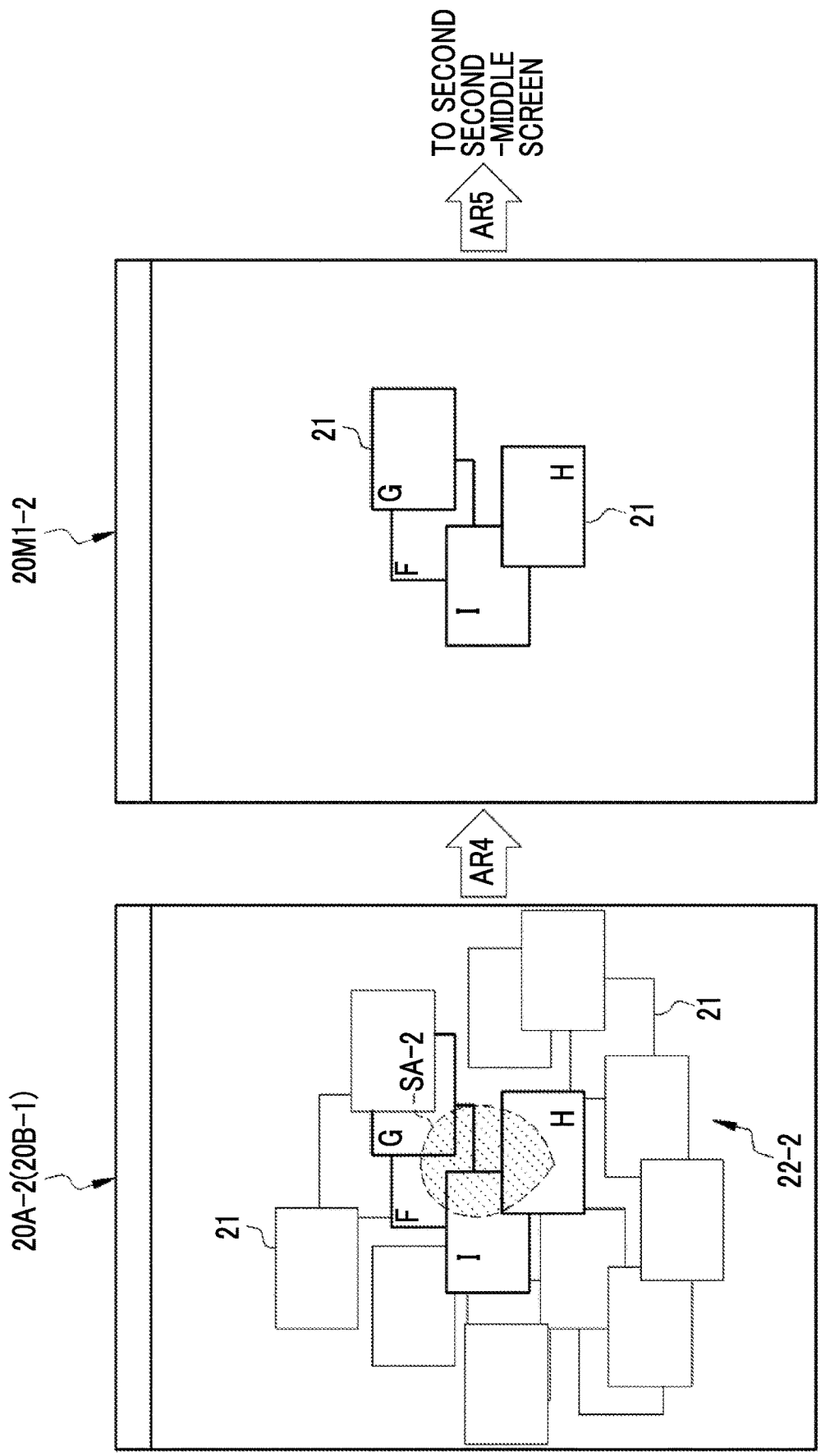
FIG. 13 is a diagram showing a screen change from a second screen before enlargement to a second first-middle screen.

As shown on a left side of an arrow AR4 in FIG. 13, on the first screen after enlargement 20B-1 shown in FIG. 12, for example, a case where a second selection command for selecting a selection area SA-2 including four images 21 of F, G, H, and I is present is considered. In this case, the screen editing section 53 handles the first screen after enlargement 20B-1 shown in FIG. 12 as a second screen before enlargement 20A-2. Further, the screen editing section 53 changes the screen to a second first-middle screen 20M1-2 obtained by leaving the four images 21 of F to I in the selection area SA-2 as shown on a right side of the arrow AR4 and deleting the images 21 outside the selection area SA-2.

Figure 14:
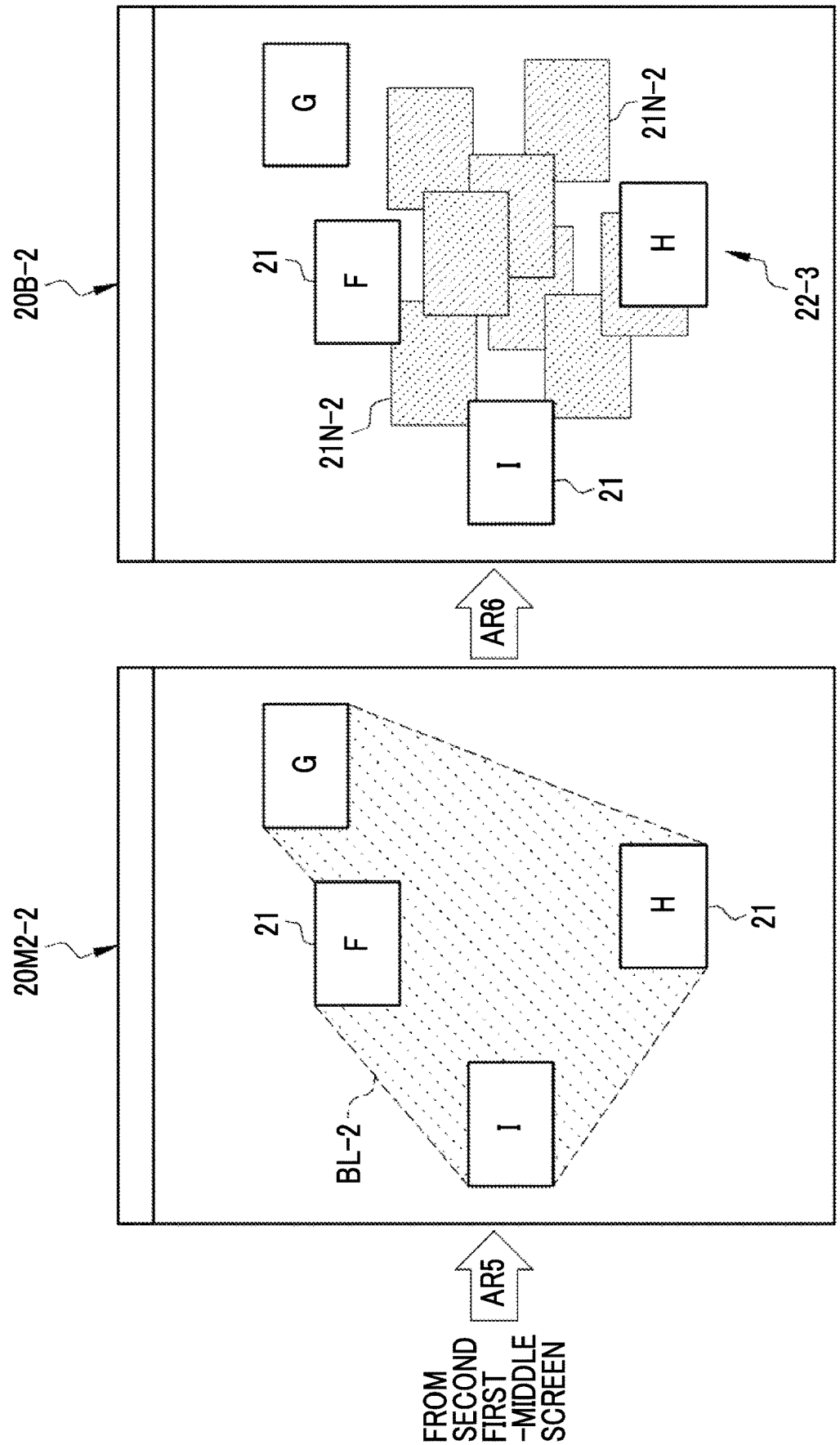
FIG. 14 is a diagram showing a screen change from a second second-middle screen to a second screen after enlargement.

Further, as shown on a right side of an arrow AR5 in FIG. 14, the screen editing section 53 changes the screen to a second second-middle screen 20M2-2 on which an interval between the four images 21 of F to I in the selection area SA-2 is enlarge-displayed in a state where a relative positional relationship therebetween on the first map 22-2 is secured, and then, changes the screen to a second screen after enlargement 20B-2 as shown on a right side of an arrow AR6. The second screen after enlargement 20B-2 has a first map 22-3 on which new images 21N-2 that are images 21 in the selection area SA-2 that have not been displayed on the second screen before enlargement 20A-2 are displayed as blanks BL-2 generated on the second second-middle screen 20M2-2. Further, the size of the image 21 on the second screen after enlargement 20B-2 is the same as that of the second screen before enlargement 20A-2. As described above, in a case where the reception section 51 receives a selection command a plurality of times, the screen editing section 53 performs a screen change from the screen before enlargement 20A to the screen after enlargement 20B in accordance with the plurality of times of selection commands.

The screen editing section 53 performs a screen change for changing the screen before enlargement 20A in FIG. 11 or FIG. 13 to the screen after enlargement 20B in FIG. 12 or FIG. 14 through the first-middle screen 20M1 and the second-middle screen 20M2 for two or three seconds, for example. Further, the screen editing section 53 performs a screen change for changing the screen before enlargement 20A to the screen after enlargement 20B through the first-middle screen 20M1 and the second-middle screen 20M2 in a continuous animation form. Accordingly, an animation for causing the center of the selection area SA to match the origin of the coordinate axes 23 to 26 by moving the images 21 in the selection area SA and an animation for enlarging an interval between the moved images 21 in the selection area SA to be spread in the first map 22 are inserted between the first-middle screen 20M1 and the second-middle screen 20M2.

By receiving the plurality of times of selection commands as described above and performing a plurality of times of screen changes from the first screen before enlargement 20A-1 shown in FIG. 11 to the first screen after enlargement 20B-1 shown in FIG. 12 and the second screen after enlargement 20B-2 shown in FIG. 14, the images 21 of the clothes CL displayed on the first map 22 are gradually narrowed down. Further, on the first map 22-3 of the second screen after enlargement 20B-2, the images 21 of the clothes CL suitable for a sensible preference of the user 15 are left. In FIGS. 11 to 14, only frames of the images 21 for avoiding complication are displayed, and the clothes CL are not shown. This is similarly applied to the following description.

In this embodiment, a set number of times for the number of times of reception of the selection command is 3. Accordingly, even in the second screen after enlargement 20B-2, a third selection command may be received. In a case where the third selection command is received, the reception section 51 outputs the fact to the screen output controller 50 as described above. In a case where an instruction indicating that the third selection command is received through the reception section 51 is output, the screen output controller 50 performs switching from the first map 22-3 of the second screen after enlargement 20B-2 to the second map 27.

Specifically, as shown on a left side of an arrow AR7 in FIG. 15, in the second screen after enlargement 20B-2 shown in FIG. 14, in a case where a third selection command for selecting a selection area SA-3 including four images 21 of J, K, L, and M is present, for example, as shown on a right side of the arrow AR7, the screen output controller 50 changes the map displayed on the retrieval screen 20 to the second map 27.

On the second map 27, four images 21 of J to M in the selection area SA-3 are placed in a descending order of prices from the left. Here, a case where the price of the clothes CL of the image 21 of M is the highest and the price of the clothes CL of the image 21 of K is the lowest is shown as an example.

In this way, the screen output controller 50 displays the first map 22 until the number of times of reception of the selection command reaches the set number of times, and performs switching from the first map 22 to the second map 27 in a case where the number of times of reception reaches the set number of times, to selectively perform switching between displays of the first map 22 and the second map 27 on the retrieval screen 20.

Figure 16:
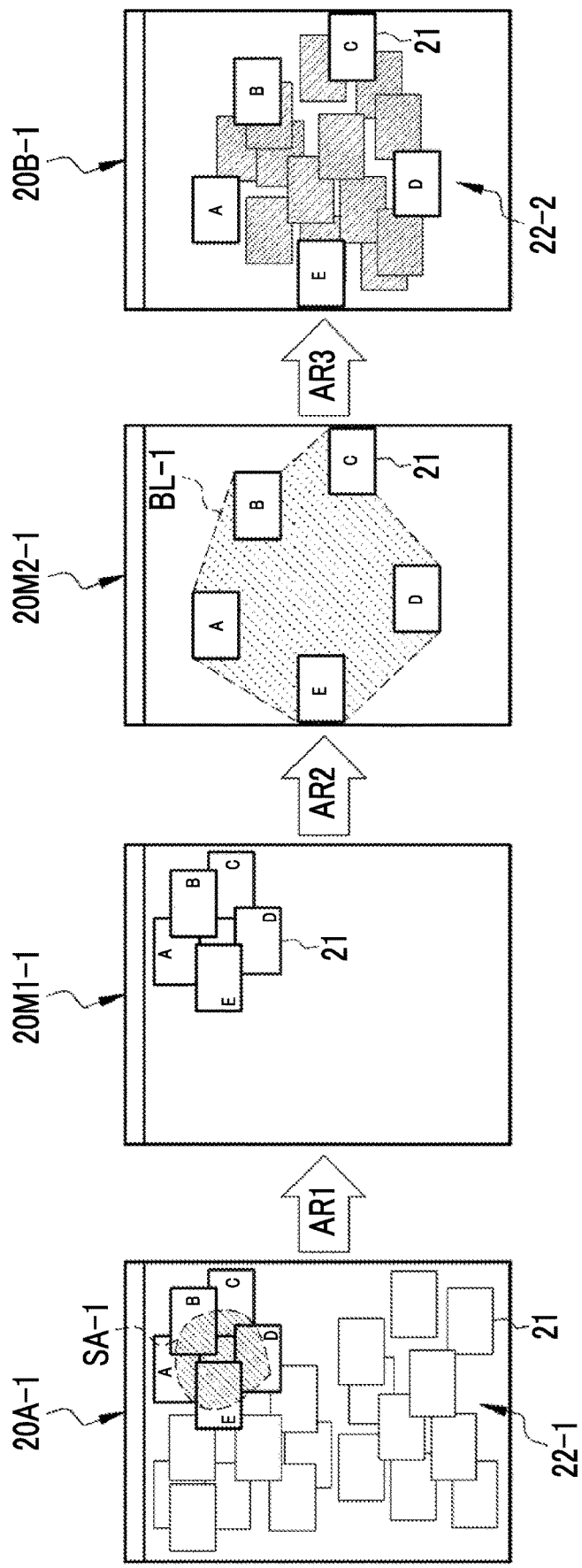
FIG. 16 is a diagram collectively showing a screen change of retrieval screens.
Figure 17:
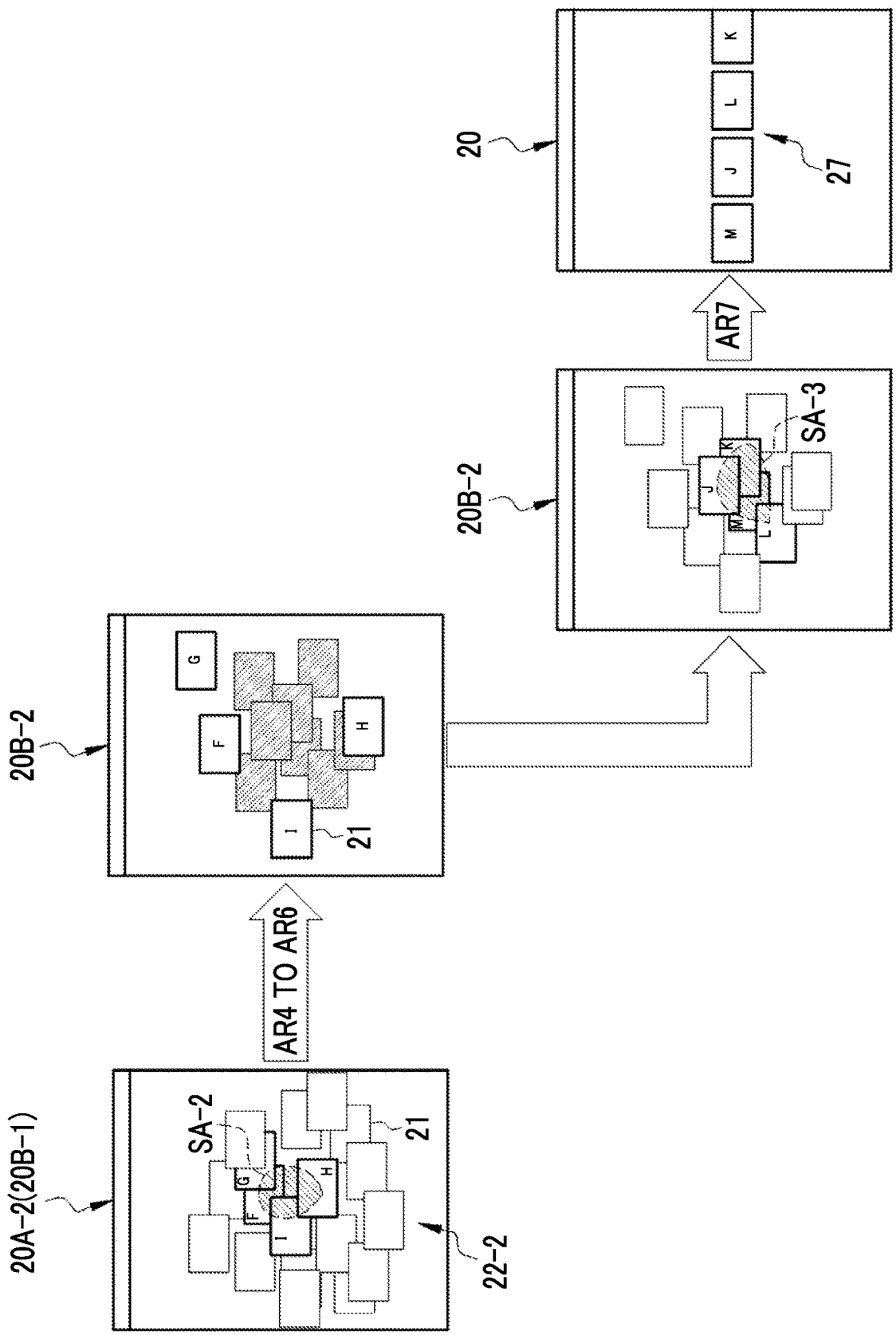
FIG. 17 is a diagram collectively showing a screen change of retrieval screens.

The above-described screen changes of the retrieval screen 20 shown in FIGS. 11 to 15 are collectively shown in FIGS. 16 and 17. That is, as shown in FIG. 16, the first screen before enlargement 20A-1 is changed to the first screen after enlargement 20B-1 through the first first-middle screen 20M1-1 and the first second-middle screen 20M2-1. Then, as shown in FIG. 17, the second screen before enlargement 20A-2 (the first screen after enlargement 20B-1) is changed to the second screen after enlargement 20B-2 through the second first-middle screen 20M1-2 and the second second-middle screen 20M2-2 (both of which are not shown). The second screen after enlargement 20B-2 is changed to the retrieval screen 20 having the second map 27.

Figure 18:
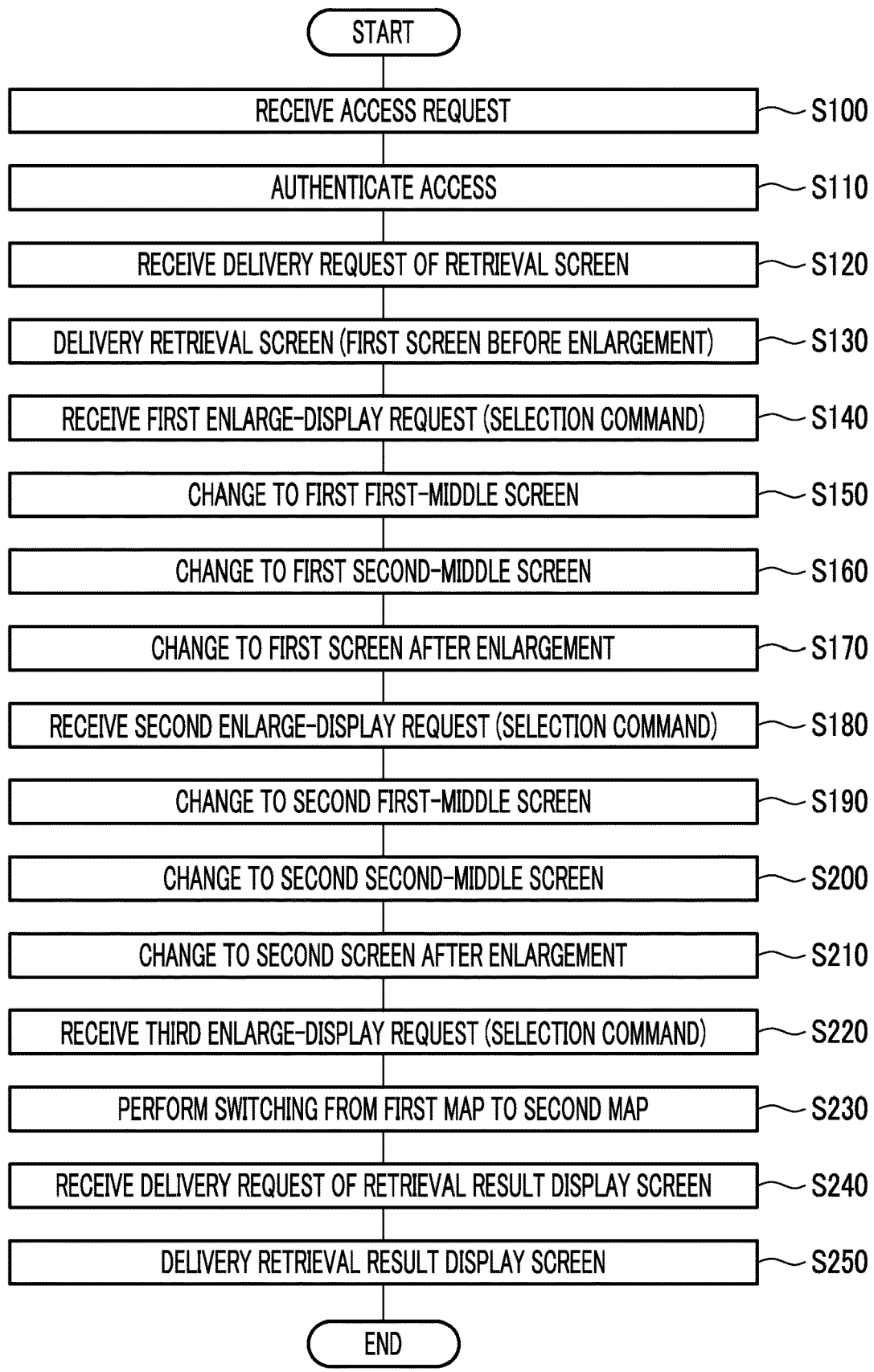
FIG. 18 is a flowchart showing a processing procedure of the content retrieval server.

Hereinafter, an operation based on the above-described configuration will be described with reference to a flowchart shown in FIG. 18. The user 15 operates the client terminal 11 to start a web browser and to display an access authentication screen of a shopping site on the web browser. On the access authentication screen, the user 15 operates the touch panel 14 to input a user ID and a password of the user 15 to perform an access command. Thus, an access request including the input user ID and password is issued to the content retrieval server 12.

In the content retrieval server 12, the access request is received by the reception section 51 (step S100). Further, the user ID and the password of the access request and a user ID and a password stored in the storage device 30B are collated with each other by the authentication section, so that access authentication is performed (step S110).

After the access authentication, the user 15 operates the touch panel 14 to perform a deliver command for the retrieval screen 20. Thus, a delivery request of the retrieval screen 20 is issued to the content retrieval server 12.

In the content retrieval server 12, the delivery request of the retrieval screen 20 is received by the reception section 51 (step S120). Further, in the screen output controller 50, the first screen before enlargement 20A-1 shown in FIG. 11 is generated as the retrieval screen 20, and is delivered to the client terminal 11 (step S130, screen output control step). In the client terminal 11, the first screen before enlargement 20A-1 is displayed on the touch panel 14.

The user 15 views the first screen before enlargement 20A-1 displayed on the touch panel 14. Further, the user 15 traces a desired area SA-1 in the first map 22-1 in which the image 21 of the clothes CL that the user cares about, and performs a selection command for the selection area SA-1. Thus, a first enlarge-display request including information on the selection area SA-1 is issued to the content retrieval server 12.

In the content retrieval server 12, the first enlarge-display request (selection command) is received by the reception section 51 (step S140, command reception step). As shown in FIG. 11, the first screen before enlargement 20A-1 is changed to the first first-middle screen 20M1-1 obtained by deleting the images 21 outside the selection area SA-1 by the screen editing section 53 (step S150, screen editing step). Subsequently, the first first-middle screen 20M1-1 is changed to the first second-middle screen 20M2-1 on which an interval between the images 21 in the selection area SA-1 is enlarge-displayed in a state where a relative positional relationship therebetween on the first map 22-1 is secured, as shown in FIG. 12 (step S160, screen editing step). Further, the first second-middle screen 20M2-1 is changed to the first screen after enlargement 20B-1 having the first map 22-2 on which new images 21N-1 are displayed in blanks BL-1 generated by enlarging the interval between the images 21, as shown in FIG. 12 (step S170, screen editing step).

The user 15 performs a selection command for the selection area SA-2 on the first screen after enlargement 20B-1, in a similar way to the case of the first screen before enlargement 20A-1. Thus, a second enlarge-display request including information on the selection area SA-2 is issued to the content retrieval server 12.

In the content retrieval server 12, the second enlarge-display request (selection command) is received by the reception section 51 (step S180, command reception step). In a similar to step S150, the first screen after enlargement 20B-1, that is, the second screen before enlargement 20A-2 is changed to the second first-middle screen 20M1-2 as shown in FIG. 13 (step S190, screen editing step). Subsequently, in a similar way to step S160, the second first-middle screen 20M1-2 is changed to the second second-middle screen 20M2-2 as shown in FIG. 14 (step S200, screen editing step). Further, in a similar way to step S170, the second second-middle screen 20M2-2 is changed to the second screen after enlargement 20B-2 as shown in FIG. 14 (step S210, screen editing step).

The user 15 performs a selection command for the selection area SA-3, on the second screen after enlargement 20B-2. Thus, a third enlarge-display request including information on the selection area SA-3 is issued to the content retrieval server 12.

In the content retrieval server 12, the third enlarge-display request (selection command) is received by the reception section 51 (step S220, command reception step). Further, as shown in FIG. 15, the first map 22-3 of the second screen after enlargement 20B-2 is switched to the second map 27 by the screen output controller 50 (step S230).

The user 15 selects a desired image 21 in the second map 27 using the finger F. Thus, a delivery request of a retrieval result display screen is issued to the content retrieval server 12.

In the content retrieval server 12, the delivery request of the retrieval result display screen is received by the reception section 51 (step S240). Further, the retrieval result display screen is generated by the screen output controller 50, and is delivered to the client terminal 11 (step S250). In the client terminal 11, the retrieval result display screen is displayed on the touch panel 14. Hence, the retrieval of the clothes CL using the retrieval screen 20 is terminated.

As shown in FIGS. 11 to 14, since the first-middle screen 20M1 obtained by deleting the images 21 outside the selection area SA and the second-middle screen 20M2 on which an interval between the images 21 in the selection area SA is enlarge-displayed in a state where a relative positional relationship therebetween is secured on the first map 22 are inserted between the screen before enlargement 20A and the screen after enlargement 20B, it is possible to cause the user 15 to have an impression of a difference between the images 21 displayed on the screen before enlargement 20A and new images 21N that newly appear on the screen after enlargement 20B. Accordingly, it is possible to reduce a concern that the user 15 may lose positions of the images 21 on the first map 22 on the screen after enlargement 20B.

Since the first map 22 having the coordinate axes 23 to 26 to which the first attribute information based on sensible evaluations is allocated is used, it is possible to simply retrieve the clothes CL suitable for sensibility of the user 15. Further, since the second map 27 having the coordinate axis 28 to which the second attribute information based on objective evaluations is allocated is used, it is possible to retrieve the clothes CL from an objective viewpoint different from the first map 22 for retrieving the clothes CL from a sensible viewpoint.

In a case where the first attribute information and the second attribute information are mixed on the same map, there is a case where a viewpoint of retrieval is not fixed. In this regard, in this embodiment, the first attribute information and the second attribute information are expressed to be clearly distinguished from each other on the first map 22 and the second map 27. Thus, the viewpoint of retrieval is clearly fixed, and thus, it is possible to prevent the user 15 from being confused.

Since the first map 22 is displayed until the number of times of reception of the selection command in the reception section 51 reaches a set number of times and the first map 22 is switched to the second map 27 in a case where the number of times of reception reaches the set number of times, it is possible to retrieve the clothes CL from an objective viewpoint in a stage where the images 21 of the clothes CL displayed on the first map 22 are relatively narrowed down. Thus, it is possible to perform two-stage retrieval of overall retrieving the clothes CL from a sensible viewpoint and then retrieving desired clothes CL using a pinpoint from an objective viewpoint. Accordingly, it is possible to rapidly retrieve desired clothes CL compared with a case where retrieval is performed only from any one viewpoint.

The first map 22 may be switched to the second map 27 in accordance with the number of images 21, instead of the number of times of reception of the selection command. Specifically, in a case where the number of images 21 including new images 21N in the selection area SA is smaller than a set number, the first map 22 is switched to the second map 27. The set number is set to a value of 5 to 10, for example. For example, in a case where the number of images 21 including new images 21N-1 in the selection area SA-1 is smaller than the set number, the first map 22-1 is switched to the second map 27, without being changed to the first-middle screen 20M-1 and the second-middle screen 20M2-1.

In a case where the first map 22 is switched to the second map 27 in accordance with the number of times of reception of the selection command, the number of images 21 displayed on the second map 27 becomes relatively large according to the selection area SA, and thus, the user 15 may feel that narrowing down is not sufficient. In this regard, in a case where the first map 22-1 is switched to the second map 27 in a case where the number of images 21 including the new images 21N in the selection area SA is smaller than the set number, the number of images 21 displayed on the second map 27 is necessarily smaller than the set number, the user 15 does not feel that narrowing down is insufficient.

Since the images 21 are displayed with the same size on the screen before enlargement 20A and the screen after enlargement 20B, compared with a case where the sizes of the images 21 are different from each other on the screen before enlargement 20A and the screen after enlargement 20B, it is possible to perform natural display without an uncomfortable feeling. Accordingly, it is possible to prevent the user 15 from being confused, and to reduce a concern that the user 15 may lose positions of the images 21 on the first map 22 on the screen after enlargement 20B. Further, compared with a case where the sizes of the images 21 are enlarged on the screen after enlargement 20B, it is possible to enlarge the blanks BL. Thus, it is possible to display a larger number of new images 21N.

The sizes of the images 21 may be differently set on the screen before enlargement 20A and the screen after enlargement 20B. For example, the sizes of the images 21 on the screen after enlargement 20B may be set to be larger than those on the screen before enlargement 20A. Similarly, the sizes of the images 21 on the second map 27 may be set to be larger than those on the first map 22.

The content retrieval server 12 of this embodiment delivers the retrieval screen 20 to the client terminal 11 in accordance with a delivery request from the portable client terminal 11 such as a smartphone or a tablet computer. A display (touch panel 14) provided in the portable client terminal 11 has a relatively small screen size. Thus, in the first map 22, the images 21 of the clothes CL having the same or similar first attribute information are displayed in a multiply overlapping state, and the number of images 21 that cannot be entirely displayed in a non-display state relatively increases.

Accordingly, in this embodiment in which the retrieval screen 20 is delivered to the portable client terminal 11, on the screen after enlargement 20B, there is a large concern that it is difficult to distinguish the images 21 displayed on the screen before enlargement 20A from the new images 21N that newly appear. Accordingly, in a case where the invention is applied to a form in which the retrieval screen 20 is delivered to the portable client terminal 11, it is possible to achieve particularly effective effects.

The client terminal 11 is not limited to such a portable terminal. A desk top or note type personal computer may be used as the client terminal 11.

On the retrieval screen 20, the coordinate axes 23 to 26 of the first map 22 and the coordinate axis 28 of the second map 27 are set not to be displayed, but the coordinate axes 23 to 26 and 28 may be set to be displayed. In this case, for example, scales of numerical values may be displayed onto the coordinate axes 23 to 26. Further, for example, characters "high" indicating a high price are displayed on a left side of the coordinate axis 28, and characters "low" indicating a low price are displayed on a right side thereof.

Second Embodiment

Figure 19:
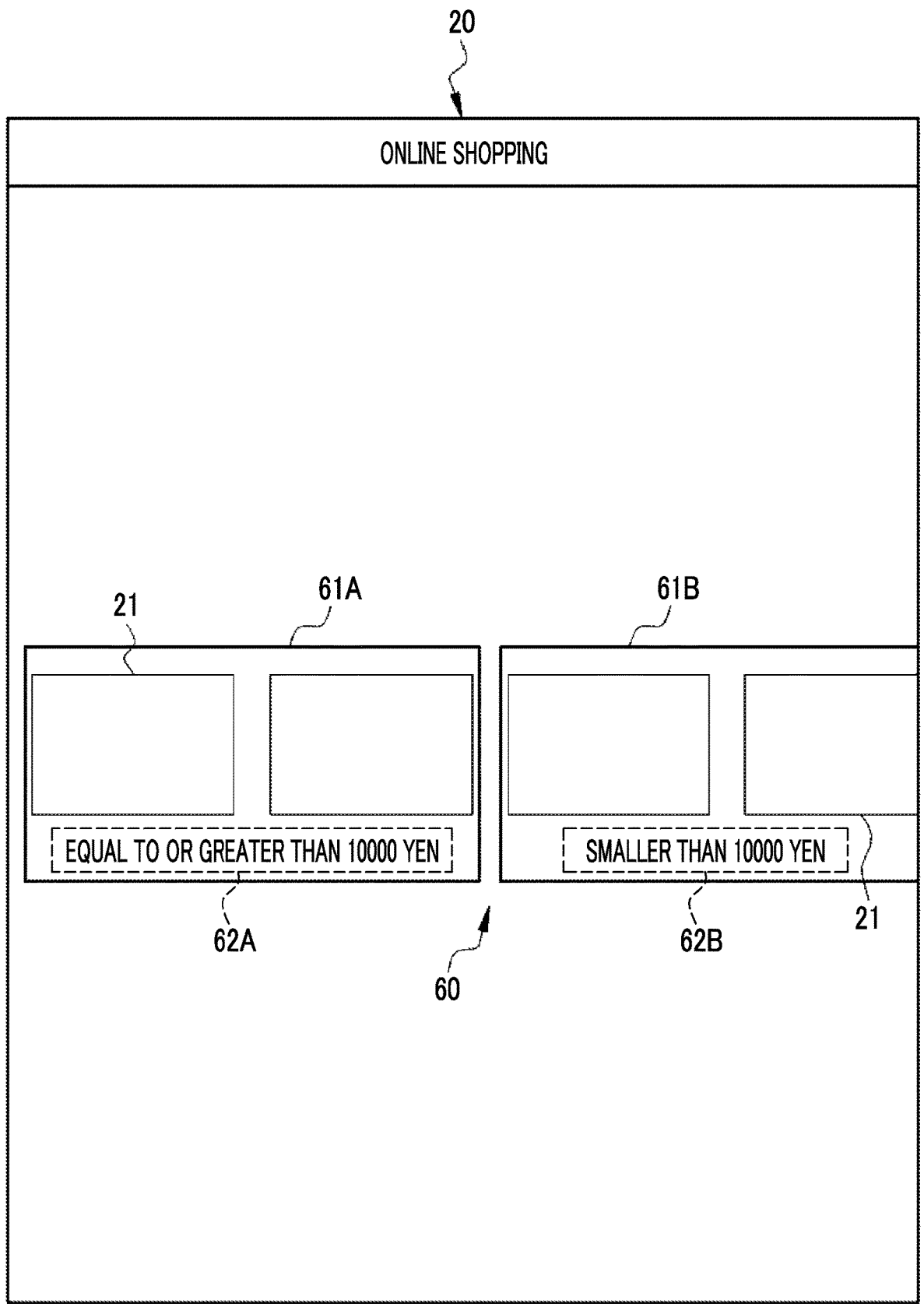
FIG. 19 is a diagram showing a second map according to a second embodiment.

In a second embodiment shown in FIG. 19, the images 21 of the clothes CL are displayed in such a form that a group in a range where objective evaluations indicated by the second attribute information are the same is distinguishable.

FIG. 19 shows a second map 60 in a case where a group in a range where objective evaluations indicated by the second attribute information are the same is divided into a group in which the price is equal to or greater than 10000 yen and a group in which the prices is smaller than 10000 yen. The screen output controller 50 surrounds the images 21 of the clothes CL by frames 61A and 61B for each group, and displays titles 62A and 62B of the groups in the frames 61A and 61B, so that the respective groups are displayed in a distinguishable display form.

In this way, since the images 21 of the clothes CL are displayed in such a form that groups in a range where the objective evaluations indicated by the second attribute information are the same are distinguishable, it is possible to cause the user 15 to easily find clothes CL having a desired price range.

As a method for displaying each group in a distinguishable display form, a method for displaying the images 21 in the same group with the same brightness or tone, a method for providing a line orthogonal to the coordinate axis 28 in a boundary between the respective groups, or a method for providing blanks in the boundary between the respective groups, in addition to or instead of the frames 61 and the titles 62 shown in FIG. 19, may be employed.

Further, the groups are not limited to two of the group in which the price shown in FIG. 19 is equal to or greater than 10000 yen and the group in which the price is smaller than 10000 yen. For example, the groups may be two or more groups, for example, a group in which the price is smaller than 5000 yen, a group in which the price is equal to or greater than 5000 yen and smaller than 10000 yen, and a group in which the price is equal to or greater than 10000 yen.

Third Embodiment

Figure 20:
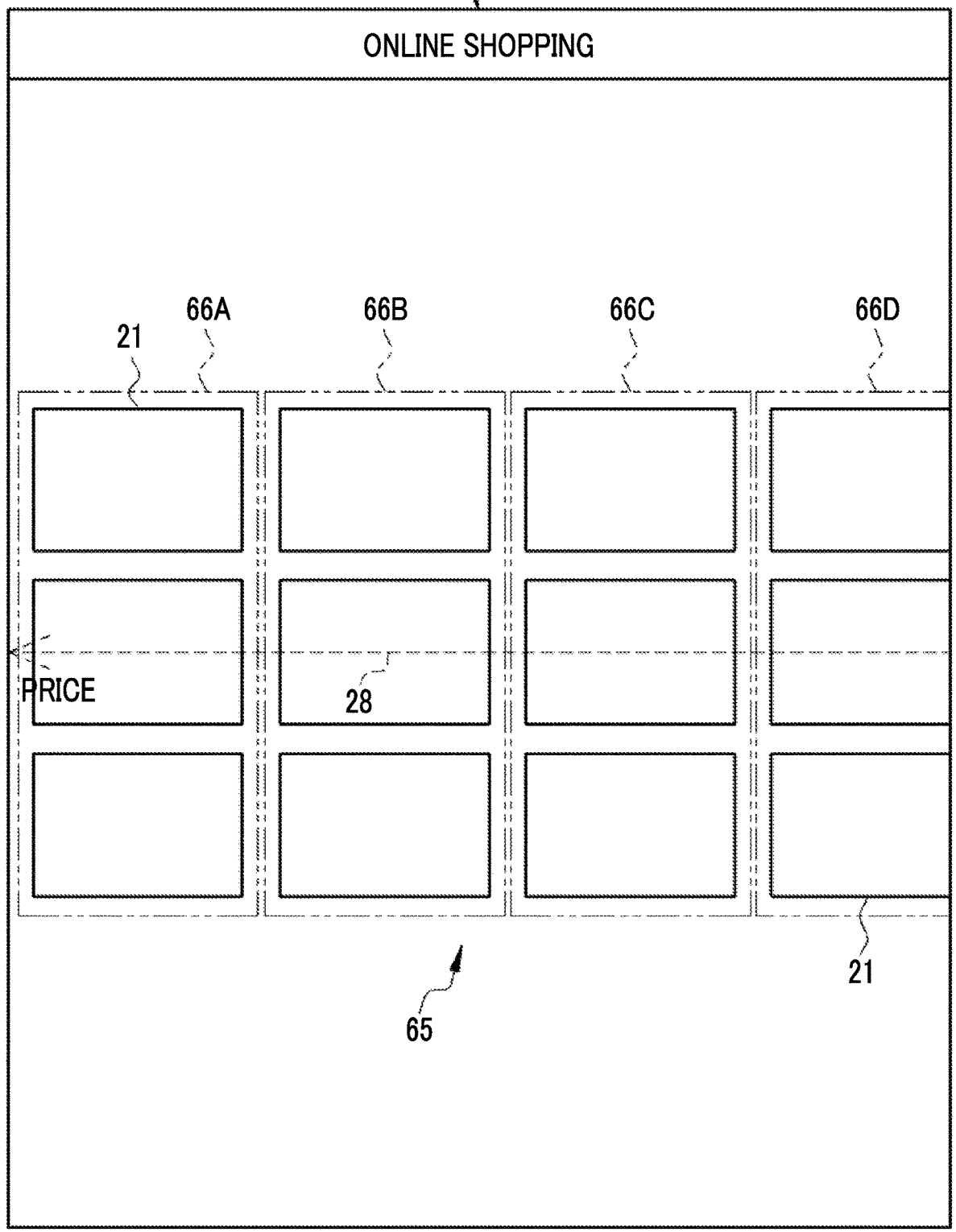
FIG. 20 is a diagram showing a second map according to a third embodiment.

In the above-described respective embodiments, the second maps 27 and 60 on which the images 21 of the clothes CL are placed in a line are shown, but in a third embodiment shown in FIG. 20, the second map is provided as a map in which images 21 of clothes CL are placed in a plurality of lines.

In FIG. 20, the screen output controller 50 displays a second map 65 on which images 21 of clothes CL are placed in three lines at positions corresponding to the prices of the second attribute information along the coordinate axis 28. In this case, three images 21 placed in a direction (in this case, a longitudinal direction) orthogonal to the coordinate axis 28, indicated by a double-dot chain line and a sign 66A, 66B, 66C, or 66D correspond to a group in a range where objective evaluations indicated by the second attribute information are the same, for example, a group in a range where prices of the clothes CL are the same or price ranges of the clothes CL are the same, for example.

In this way, since the second map 65 on which the images 21 of the clothes CL are placed in a plurality of lines at positions corresponding to the second attribute information, along one coordinate axis 28 is displayed, it is possible to increase the number of images 21 capable of being displayed at one time compared with the second maps 27 and 60 in the above-described respective embodiments. Thus, it is possible to reduce the number of images 21 not to be displayed, and thus, it is possible to view all the images 21 without a swipe operation or through a small swipe operation.

Further, since the images 21 of the clothes CL in the group in the range where the objective evaluations indicated by the second attribute information are the same are placed in the direction orthogonal to the coordinate axis 28, as in the second embodiment, it is possible to cause the user 15 to recognize that the clothes CL of the images 21 placed in the direction orthogonal to the coordinate axis 28 belong to the same group, without displaying the respective groups in a distinguishable display form.

Figure 21:
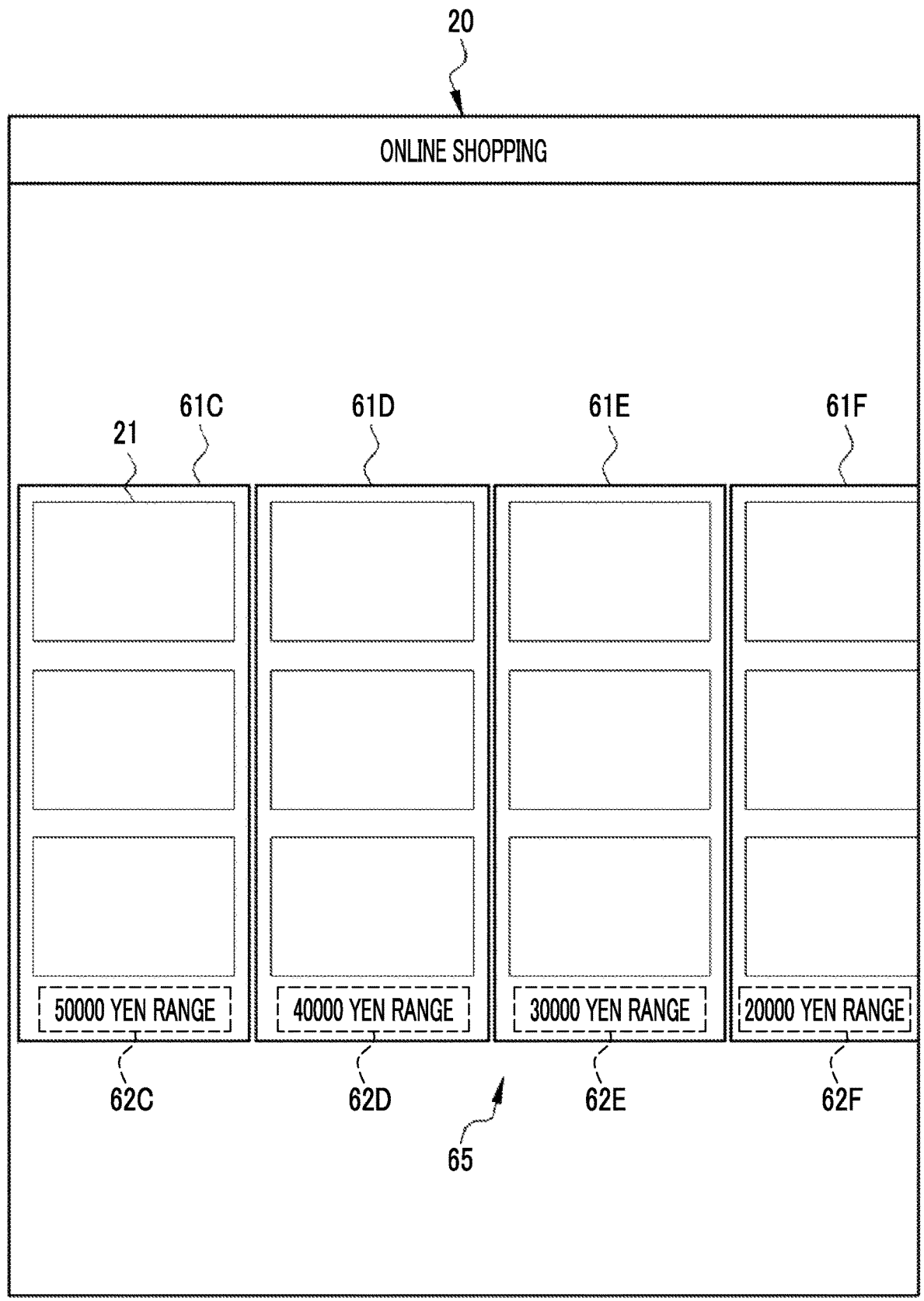
FIG. 21 is a diagram showing a second map executed according to a combination of the second embodiment and the third embodiment.

The number of lines of the images 21 of the clothes CL is not limited to three shown in FIG. 20, and may be two or three or more. Further, as shown in FIG. 21, frames 61C, 61D, 61E, and 61F of respective groups and titles 62C, 62D, 62E, and 62F of the respective groups may be displayed by applying the second embodiment. In FIG. 21, four groups in which the price is a 50000 yen range, a 40000 yen range, a 30000 yen range, and a 20000 yen range are shown. In this case, it is possible to cause the user 15 to clearly recognize that the clothes CL of the images 21 placed in the direction orthogonal to the coordinate axis 28 belong to the same group.

Fourth Embodiment

In the first embodiment, a configuration in which the first map 22 is displayed until the number of times of reception of a selection command reaches a set number of times and the first map 22 is switched to the second map 27 in a case where the number of times of reception reaches the set number of times has been described. However, in a fourth embodiment shown in FIGS. 22 to 25, the screen output controller 50 displays a map switching user interface (hereinafter, referred to as a user interface (UI)) for display switching between the first map 22 and the second map 27 on the retrieval screen 20, and enables display switching between the first map 22 and the second map 27 through an operation of the user 15. Further, the screen output controller 50 displays the map switch UI on a screen after enlargement 20B displayed after a selection command is received at least one time by the reception section 51.

Figure 22:
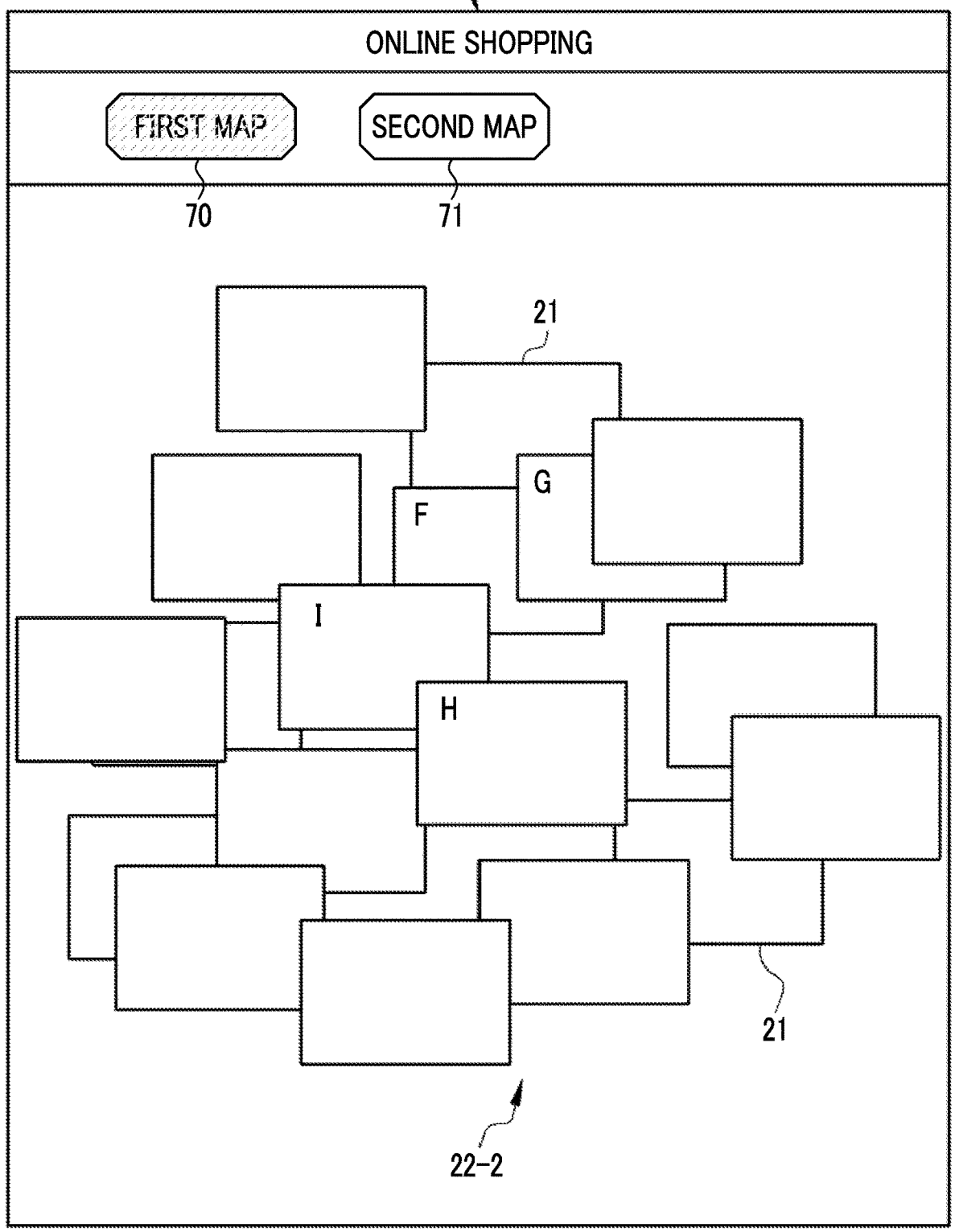
FIG. 22 is a diagram showing a screen after enlargement in which a first map switch button and a second map switch button are displayed.

FIG. 22 shows an example in which a first map switch button 70 and a second map switch button 71 are displayed as the map switch UI on a first screen after enlargement 20B-1 shown in FIG. 12. The first screen after enlargement 20B-1 is a screen changed from a first screen before enlargement 20A-1 after a first selection command is received by the reception section 51, and corresponds to the screen after enlargement 20B displayed after the selection command is received at least one time by the reception section 51.

Figure 23:
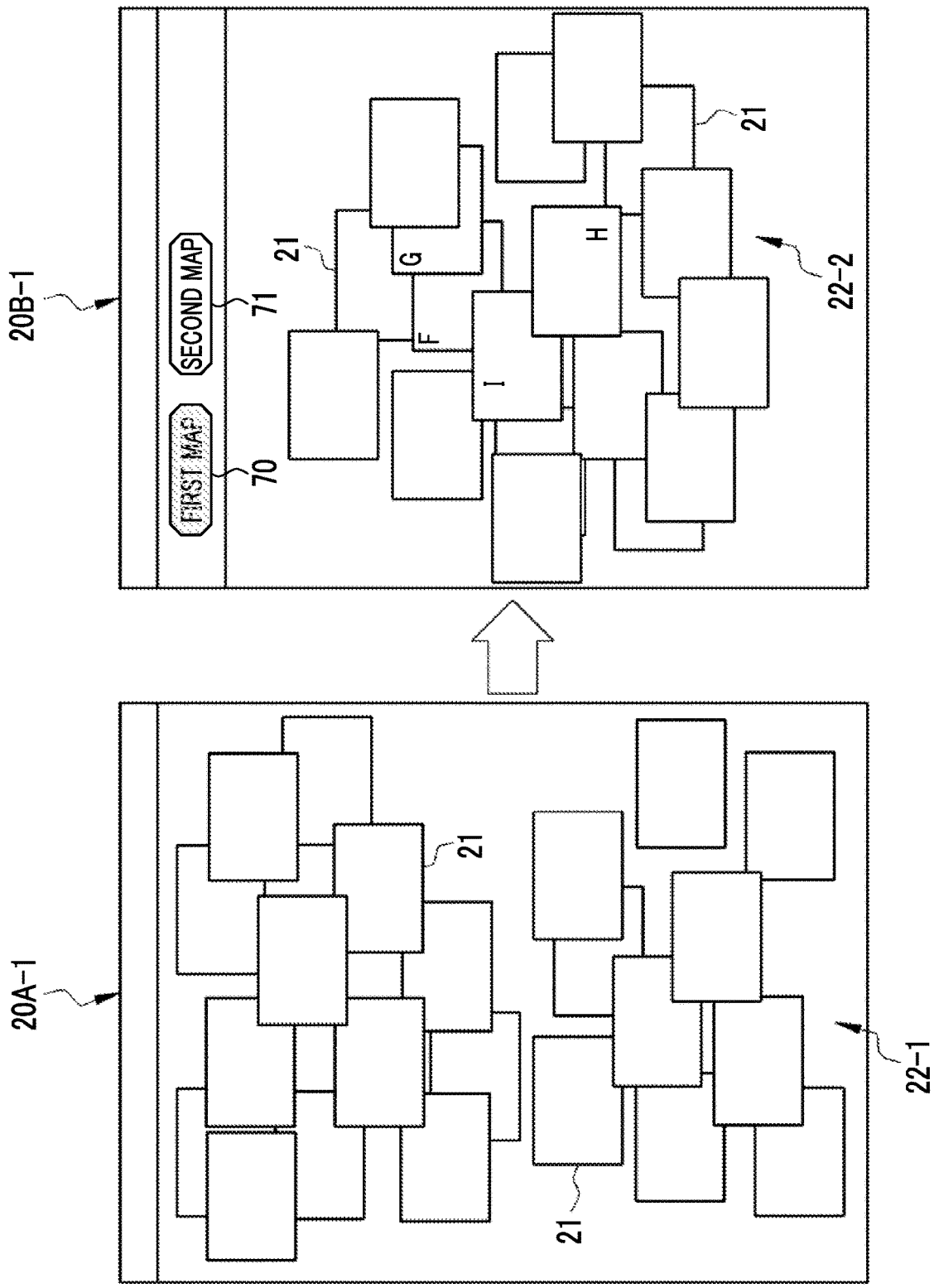
FIG. 23 is a diagram showing a screen change from an initial screen before enlargement to a first screen after enlargement, according to a fourth embodiment.

As shown in FIG. 23, the first map switch button 70 and the second map switch button 71 are not displayed on the first screen before enlargement 20A-1, but initially appear on the first screen after enlargement 20B-1. In a state where the screen is changed to the first screen after enlargement 20B-1, the first map switch button 70 is selected, and thus, a first map 22-2 is displayed. The images 21 include four images 21 of F to I selected through a second selection command in the first embodiment. In FIG. 23, screen changes of the first-middle screen 20M1-1 and the second-middle screen 20M2-1 are not shown.

Figure 24:
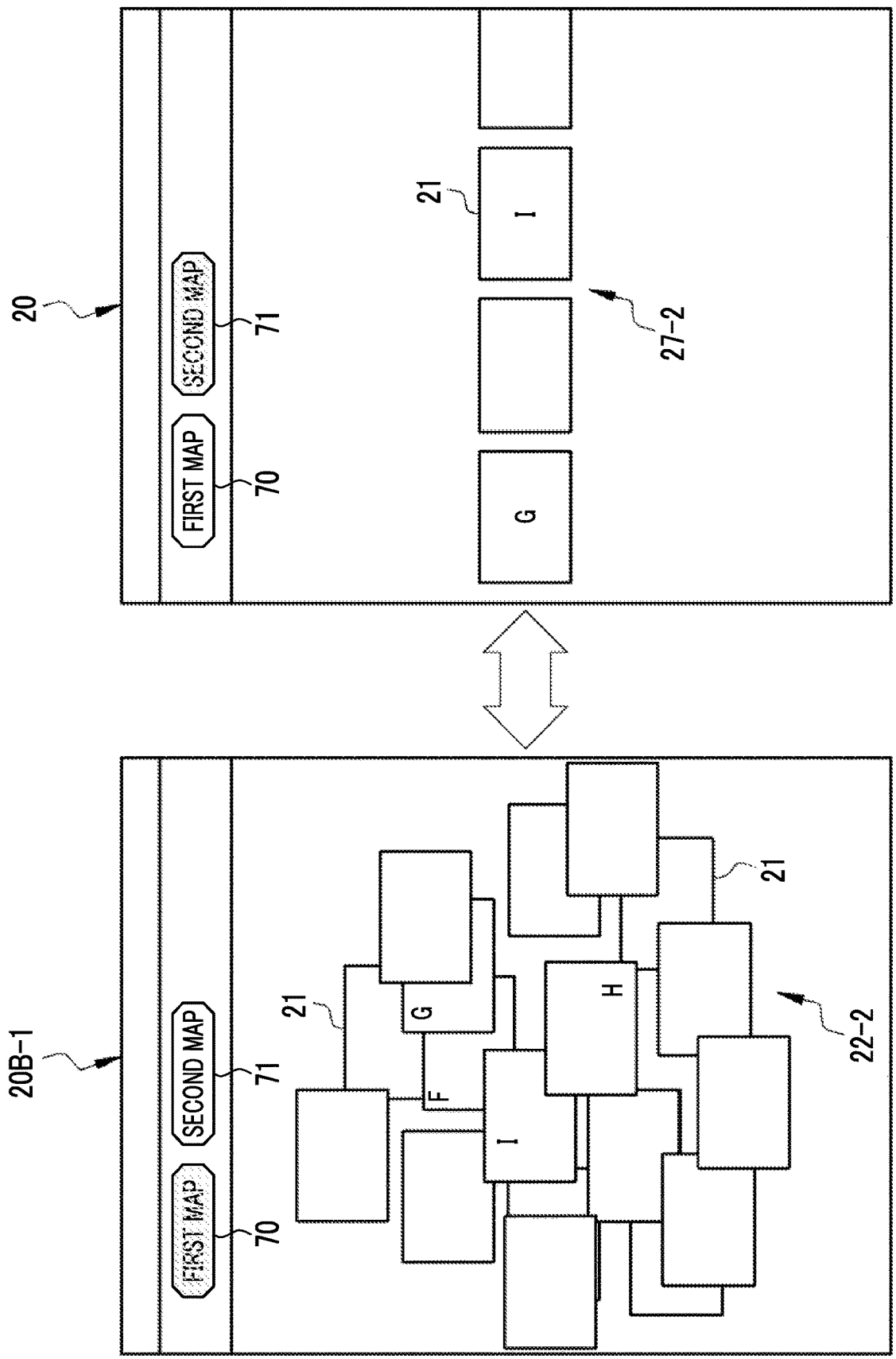
FIG. 24 is a diagram showing screen switching between selection states of the first map switch button and the second map switch button.

On a left side of a two-directional arrow in FIG. 24, the first screen after enlargement 20B-1 that is the same as in FIG. 22 is shown. In a case where the second map switch button 71 is selected on the first screen after enlargement 20B-1, as shown on a right side of the two-directional arrow, the first map 22-2 is switched to a second map 27-2. All images 21 other than the four images 21 of F to I displayed on the first map 22-2, in addition to the previous four images 21 of F to I (display only images 21 of G and I), are displayed on the second map 27-2. Contrarily, in a case where the first map switch button 70 is selected on the retrieval screen 20 on the right side of the two-directional arrow, the second map 27-2 is switched to the first map 22-2.

Figure 25:
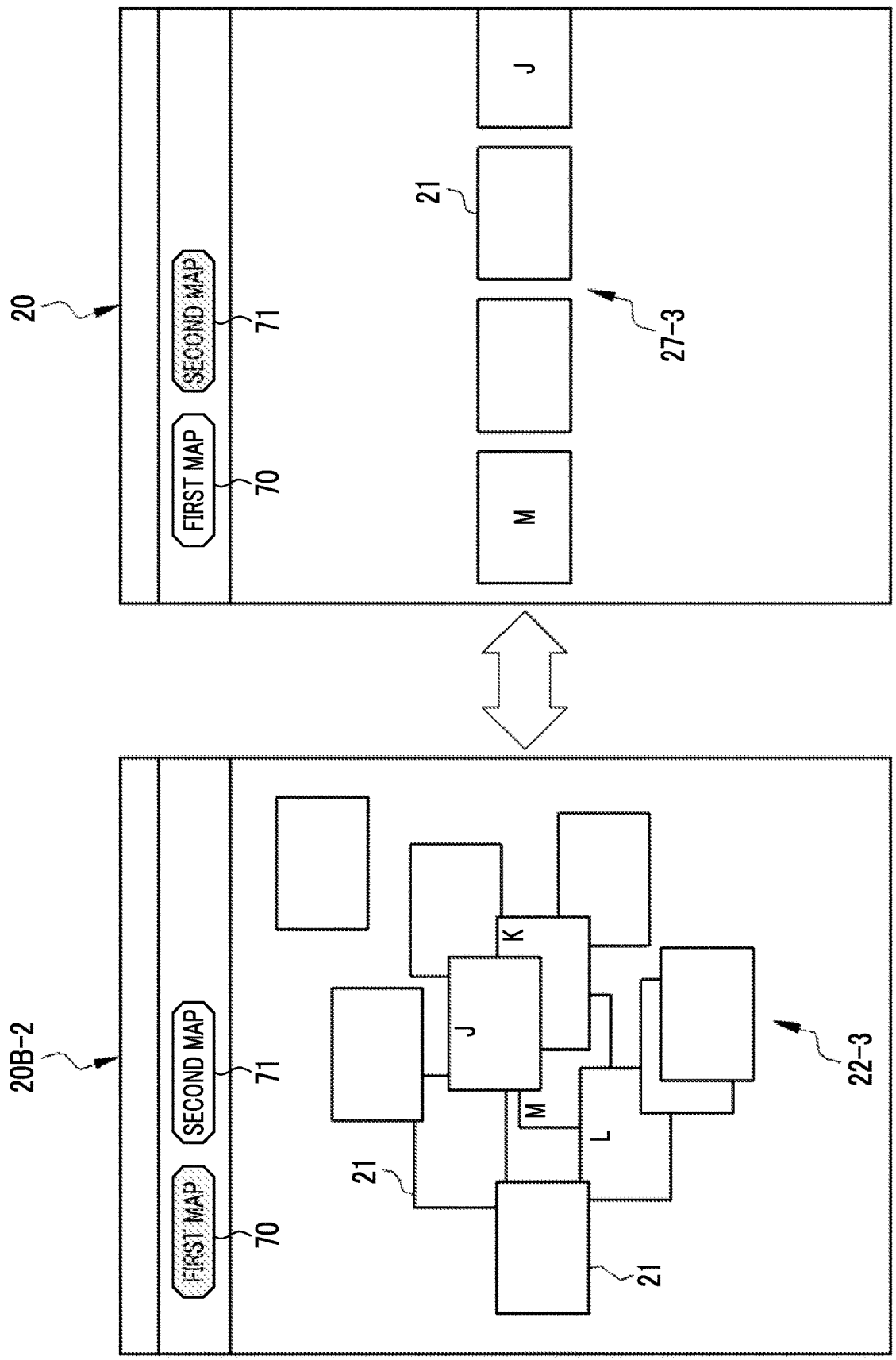
FIG. 25 is a diagram showing another example of screen switching between the selection states of the first map switch button and the second map switch button.

On a left side of a two-directional arrow in FIG. 25, the first map switch button 70 and the second map switch button 71 are displayed on the second screen after enlargement 20B-2 shown in FIG. 14. In a state where the screen is changed to the second screen after enlargement 20B-2, in a similar way to the case of the first screen after enlargement 20B-1, the first map switch button 70 is selected, and thus, a first map 22-3 is displayed. The images 21 include four images 21 of J to M selected by a third selection command in the first embodiment.

In a case where the second map switch button 71 is selected on the second screen after enlargement 20B-2, in a similar way to the case shown in FIG. 24, as shown on the right side of the two-directional arrow, the first map 22-3 is switched to a second map 27-3. On the second map 27-3, all images 21 other than the four images 21 of J to M displayed on the first map 22-3 are also displayed, in addition to the previous four images 21 J to M (displays only the images 21 of M and J). Contrarily, in a case where the first map switch button 70 is selected on the retrieval screen 20 on the right side on the two-directional arrow, in a similar way to the case shown in FIG. 24, the second map 27-3 is switched to the first map 22-3.

As described above, since the first map switch button 70 and the second map switch button 71 are displayed on the retrieval screen 20 using the map switch UI and display switching between the first map 22 and the second map 27 can be performed by an operation of the user 15, even in a case where the selection command is not performed a set number of times, it is possible to perform the display switching on the second map 27 at a time point when the user 15 determines that the images 21 of the clothes CL on the first map 22 are sufficiently narrowed down. Since the number of selection commands is smaller than a set number, it is possible to reduce time necessary for retrieval.

Further, since the first map switch button 70 and the second map switch button 71 are displayed on the screen after enlargement 20B (the first screen after enlargement 20B-1 and the second screen after enlargement 20B-2) displayed after the selection command is received at least one time by the reception section 51, it is possible to perform switching to the second map 27 after the images 21 of the clothes CL are narrowed down to some extent.

The first map switch button 70 and the second map switch button 71 may be displayed on the first screen before enlargement 20A-1, but since the narrowing down of the images 21 is not completely performed on the first screen before enlargement 20A-1, even in a case where the switching to the second map 27 is performed, a very large number of images 21 of clothes CL are merely placed. The second map 27 is a screen for finally determining the clothes CL to be purchased by the user 15. For this reason, it is preferable that the number of images 21 displayed on the second map 27 is small. Accordingly, compared with a case where the first map switch button 70 and the second map switch button 71 are displayed on the first screen before enlargement 20A-1, a case where the first map switch button 70 and the second map switch button 71 are displayed on the screen after enlargement 20B displayed after the selection command is received at least one time by the reception section 51 is preferable.

The first map switch button 70 and the second map switch button 71 may be displayed on the screen after enlargement 20B after the selection command is received by the reception section 51 a set number of times (for example, two times). Further, a configuration in which the first map switch button 70 and the second map switch button 71 are displayed from the first screen before enlargement 20A-1 is shown, but a configuration in which the first map switch button 70 and the second map switch button 71 are not first selectable and are then selectable after the selection command is received a set number of times by the reception section 51 may be used.

Fifth Embodiment

In the fourth embodiment, a case where the second attribute information is one type of information that is the price of the clothes CL is shown as an example, but in a fifth embodiment shown in FIGS. 26 to 29, a case where the second attribute information includes a plurality of types of information will be described.

Figure 26:
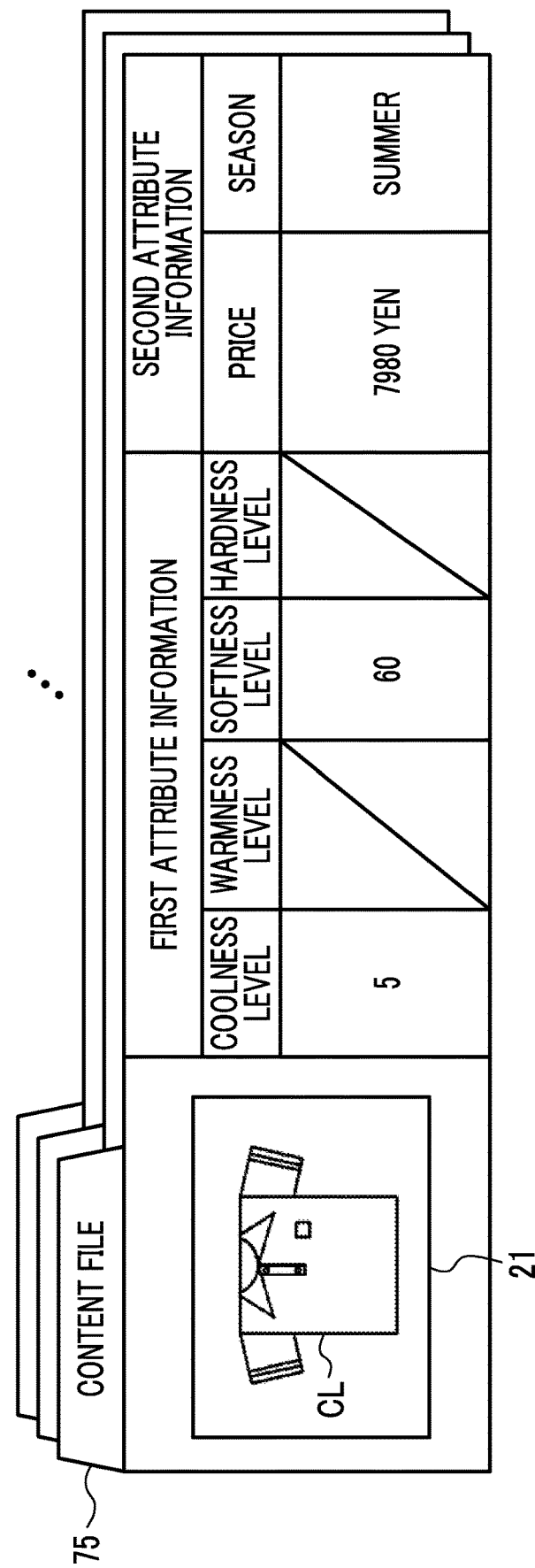
FIG. 26 is a diagram showing a content file according to a fifth embodiment in which a plurality of types of second attribute information are present.

In FIG. 26, in a content file 75 of the fifth embodiment, seasons for wearing the clothes CL are registered as second attribute information, in addition to the price according to the above-described embodiment.

Figure 27:
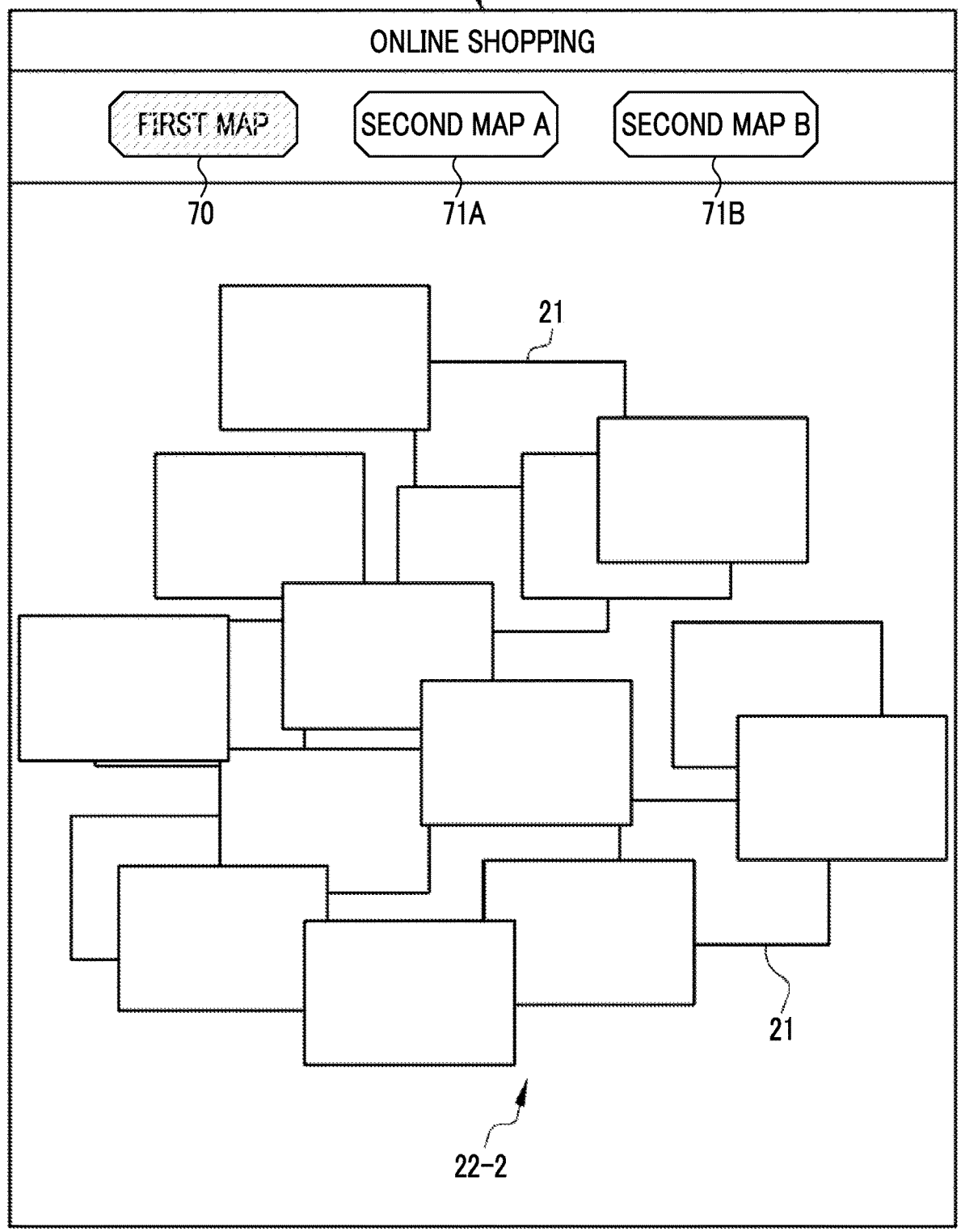
FIG. 27 is a diagram showing a screen after enlargement in which two second map switch buttons are displayed.

In this case, as shown in FIG. 27, the first map switch button 70 and two second map switch buttons 71A and 71B are displayed on the first screen after enlargement 20B-1. The second map switch button 71A is a button for switching a first map 22-2 to a second map 27A (see FIG. 29) having a coordinate axis 28A (see FIG. 29) to which the price is allocated, in a similar way to the second map switch button 71 of the fourth embodiment. "A" is attached to the second map 27A for ease of description, but the second map 27A is the same as the second map 27 having the coordinate axis 28 to which the price is allocated, shown in FIG. 4 or the like in the first embodiment.

Figure 28:
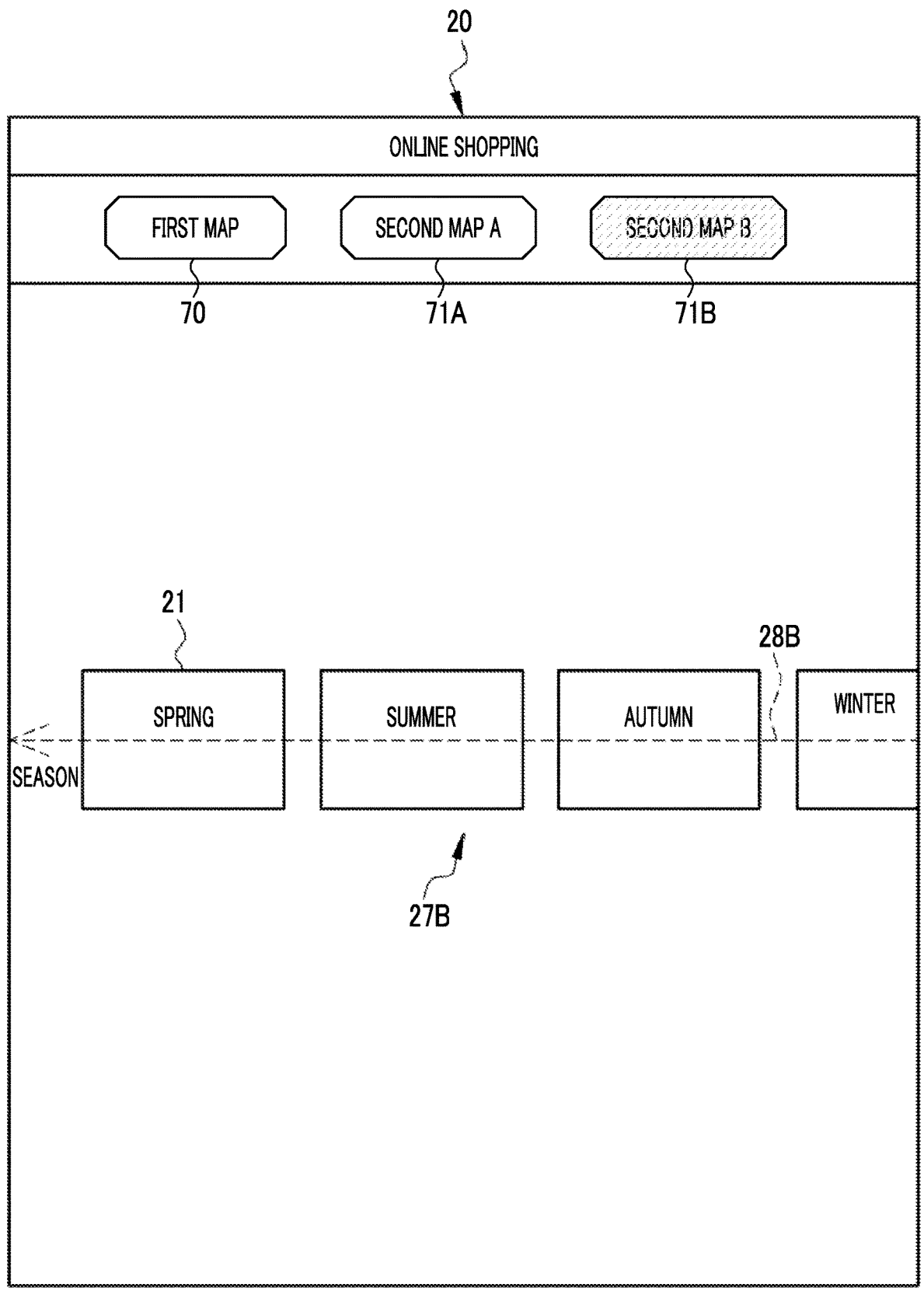
FIG. 28 is a diagram showing a retrieval screen having a second map with a coordinate axis on which seasons of the second attribute information are allocated.

On the other hand, the second map switch button 71B is a button for switching the first map 22-2 to a second map 27B shown in FIG. 28. In FIG. 28, the second map 27B has a coordinate axis 28B to which seasons are allocated. On the coordinate axis 28B, seasons of spring, summer, autumn, and winter are sequentially set from the left. On the second map 27B, the images 21 of the clothes CL are placed at positions corresponding to the respective seasons, along the coordinate axis 28B. In a case where there is a plurality of pieces of clothes CL for the same season, in a similar way to the second map 27 of the first embodiment, the images 21 of the clothes CL are displayed one by one in a line in a state where the images 21 do not overlap each other, on the second map 27B.

Figure 29:
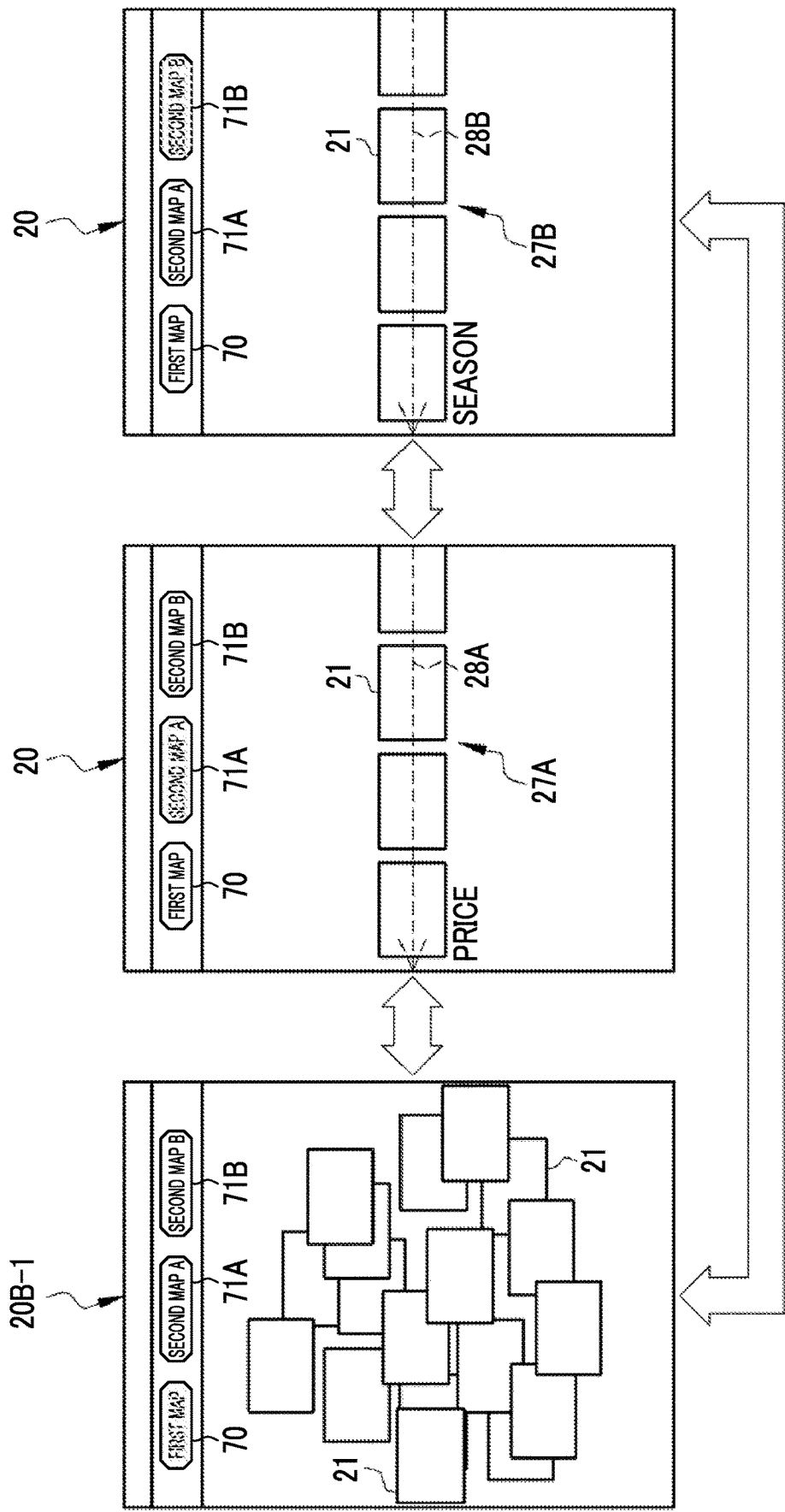
FIG. 29 is a diagram showing screen switching between selection states of the first map switch button and two second map switch buttons.

As shown in FIG. 29, the first screen after enlargement 20B-1 shown on a left side, a retrieval screen 20 having the second map 27A shown at the center, and a retrieval screen 20 having the second map 27B shown on a right side are displayed to be switchable between each other by selecting the first map switch button 70 and the second map switch buttons 71A and 71B. For example, in a case where the second map switch button 71B is selected on the first screen after enlargement 20B-1 sown on the left side, the display is switched to the retrieval screen 20 having the second map 27B shown on the right side. Further, in a case where the first map switch button 70 is selected on the retrieval screen 20 having the second map 27B shown on the right side, the display is switched to the first screen after enlargement 20B-1 shown on the left side.

As described above, in a case where a plurality of types of second attribute information are present, a plurality of types of second map switch button 71 are separately displayed, and a plurality of types of second maps 27 are also separately prepared. Thus, it is possible to smoothly perform switching between the first map 22 and the plurality of types of second maps 27. Further, it is possible to compare the plurality of types of second maps 27 with the eyes, and to provide the plurality of types of second maps 27 in appreciating the clothes CL to be purchased.

As the second attribute information in a case where the content is the clothes CL, types of sleeves such as long sleeves, short sleeves, or three-quarter sleeves, classifications of positions of clothing such as outer, middle, inner, tops, or bottom, and the like may be employed, in addition to the above-mentioned price and season.

In a case where there are a plurality of types of second attribute information, a plurality of coordinate axes may be set on the second map. For example, in a case where the second attribute information corresponds to the price and season according to the fifth embodiment, a second map in which the price is shown on a longitudinal axis and the season is shown on a lateral axis may be generated. In this case, since the second maps 27A and 27B shown in the fifth embodiment are merged into one second map, one second map switch button is used. Further, in the fourth and fifth embodiments, the second map 27 of the first embodiment is shown as an example, but the second map 60 of the second embodiment or the second map 65 of the third embodiment may be used.

Sixth Embodiment

In a sixth embodiment shown in FIGS. 30 to 36, the screen output controller 50 displays a group designation UI for designating a group in a range where objective evaluations indicated by the second attribute information are the same on the retrieval screen 20 having the first map 22. Further, the screen output controller 50 sets display forms of corresponding content that is content corresponding to a group set in the group designation UI and non-corresponding content that is content that does not correspond to the group to be different from each other. Further, the screen output controller 50 displays the group designation UI on the screen after enlargement 20B displayed after a selection command is received at least one time by the reception section 51.

Figures 30, 31:
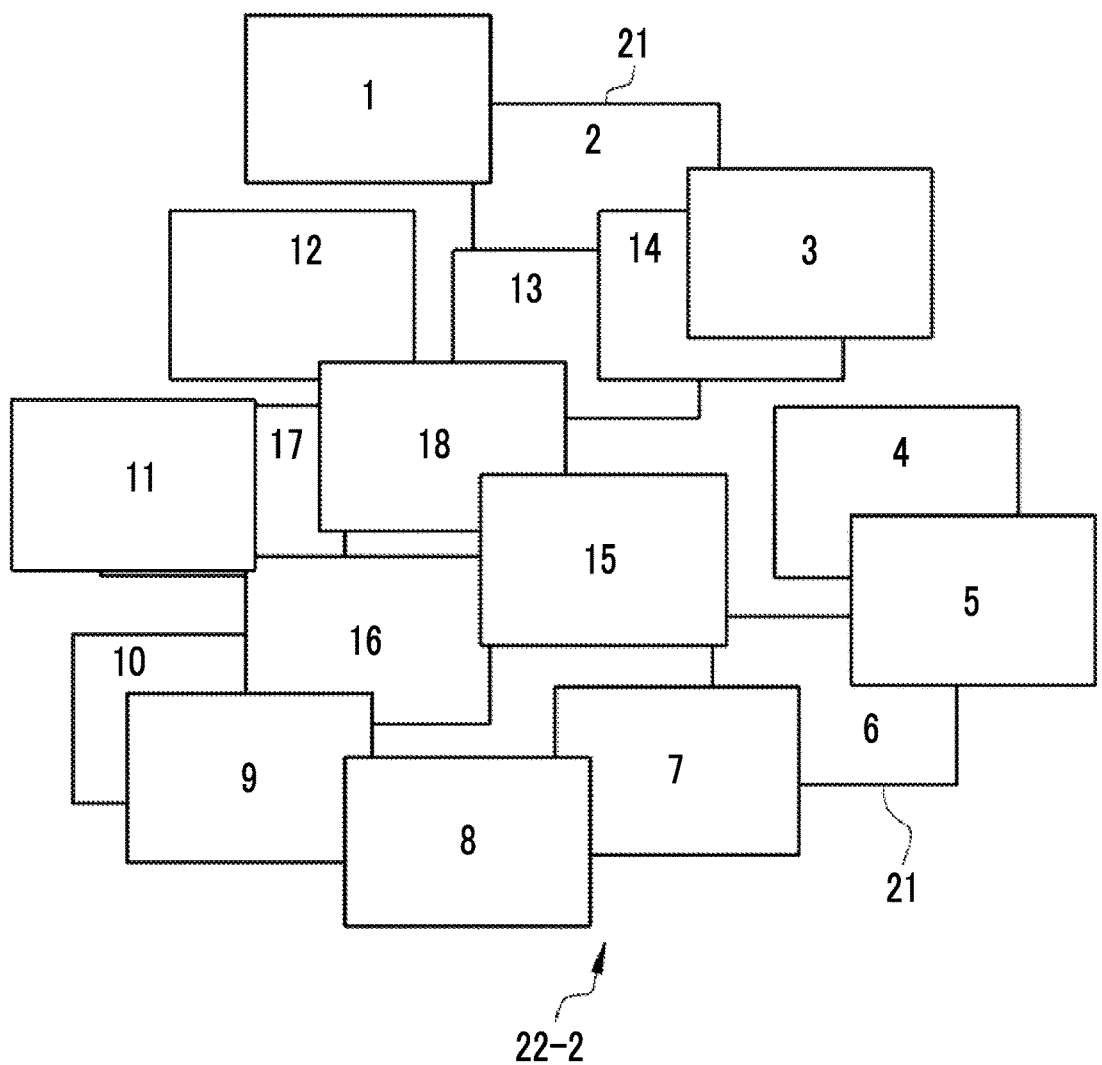
FIG. 30 is a diagram showing a state where numbers of 1 to 18 are attached to images of clothes displayed in a first map on a first screen after enlargement.
FIG. 31 is a table showing groups to which the images of the clothes displayed in the first map on the first screen after enlargement belong.

First, as a premise for description of the sixth embodiment, as shown in FIG. 30, numbers 1 to 18 are given to images 21 of clothes CL displayed on the first map 22-2 of the first screen after enlargement 20B-1 shown in FIG. 12.

Further, as shown in Table 80 in FIG. 31, a group in a range where objective evaluations indicated by the second attribute information are the same is divided into three groups of a group in which the price is smaller than 5000 yen, a group in which the price is equal to or greater than 5000 yen and smaller than 10000 yen, and a group in which the prices is equal to or greater than 10000 yen. Further, it is assumed that images 21 of numbers 2, 7, 9, 14, 17, and 18 belong to the group in which the price is smaller than 5000 yen, images 21 of numbers 1, 3, 5, 8, 11, and 15 belong to the group in which the price is equal to greater than 5000 yen and smaller than 10000 yen, and images 21 of numbers 4, 6, 10, 12, 13, and 16 belong to the group in which the price is equal to or greater than 10000 yen.

Figure 32:
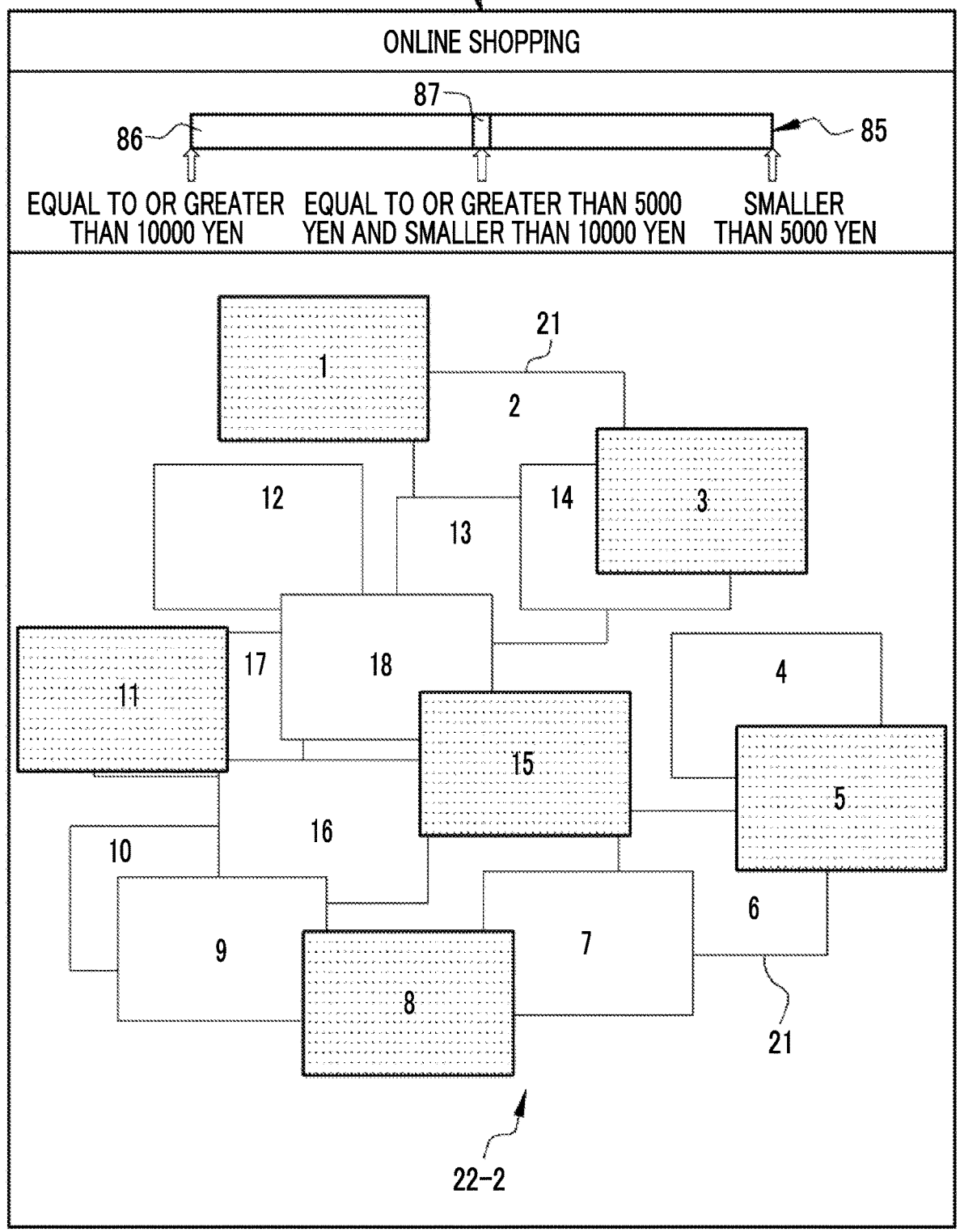
FIG. 32 is a diagram showing a screen after enlargement on which a slide bar is displayed.
Figure 33:
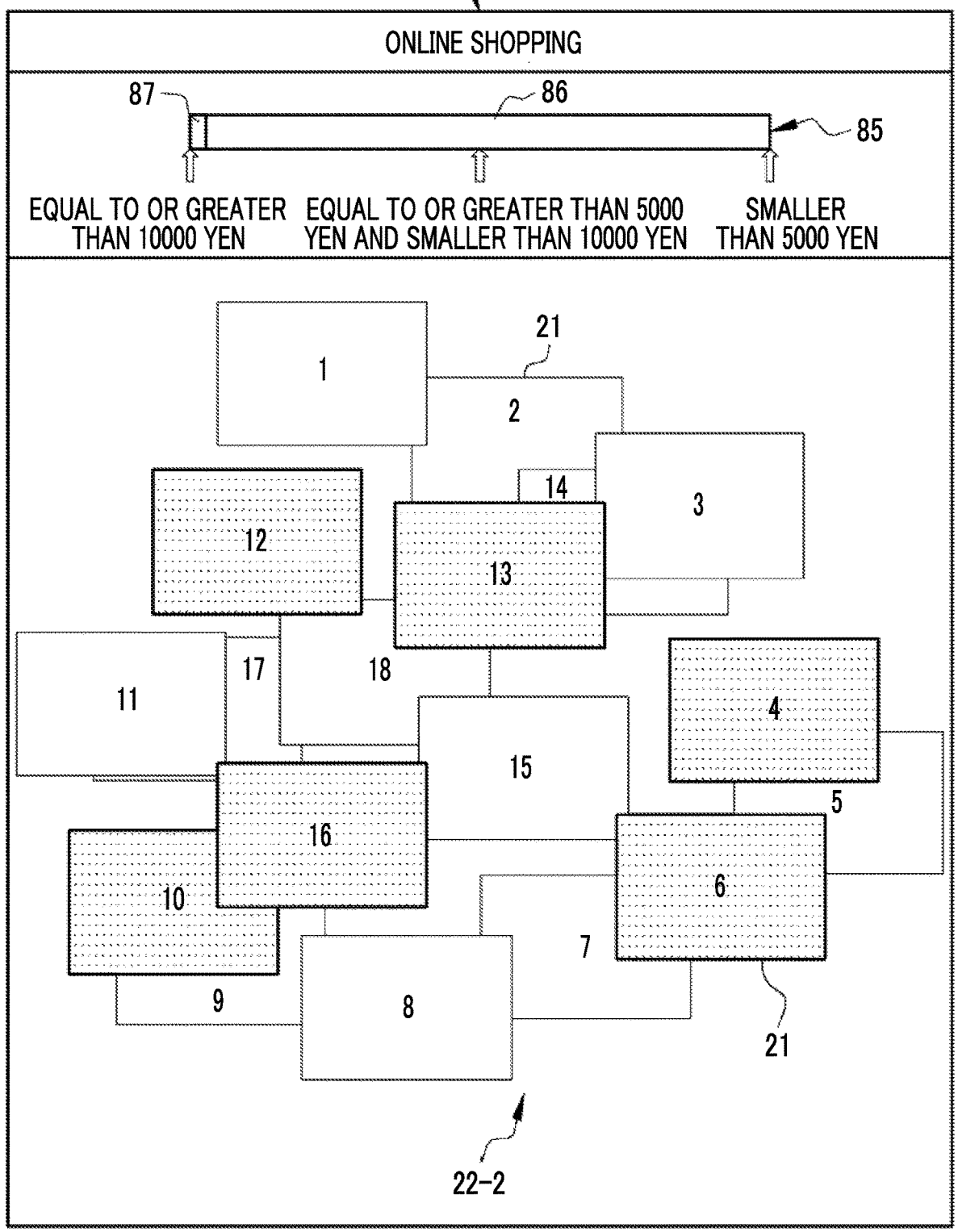
FIG. 33 is a diagram showing a screen after enlargement on which a slide bar is displayed.
Figure 34:
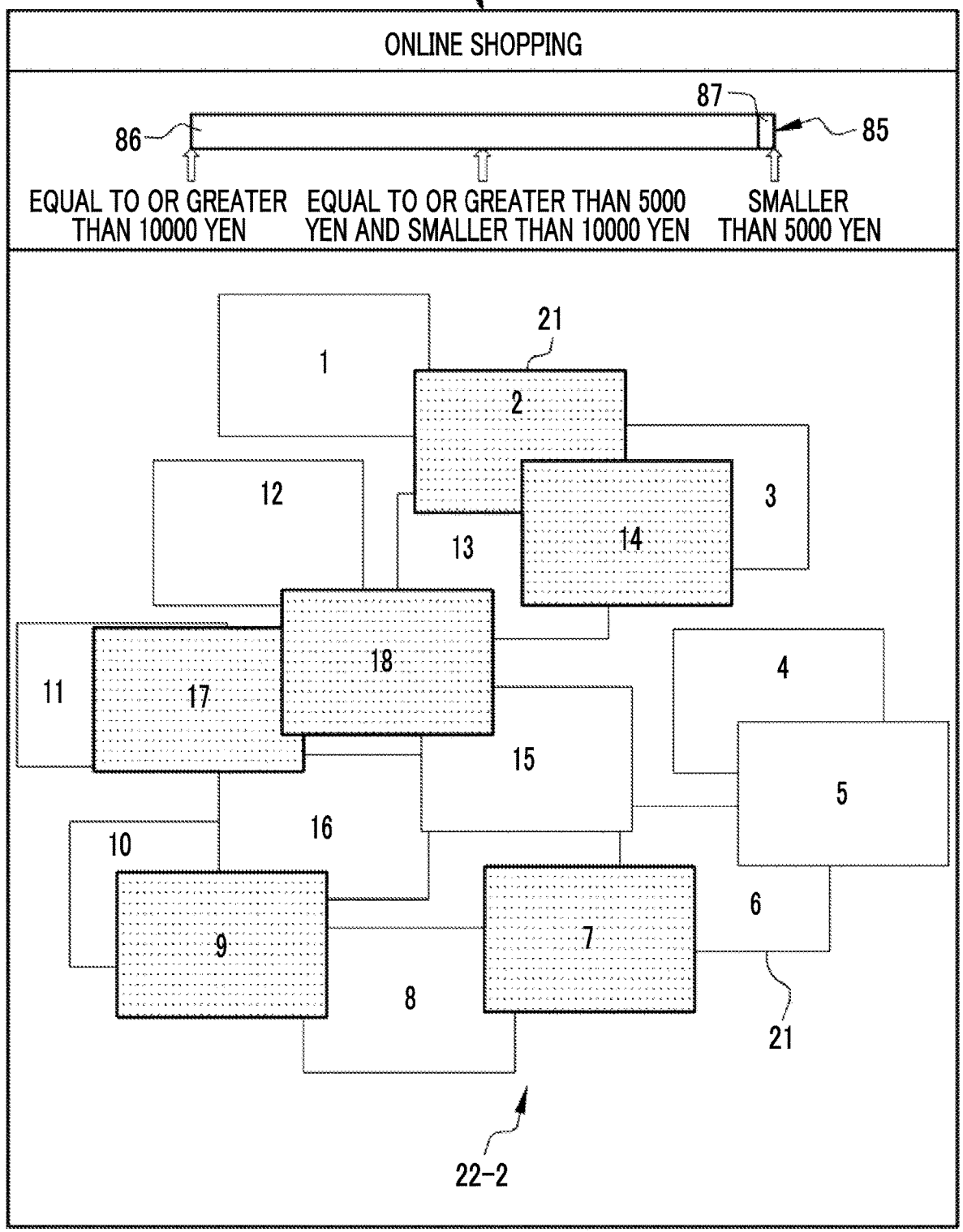
FIG. 34 is a diagram showing a screen after enlargement on which a slide bar is displayed.

FIGS. 32 to 34 show examples in which a slide bar 85 is displayed on the first screen after enlargement 20B-1 shown in FIG. 12 as the group designation UI. The first screen after enlargement 20B-1 corresponds to the screen after enlargement 20B displayed after the selection command is received at least one time by the reception section 51.

The slide bar 85 includes a rod-shaped bar 86, and a slider 87 that is operated by a slide operation on the rod-shaped bar 86 and indicates a group that is currently set. The group in which the price is smaller than 5000 yen is placed on a right end of the bar 86, the group in which the prices is equal to or greater than 5000 yen and smaller than 10000 yen is placed at the center of the bar 86, and the group in which the price is equal to or greater than 10000 yen is placed on a left end of the bar 86.

The first screen after enlargement 20B-1 shown in FIG. 32 is a screen changed from the first screen before enlargement 20A-1. As for the group, the group in which the price is equal to or greater than 5000 yen and smaller than 10000 yen, placed at the center of the bar 86, is selected. In this case, the images 21 of the numbers 1, 3, 5, 8, 11, and 15 that belong to the group in which the price is equal to or greater than 5000 yen and smaller than 10000 yen correspond to the corresponding content. On the other hand, the non-corresponding content includes the images 21 of the numbers 2, 4, 6, 7, 9, 10, 12, 13, 14, 16, 17, and 18 that do not belong to the group in which the price is equal to or greater than 5000 yen and smaller than 10000 yen.

In a case where the images 21 are displayed in an overlapping manner as in the first map 22-2, the screen output controller 50 displays the images 21 of the numbers 1, 3, 5, 8, 11, and 15 that represent the corresponding content at the front. In this way, the screen output controller 50 sets display forms of the corresponding content and the non-corresponding content to be different from each other.

FIG. 33 shows a case where the group in which the price is equal to or greater than 10000 yen is selected by the slide bar 85, and FIG. 34 shows a case where the group in which the price is smaller than 5000 yen is selected by the slide bar 85. In FIG. 33, images 21 of numbers 4, 6, 10, 12, 13, and 16 that belong to the group in which the price is equal to or greater than 10000 yen are displayed at the front. In FIG. 34, images 21 of numbers 2, 7, 9, 14, 17, and 18 that belong to the group in which the prices is smaller than 5000 yen are displayed at the front.

As in the images 21 of the numbers 10 and 16 shown in FIG. 33 and the images 21 of the numbers 2 and 14 shown in FIG. 34, in a case where the pieces of corresponding content are displayed in an overlapping manner, an overlapping state of the pieces of corresponding content on the first screen after enlargement 20B-1 shown in FIG. 32 that is first displayed is continued.

Figure 35:
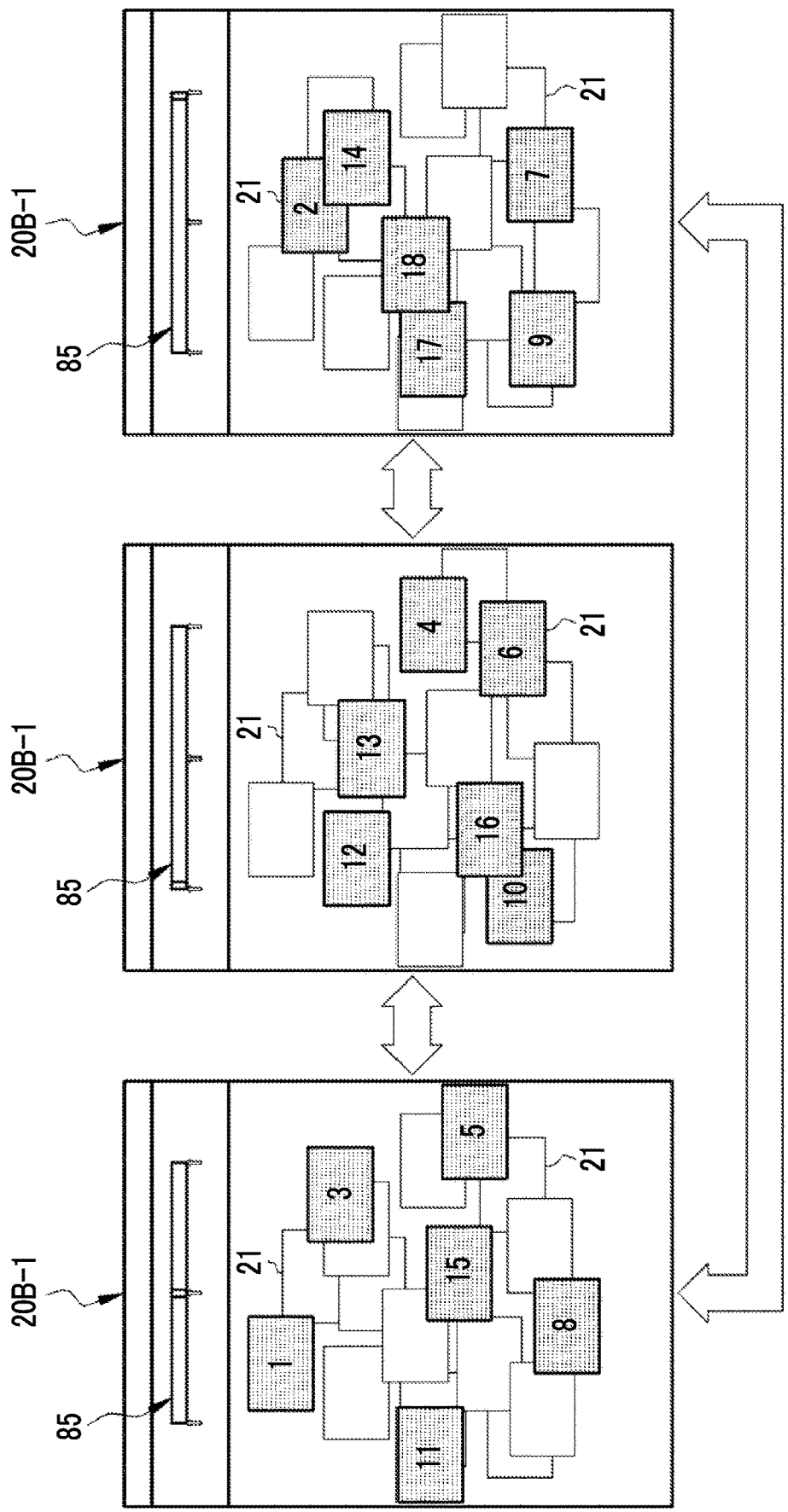
FIG. 35 is a diagram showing screen switching based on an operation of a slider of a slide bar.

The first screens after enlargement 20B-1 shown in FIGS. 32 to 34 may be display-switched as shown in FIG. 35. For example, on the first screen after enlargement 20B-1 in FIG. 32 shown on the left side, in a case where the slider 87 at the center is slide-operated to the right end, the display is switched to the first screen after enlargement 20B-1 in FIG. 34 shown on the right side. Further, on the first screen after enlargement 20B-1 in FIG. 33 shown at the center, in a case where the slider 87 at the left end is slide-operated to the center, the display is switched to the first screen after enlargement 20B-1 in FIG. 32 shown on the left side.

Figure 36:
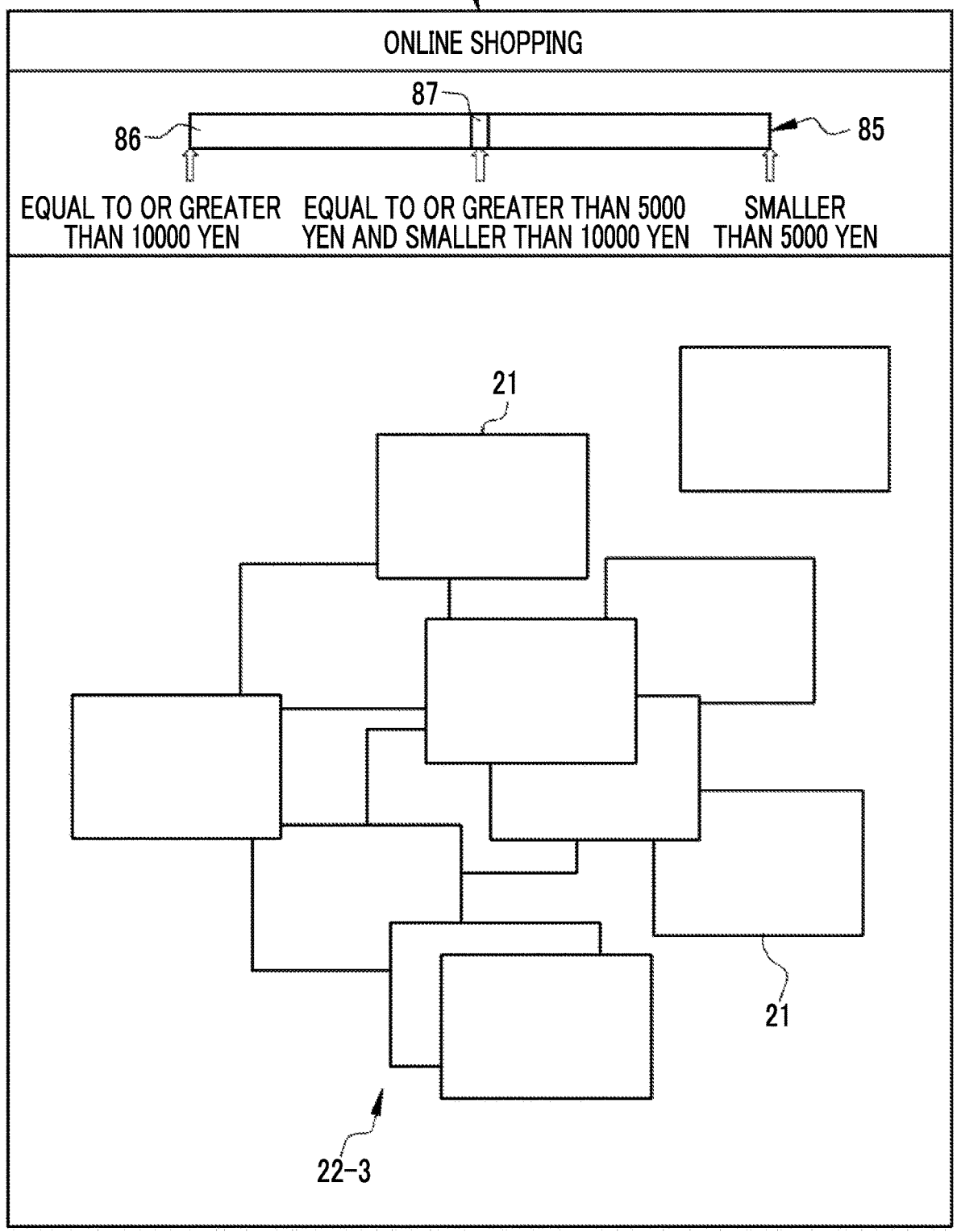
FIG. 36 is a diagram showing another screen after enlargement on which a slide bar is displayed.

FIG. 36 is a diagram showing that the slide bar 85 is displayed on the second screen after enlargement 20B-2 shown in FIG. 14. The second screen after enlargement 20B-2 also corresponds to the screen after enlargement 20B displayed after a selection command is selected at least one time by the reception section 51.

The user 15 slide-operates the slider 87 of the slide bar 85 to confirm a group to which the clothes CL belong, and then, performs a selection command of the selection area SA, in a similar way to the first embodiment.

As described above, since the slide bar 85 is displayed on the retrieval screen 20 having the first map 22 and display forms of corresponding content that corresponds to a group set by the slide bar 85 and non-corresponding content that does not correspond thereto are set to be different from each other, the user 15 can confirm a group to which the clothes CL belong on the first map 22. Thus, the user 15 can easily distinguish clothes CL that belong to a desired group, and then, to smoothly perform a selection command for the selection area SA.

Further, since the slide bar 85 is displayed on the screen after enlargement 20B displayed after a selection command is received at least one time by the reception section 51 (on the first screen after enlargement 20B-1 and the second screen after enlargement 20B-2), the user 15 can narrow down clothes CL to some extent to check the group.

The slide bar 85 may be displayed on the first screen before enlargement 20A-1, but compared with a case where a group is checked on the first screen before enlargement 20A-1 on which narrowing down of images 21 is not performed at all, it is more natural to check the group in a state where narrowing down of clothes CL is performed to some extent in accordance with a sensibility of the user 15. Accordingly, compared with a case where the slide bar 85 is displayed on the first screen before enlargement 20A-1, it is preferable to display the slide bar 85 on the screen after enlargement 20B displayed after a selection command is received at least one time by the reception section 51.

The slide bar 85 may be displayed on the screen after enlargement 20B after the selection command is received a set number of times (for example, two times) by the reception section 51. Further, a configuration in which the slide bar 85 is displayed from the first screen before enlargement 20A-1 is shown, but a configuration in which the slide bar 85 is not first operable and is then operable after the selection command is received a set number of times by the reception section 51 may be used.

In a case where corresponding content and non-corresponding content are displayed in an overlapping manner on the first map 22, since the corresponding content is displayed at the front, it is possible to easily distinguish the corresponding content from the non-corresponding content.

Seventh Embodiment

In a seventh embodiment shown in FIG. 37, a case where a plurality of types of second attribute information are present in the sixth embodiment will be described. In this case, the screen output controller 50 displays a plurality of types of slide bars 85 on the screen after enlargement 20B displayed after a selection command is received at least one time by the reception section 51.

Figure 37:
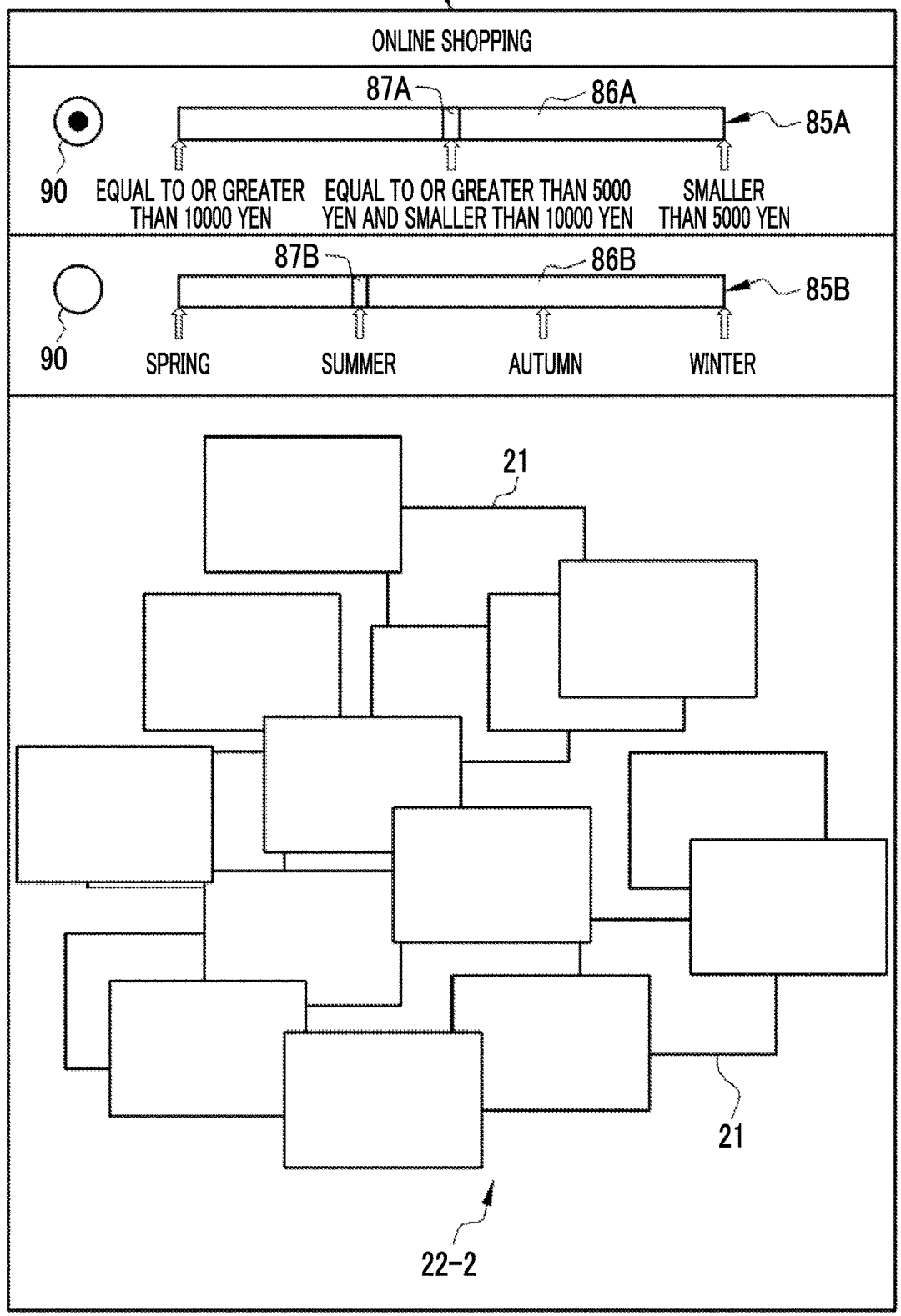
FIG. 37 is a diagram showing a screen after enlargement on which two slide bars are displayed.

FIG. 37 shows an example in which a slide bar 85A for designating a group of price and a slide bar 85B for designating a group of season are displayed on a first screen after enlargement 20B-1 in a case two types of second attribute information of the price and the season are present as in the fifth embodiment. The slide bar 85A is the same as the slide bar 85 shown in FIGS. 32 to 34. On the other hand, on the slide bar 85B, groups of respective seasons of spring, summer, autumn, and winter are sequentially placed from a left side of a bar 86B. On the first screen after enlargement 20B-1 that is first displayed, a current season is selected from the slide bar 85B.

In this case, a radio button 90 for validating a function of one of the two slide bars 85A and 85B and negating a function of the other one thereof is provided. The radio button 90 is a selection button through which in a case where one of the two slide bars 85A and 85B is selected, the other one is not to be selected. In FIG. 37, a state where the slide bar 85A is selected is shown.

As described above, a case where a plurality of types of second attribute information are present, the plurality of types of slide bars 85 are displayed. Thus, it is possible to simply confirm corresponding content and non-corresponding content of the plurality of types of second attribute information. Further, it is possible to compare the corresponding content with the non-corresponding content by changing viewpoints of retrieval, to thereby appreciate the clothes CL to be purchased.

Eighth Embodiment

A method for setting display forms of corresponding content and non-corresponding content to be different from each other is not limited to a method for displaying the corresponding content at the front in the sixth embodiment. As in an eighth embodiment shown in FIGS. 38 to 40, display forms of corresponding content and non-corresponding content may be set to be different from each other by setting the non-corresponding content not to be displayed.

Figure 38:
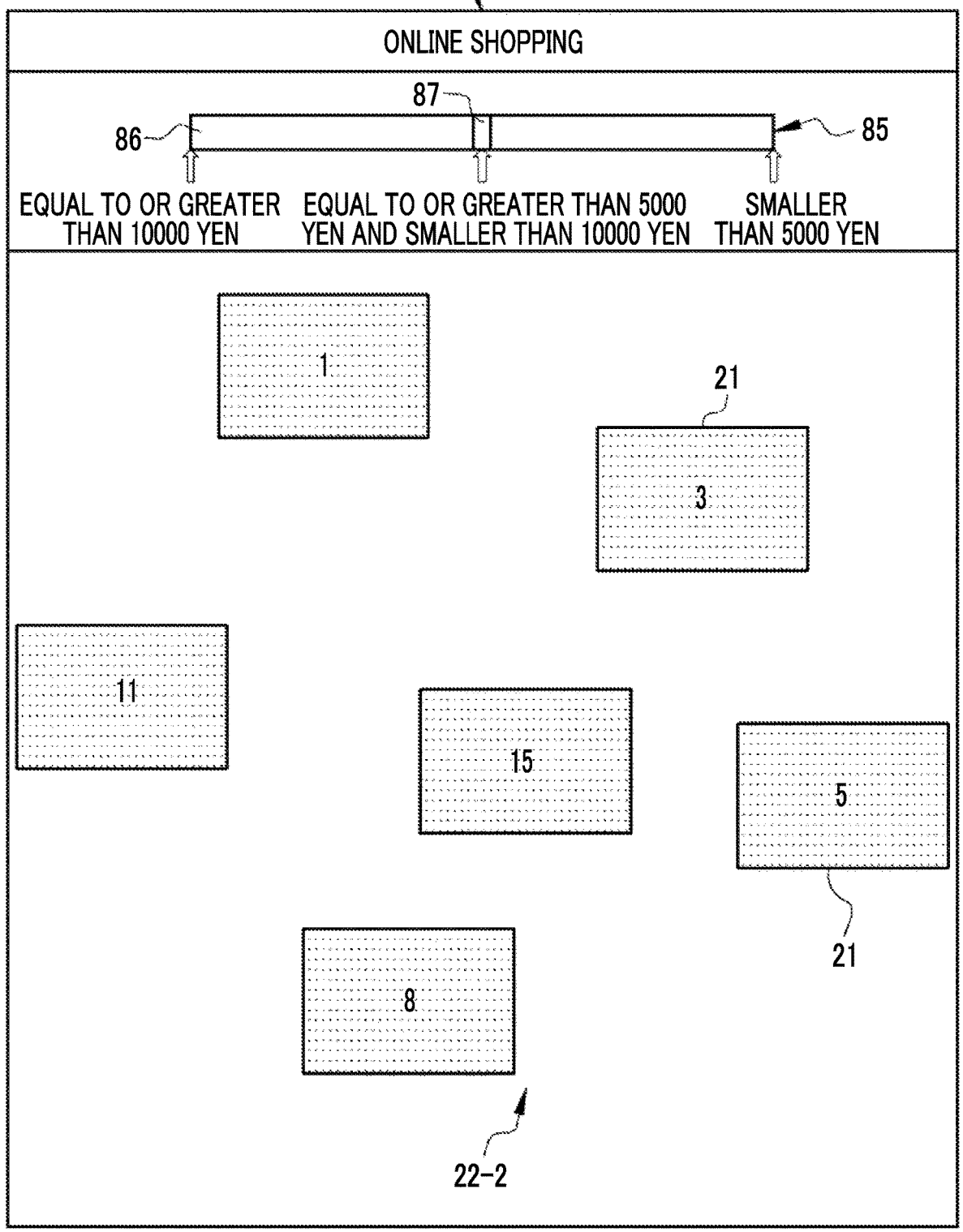
FIG. 38 is a diagram showing a screen after enlargement on which non-corresponding content is in a non-display state.
Figure 39:
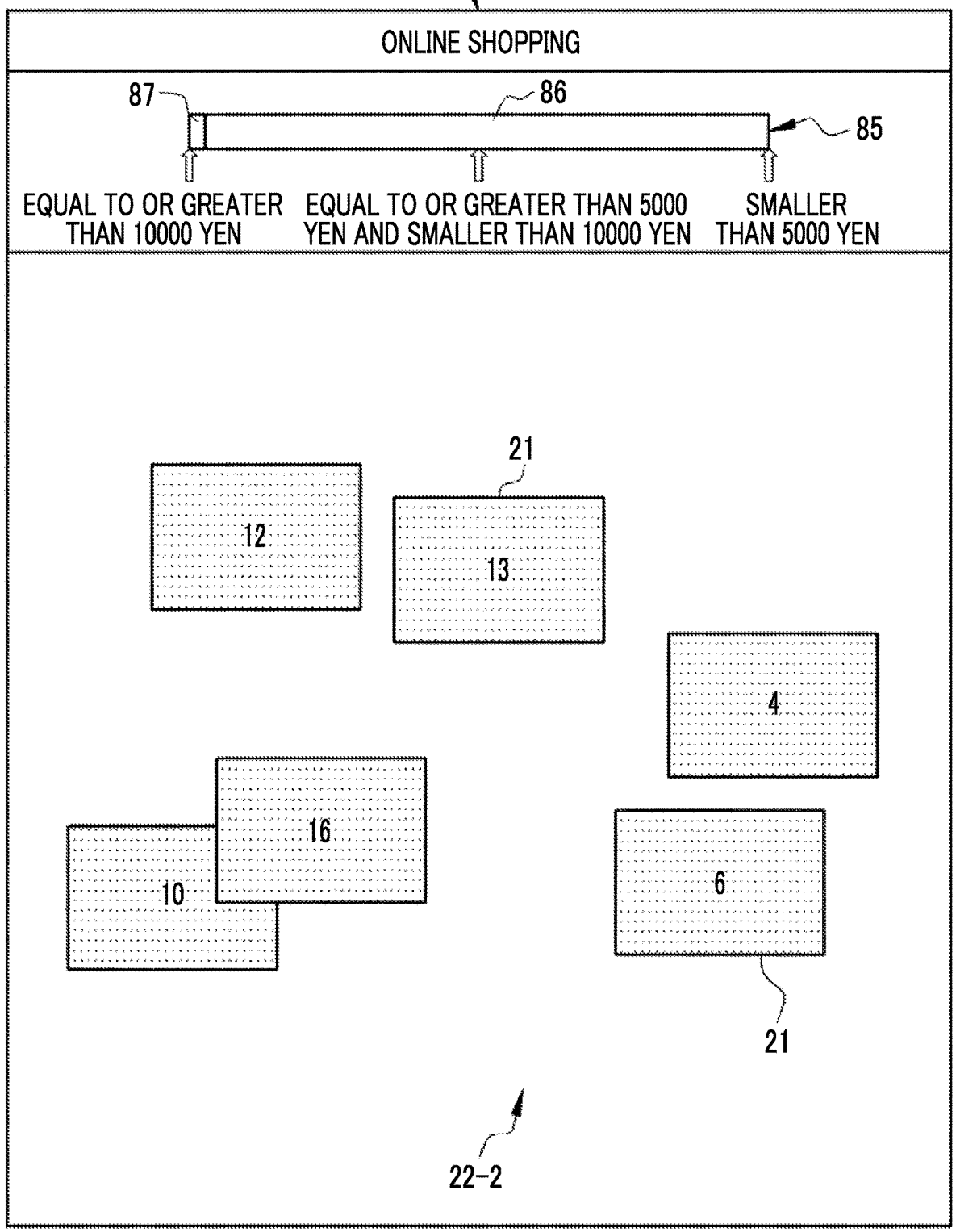
FIG. 39 is a diagram showing a screen after enlargement on which non-corresponding content is in a non-display state.
Figure 40:
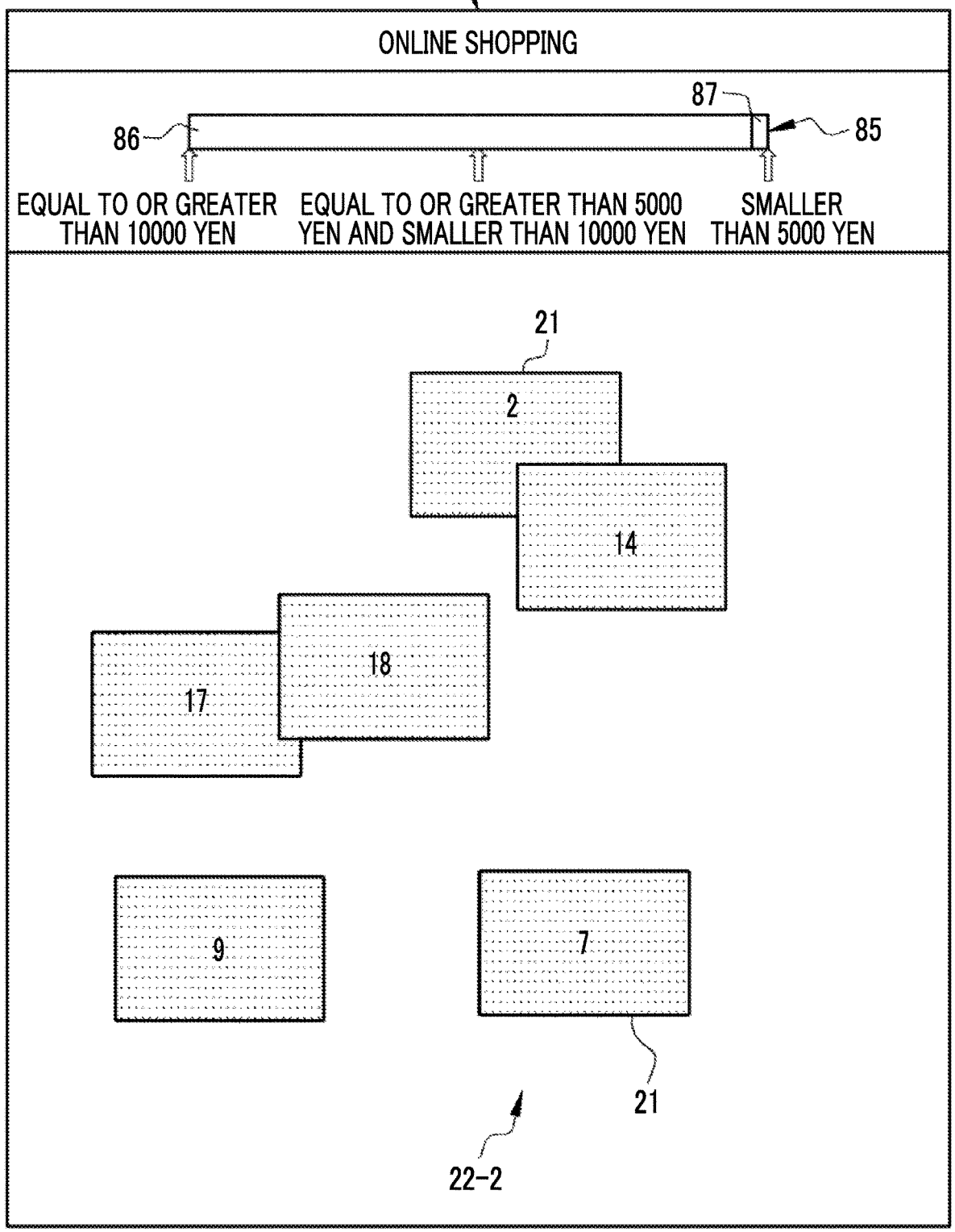
FIG. 40 is a diagram showing a screen after enlargement on which non-corresponding content is in a non-display state.

FIGS. 38, 39, and 40 correspond to FIGS. 32, 33, and 34 in the sixth embodiment, respectively. That is, FIG. 38 shows a case where a group in which the price is equal to or greater than 5000 yen and smaller than 10000 yen is selected by the slide bar 85, FIG. 39 shows a case where a group in which the price is equal to or greater than 10000 yen is selected by the slide bar 85, and FIG. 40 shows a case where a group in which the price is smaller than 5000 yen is selected by the slide bar 85.

In FIG. 38, images 21 of clothes CL of numbers 1, 3, 5, 8, 11, and 15 that represent corresponding content are displayed, and images 21 of clothes CL of numbers 2, 4, 6, 7, 9, 10, 12, 13, 14, 16, 17, and 18 that represent non-corresponding content are set not to be displayed. Similarly, in FIGS. 39 and 40, the corresponding content is displayed and the non-corresponding content is set not to be displayed. Although not shown, on the first screen after enlargement 20B-1 shown in FIGS. 38 to 40, display forms may be switched, in a similar way to the first screen after enlargement 20B-1 shown in FIGS. 32 to 34. In this way, in a case where the non-corresponding content is set not to be displayed, since only the corresponding content remains on the first map 22, it is possible to recognize which content is the corresponding content at first sight.

In the case of the eighth embodiment, it is preferable to provide a UI for negating the function of the slide bar 85. Here, in a case where the UI for negating the function of the slide bar 85 is selected, a configuration in which all images 21 are displayed regardless of distinction of corresponding content and non-corresponding content is used.

A configuration in which display forms of corresponding content and non-corresponding content may be set to be different from each other by setting frames of images 21 that represent the corresponding content to be thicker than frames of images 21 that represent the non-corresponding content or setting brightnesses or tones of the images 21 that represent the corresponding content and the images 21 that represent the non-corresponding content, for example.

The group designation UI is not limited to the slide bar 85. A configuration in which each group is designated by rotating a dial may be used, or a configuration in which each group may be designated using a pull-down menu. Further, a button corresponding to a group to be selected may be provided.

A ninth embodiment and a tenth embodiment to be described hereinafter correspond to embodiments of a second invention. The second invention has a configuration in which a screen before enlargement 20A should be directly changed to a screen after enlargement 20B, without inserting a first-middle screen 20M1 and a second-middle screen 20M2 between the screen before enlargement 20A and the screen after enlargement 20B.

Ninth Embodiment

Figure 41:
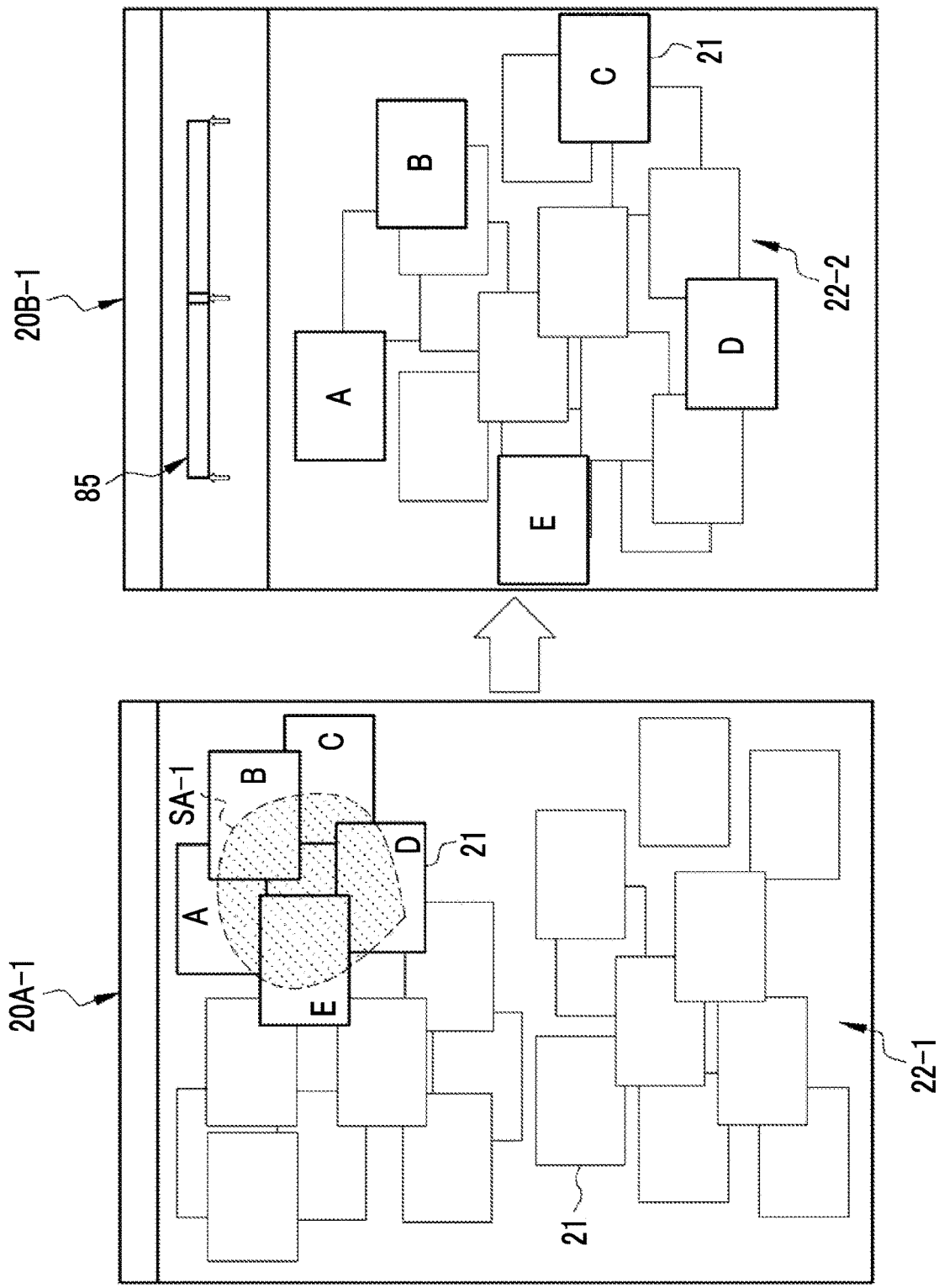
FIG. 41 is a diagram showing a state in which a screen is directly changed from the initial screen before enlargement to a first screen after enlargement on which a slide bar is displayed.
Figure 42:
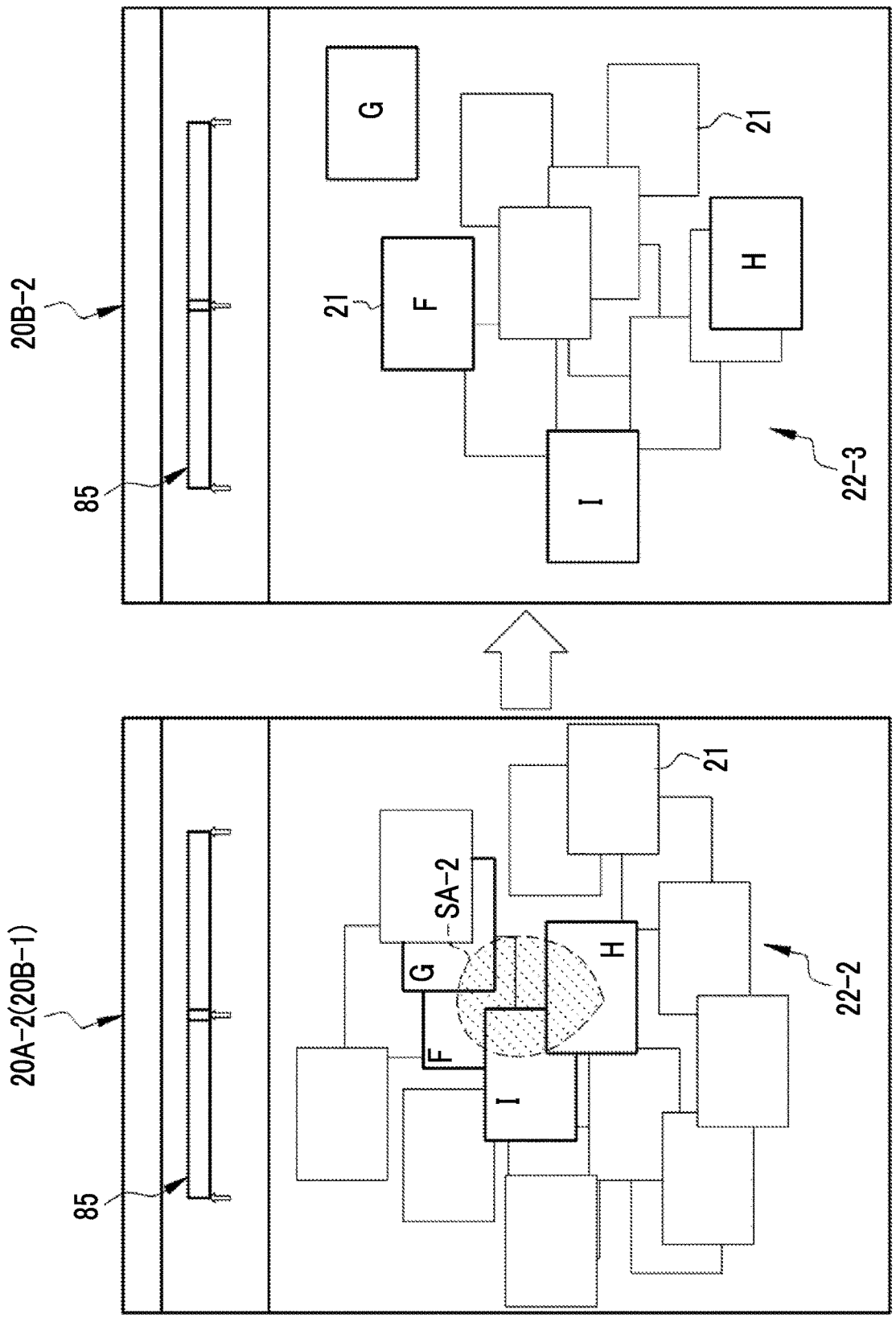
FIG. 42 is a diagram showing a state in which a screen is directly changed from the first screen after enlargement on which the slide bar is displayed to a second screen after enlargement on which a slide bar is displayed.

In the ninth embodiment shown in FIGS. 41 and 42, the screen editing section 53 directly changes the screen before enlargement 20A to the screen after enlargement 20B, without inserting the first-middle screen 20M1 and the second-middle screen 20M2 between the screen before enlargement 20A and the screen after enlargement 20B. Further, the screen output controller 50 displays a group designation UI for designating a group in a range where objective evaluations indicated by the second attribute information are the same on the retrieval screen 20 having the first map 22, in a similar way to the sixth to eighth embodiments. Further, the screen output controller 50 sets display forms of corresponding content and non-corresponding content to be different from each other.

In FIG. 41, in a case where a selection command for the selection area SA-1 is performed on the first screen before enlargement 20A-1 shown on a left side of an arrow, the screen editing section 53 directly changes the screen to the first screen after enlargement 20B-1 on which the slide bar 85 is provided, without through the first first-middle screen 20M1-1 and the first second-middle screen 20M2-1, as shown on a right side of the arrow. The first screen before enlargement 20A-1 shown on the left side of the arrow is the same as in FIG. 11, and the first screen after enlargement 20B-1 shown on the right side of the arrow is the same as in FIG. 32.

The screen output controller 50 applies the sixth embodiment to display corresponding content of the first map 22-2 on the first screen after enlargement 20B-1 at the front, and to thereby set display forms of the corresponding content and non-corresponding content to be different from each other. Alternatively, the screen output controller 50 may apply the eighth embodiment to set non-corresponding content not to be displayed, to thereby set display forms of the corresponding content and non-corresponding content to be different from each other.

Further, in FIG. 42, in a case where a selection command for the selection area SA-2 is performed on the second screen before enlargement 20A-2 (first screen after enlargement 20B-1) shown on a left side of an arrow, the screen editing section 53 directly changes the screen to the second screen after enlargement 20B-2 on which the slide bar 85 is provided, without through the second first-middle screen 20M1-2 and the second second-middle screen 20M2-2, as shown on a right side of the arrow. The second screen after enlargement 20B-2 is the same as that shown in FIG. 36.

As described above, by displaying a group designation UI for designating a group in a range where objective evaluations indicated by the second attribute information are the same on the retrieval screen 20 having the first map 22 and setting display forms of corresponding content and non-corresponding content to be different from each other, it is possible to obtain the same effects as in the sixth to eighth embodiments.

An invention provided as a content retrieval device according to the ninth embodiment is disclosed as the following Appendix 1.

[Appendix 1]

A content retrieval device that retrieves at least one piece of content from a plurality of pieces of content, comprising:

a screen output controller that controls output, on a display, of a retrieval screen having a first map that includes at least one coordinate axis to which first attribute information based on a sensible evaluation of the content is allocated and in which the content is placed at a position corresponding to the first attribute information;

a command reception section that receives a selection command for an area in the map through the retrieval screen; and a screen editing section that enlarge-displays the area selected by the selection command in accordance with the selection command, wherein the content includes second attribute information based on an objective evaluation, in addition to the first attribute information, and the screen output controller displays a group designation user interface for designating a group in a range where the objective evaluations indicated by the second attribute information are the same on the retrieval screen, and sets display forms of corresponding content that is the content corresponding to the group set by the group designation user interface and non-corresponding content that is the content that does not correspond to the group to be different from each other.

Tenth Embodiment

Figure 43:
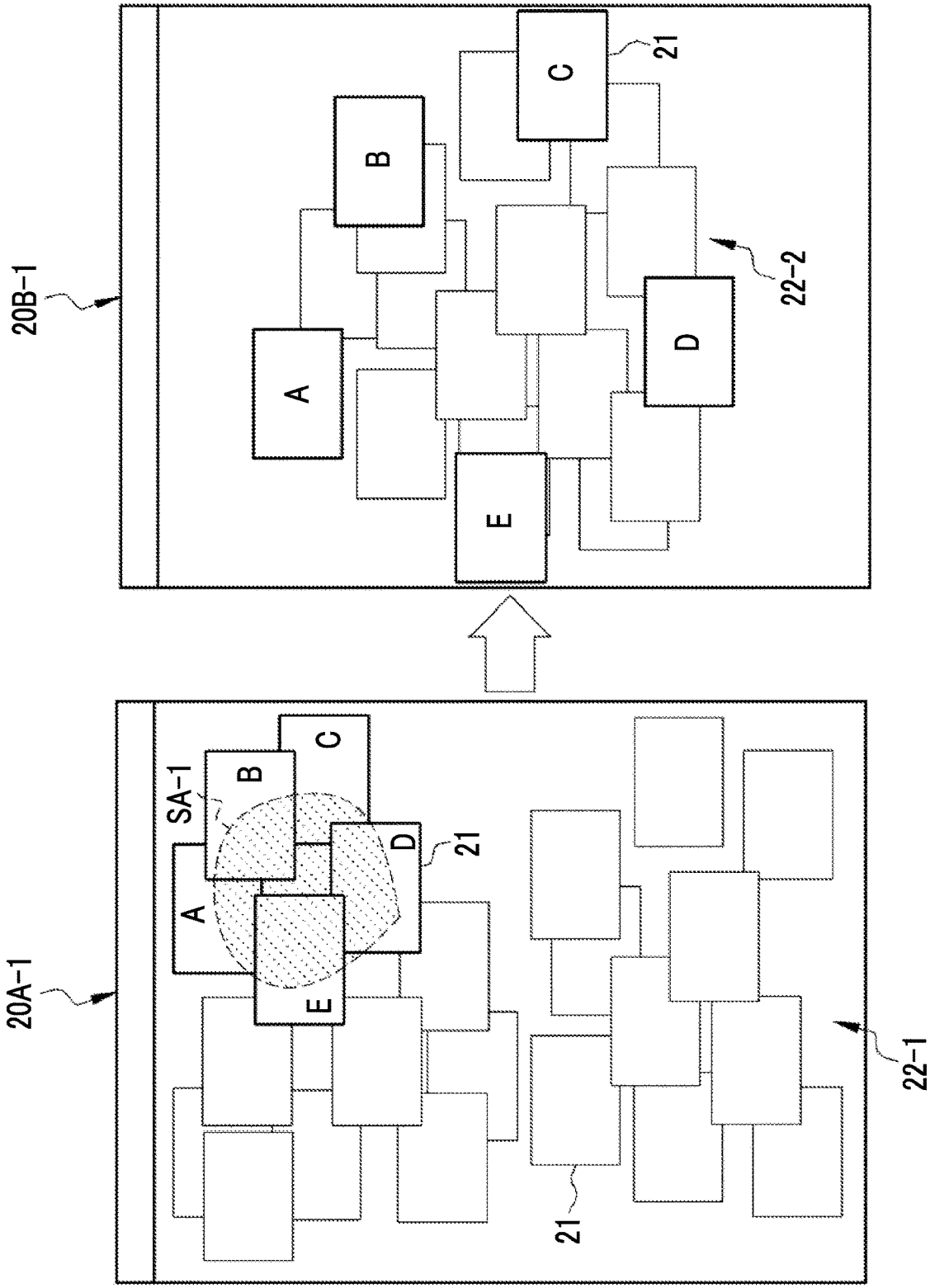
FIG. 43 is a diagram showing a state in which a screen is directly changed from the initial screen before enlargement to a first screen after enlargement.
Figure 44:
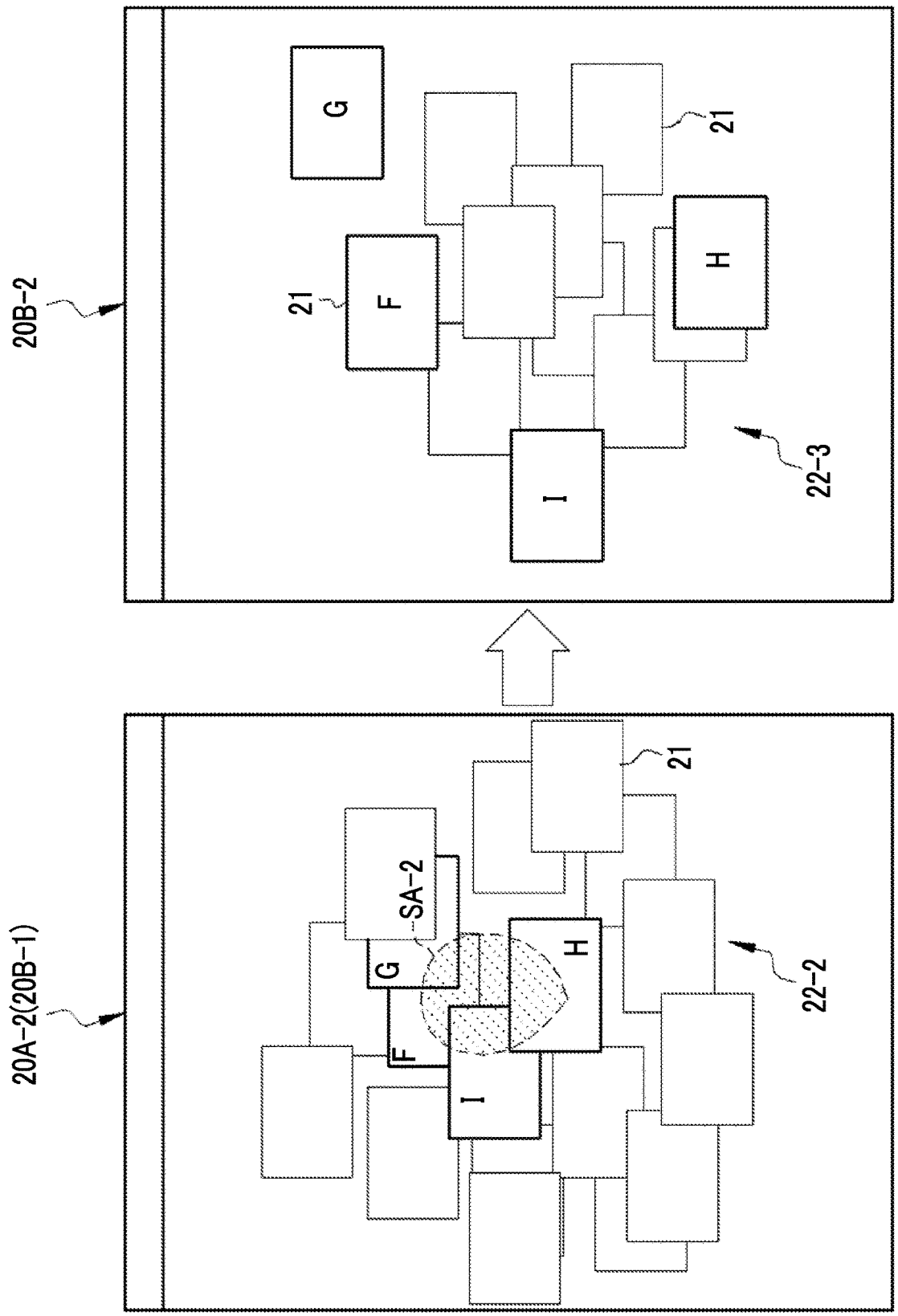
FIG. 44 is a diagram showing a state in which a screen is directly changed from a second screen before enlargement to a second screen after enlargement.
Figure 45:
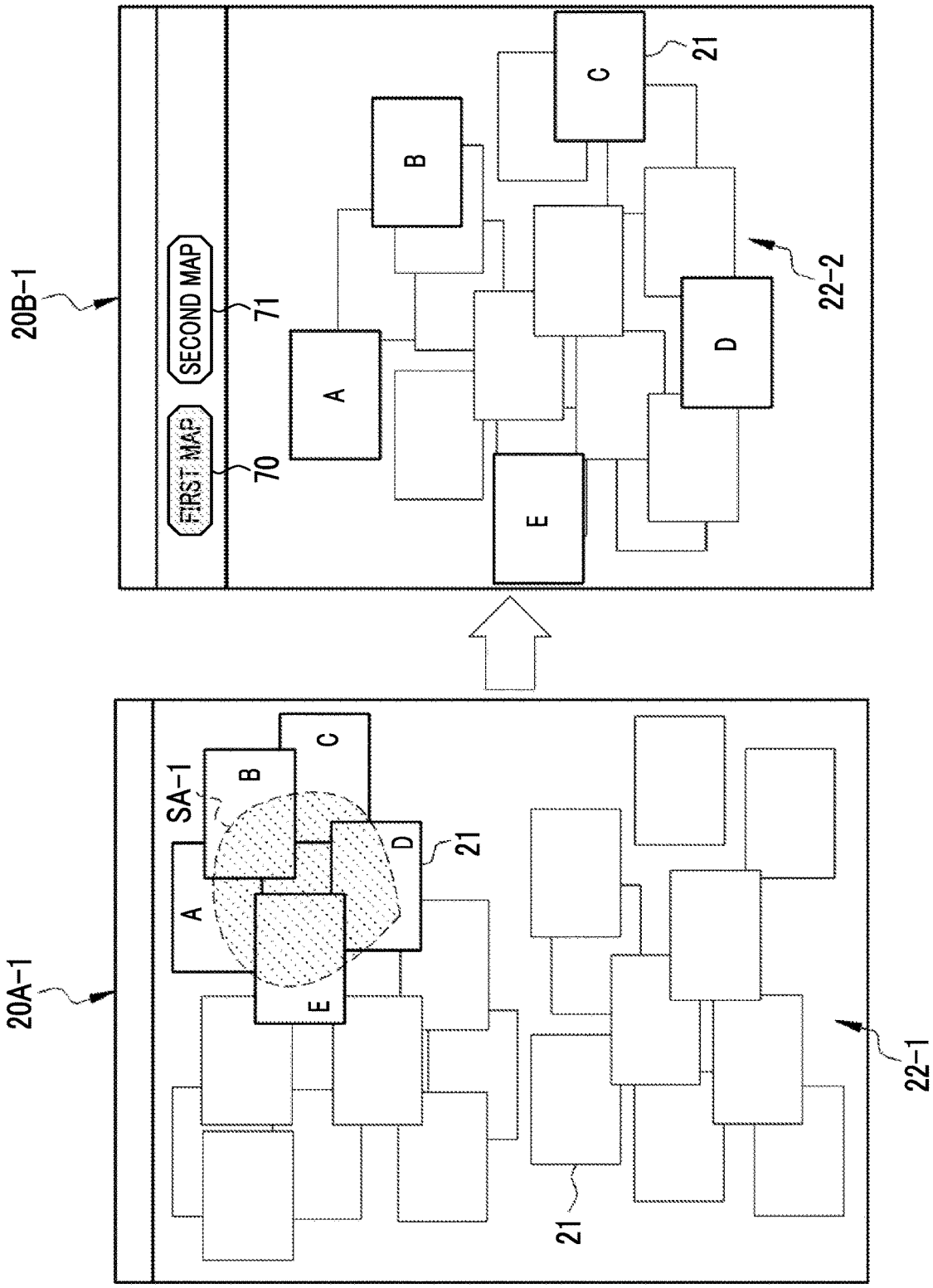
FIG. 45 is a diagram showing a state in which a screen is directly changed from the initial screen before enlargement to a first screen after enlargement on which a first map switch button and a second map switch button are displayed.

In the tenth embodiment shown in FIGS. 43 to 45, the screen editing section 53 directly changes the screen before enlargement 20A to the screen after enlargement 20B, without inserting the first-middle screen 20M1 and the second-middle screen 20M2 between the screen before enlargement 20A and the screen after enlargement 20B, in a similar way to the ninth embodiment. Further, the screen output controller 50 selectively performs switching between displays of the first map and the second map on a retrieval screen, in a similar way to the first, fourth, and fifth embodiments.

In FIG. 43, in a case where a selection command for the selection area SA-1 on the first screen before enlargement 20A-1 shown on a left side of an arrow is performed, the screen editing section 53 directly changes the screen to the first screen after enlargement 20B-1, without through the first first-middle screen 20M1-1 and the first second-middle screen 20M2-1, as shown on a right side of the arrow. The first screen before enlargement 20A-1 shown on a left side of the arrow is the same as in FIG. 11, and the first screen after enlargement 20B-1 shown on a right side of the arrow is the same as in FIG. 12.

Further, in FIG. 44, in a case where a selection command for the selection area SA-2 on the second screen before enlargement 20A-2 (first screen after enlargement 20B-1) shown on a left side of an arrow is performed, the screen editing section 53 directly changes the screen to the second screen after enlargement 20B-2, without through the second first-middle screen 20M1-2 and the second second-middle screen 20M2-2, as shown on a right side of the arrow. The second screen after enlargement 20B-2 is the same as in FIG. 14.

In this case, as shown in FIG. 15, in a case where a selection command for a selection area SA-3 on the second screen after enlargement 20B-2 is performed, the map on the retrieval screen 20 is switched from the first map 22-3 to the second map 27.

Alternatively, in FIG. 45, in a case where a selection command for the selection area SA-1 on the first screen before enlargement 20A-1 shown on a left side of an arrow is performed, the screen editing section 53 directly changes the screen to the first screen after enlargement 20B-1 having the first map switch button 70 and the second map switch button 71, without through the first first-middle screen 20M1-1 and the first second-middle screen 20M2-1, as shown on a right side of the arrow. The first screen after enlargement 20B-1 is the same as in FIG. 22.

In this case, as shown in FIG. 24, displays of the first map 22-2 and the second map 27 are switched in accordance with selection of the first map switch button 70 and the second map switch button 71. By selectively performing switching between displays of the first map and the second map on the retrieval screen, it is possible to obtain the same effects as in the first, fourth, and fifth embodiments.

The second map may employ the second map 60 in the second embodiment or the second map 65 in the third embodiment.

An invention provided as a content retrieval device according to the tenth embodiment is disclosed as the following Appendix 2.

[Appendix 2]

A content retrieval device that retrieves at least one piece of content from a plurality of pieces of content, comprising:

a screen output controller that controls output, on a display, of a retrieval screen for retrieving the content and selectively performs switching between displays of a first map that includes at least one coordinate axis to which first attribute information based on a sensible evaluation of the content is allocated and in which the content is placed at a position corresponding to the first attribute information and a second map that includes at least one coordinate axis to which second attribute information based on an objective evaluation of the content is allocated and in which the content is placed at a position corresponding to the second attribute information, on the retrieval screen;

a command reception section that receives a selection command for an area in the map through the retrieval screen; and a screen editing section that enlarge-displays the area selected by the selection command in accordance with the selection command.

Figure 46:
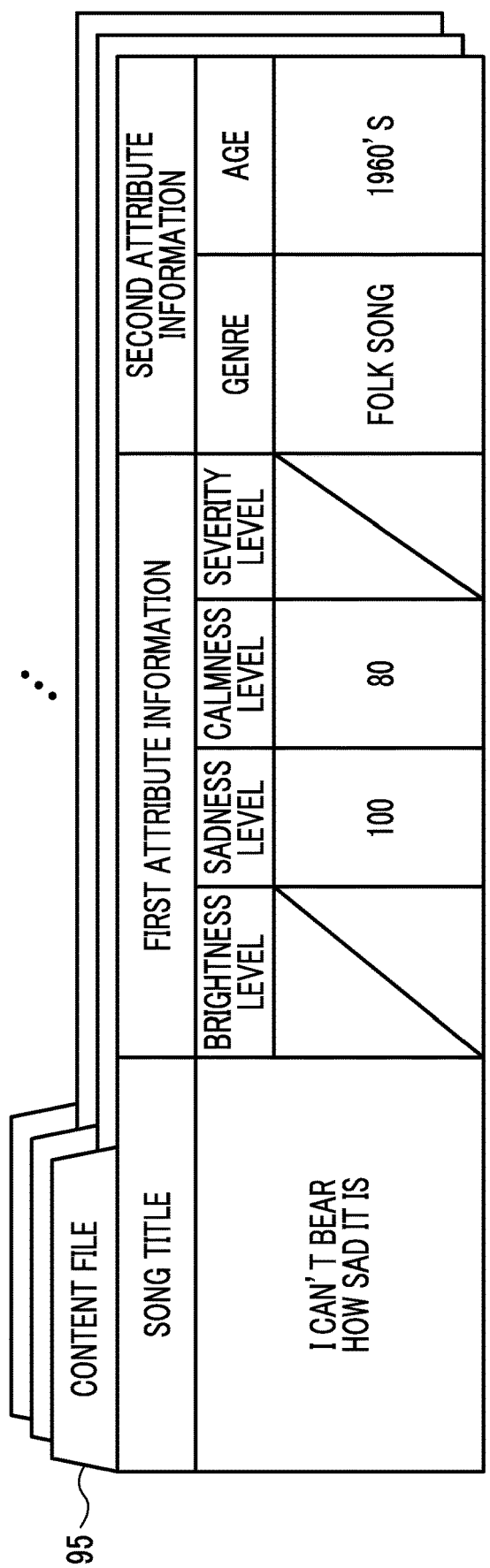
FIG. 46 is a diagram showing a content file in a case where music data is used as content.

In the above-described embodiments, clothes CL for female is used as content, but the invention is not limited thereto. For example, music data such as a content file 95 shown in FIG. 46 may be used as content.

Song titles are registered in the content file 95, instead of the images 21 of the clothes CL in the above-described embodiments. In this case, the first attribute information includes a brightness level, a sadness level, a calmness level, and a severity level that indicate images of the songs. This information is obtained by the content retrieval server 12 on the basis of lyrics, tempo, chord progression, used musical instruments of a song, in which numerical values of 0 to 100 indicating respective levels are registered, in a similar way to the coolness level, the warmness level, the softness level, and the hardness level in the above-described embodiments. Further, since the brightness level and the sadness level is in a contradictory relationship, in a case where one of the brightness level and the sadness level is registered, the other level is not registered to leave a blank section. This is similarly applied to the calmness level and the severity level.

The second attribute information corresponds to a genre of the song and an age of a release date. In the content file 95, an artist name, an album title, an album artwork and a performance time of the song, an evaluation of the user 15 with respect to the song, and the like are registered, in addition to the genre of the song and the age of the release date.

Figure 47:
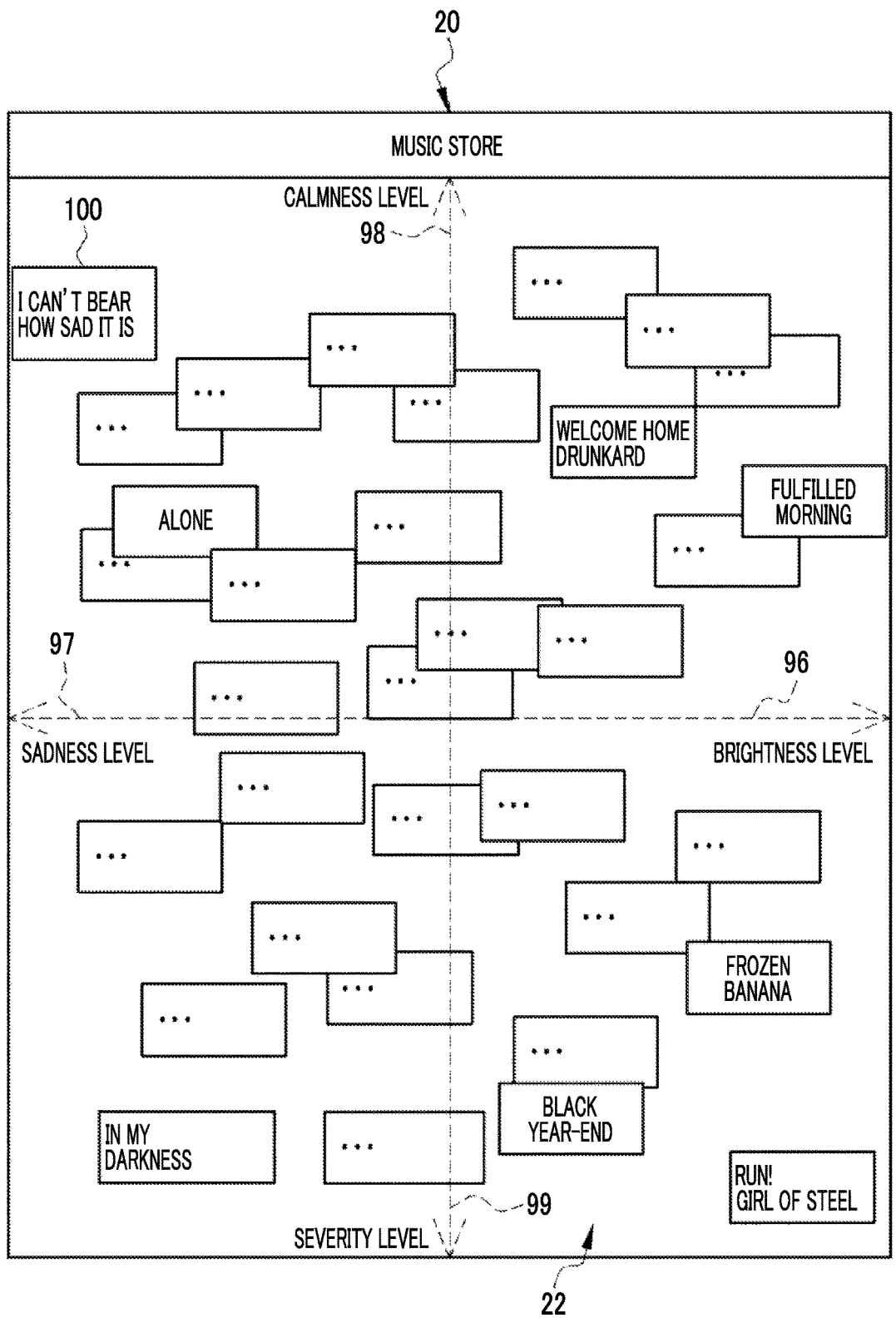
FIG. 47 is a diagram showing a first map in a case where music data is used as content.

In this case, as shown in FIG. 47, the first map 22 includes four coordinate axes 96 to 99, that is, the coordinate axis 96 to which the brightness level is allocated, the coordinate axis 97 to which the sadness level is allocated, the coordinate axis 98 to which the calmness level is allocated, and the coordinate axis 99 to which the severity level is allocated. Further, instead of the images 21 of the clothes CL in the above-described embodiments, a frame 100 that surrounds character information indicating a song title is placed at a position corresponding to the first attribute information.

As the first attribute information in a case where content is music data, information depending on appreciation conditions of songs, such as driving, rooms, sports, morning, daytime, evening, or night may be used. Further, the second attribute information may employ prices or seasons (spring song, winter song, or the like) in the above-described embodiments.

As described above, any product may be available as long as the content is a product that is tradable on Internet shopping sites. For example, home appliances may be set as content. As first attribute information in this case, for example, a familiarity level or a refinement level imaged from design, a usability level in view of functions, or the like may be employed. Further, as second attribute information, the price mentioned in the above-described embodiments, a classification into domestic electrical appliances such as a refrigerator or a washing machine, amusement electric appliances such as a TV or a recorder, or the like may be employed.

Further, the content is not limited to the product that is tradable on the Internet shopping sites. For example, images captured by the user 15 using a digital camera or images collected by the user 15 from the Internet may be used as content. In this case, the first attribute information may employ a brightness level, a fresh level or a surprise level of an image set by the user, a friendliness level for the image, or the like. Further, the second attribute information may employ, for example, a classification of imaging conditions such as scenery, persons, night views, or close-ups, imaging date and time, or the like.

The number of coordinate axes of the first map is not limited to four coordinate axes 23 to 26 shown in the first embodiment. The number of the coordinate axes of the first map may be one or two. Further, coordinate axes of the first map and the second map may be set by a user.

A hardware configuration of a computer that forms a content retrieval device of the invention may employ a variety of modifications. For example, the content retrieval device may be configured of a plurality of computers separated as hardware in order to enhance a processing capability or reliability. For example, the functions of the screen output controller 50 and the screen editing section 53, and the functions of the reception section 51 and the information management section 52 are dividedly performed by two computers. In this case, the two computers form the content retrieval device.

A configuration in which the screen output controller 50 and the screen editing section 53 are independently provided may be used, instead of a configuration the screen output controller 50 performs the function of the screen editing section 53.

Further, in the above-described embodiments, a configuration in which each screen of the retrieval screen 20 or the like is delivered from the screen output controller 50 to the client terminal 11 in a web delivery screen data format is shown as an example, but a configuration in which an AP for displaying each screen is installed in the client terminal 11 and a command for instructing the AP to display each screen is output from the screen output controller 50 may be used.

A configuration in which an operating program is installed in the client terminal 11, respective sections provided in the CPU 32B of the content retrieval server 12 are provided in the CPU 32A of the client terminal 11, and the client terminal 11 is operated as the content retrieval device may be used. For example, in a case where things belong to the user 15, for example, images captured by the user 15 using a digital camera are content, the client terminal 11 is operated as the content retrieval device. Further, a local server computer of another user 15 different from the client terminal 11 may be used as the content retrieval device.

As described above, the hardware configuration of the computer may be appropriately modified in accordance with necessary performance such as a processing capability, security, or reliability. Further, as well as the hardware, in order to secure security or reliability, APs such as an operating program 45 may be duplexed, or may be dividedly stored in a plurality of storage devices.

In the above-described embodiments, for example, a hardware configuration of processing units that execute a variety of processes, such as the browser controller 40, the screen output controller 50, the reception section 51, the information management section 52, and the screen editing section 53, may be the following variety of processors.

The variety of processors include a central processing unit, a programmable logic device (PLD), a dedicated electric circuit, or the like. The CPU is a general use processor that functions as a variety of processing units by executing software (program) as well known in the art. The PLD is a processor of which a circuit configuration is changeable after manufacturing, such as a field programmable gate array (FPGA). The dedicated electric circuit is a processor having a circuit configuration that is dedicatedly designed for performing a specific process, such as an application specific integrated circuit (ASIC).

One processing unit may be configured by one processor among the variety of processors described above, or may be configured by a combination of the same type or different types of two or more processors, (for example, a combination of a plurality of FPGAs, or a combination of an FPGA and a CPU). Further, a plurality of processing units may be configured by one processor. As an example in which the plurality of processing units are configured by one processor, a configuration in which a combination of one or more CPUs and software forms one processor and this processor functions as a plurality of processing units may be employed. As another example, as represented by a system on chip (SoC) or the like, a configuration in which a processor for realizing entire functions of a system including a plurality of processing units using one IC chip is used may be employed. In this way, the variety of processing units are configured using one or more various processors as a hardware configuration.

Further, the hardware configuration of the variety of processors is, more specifically, electric circuitry in which circuit elements such as semiconductors are combined.

From the above description, a content retrieval device according to Appendix 3 and a content retrieval system according to Appendix 4 may be provided.

[Appendix 3]

A content retrieval device that retrieves at least one piece of content from a plurality of pieces of content, comprising:

a screen output control processor that controls output, on a display, of a retrieval screen having a map that includes at least one coordinate axis to which attribute information on the content is allocated and in which the content is placed at a position corresponding to the attribute information;

a command reception processor that receives a selection command for an area in the map through the retrieval screen; and a screen editing processor that performs a screen change of the retrieval screen in accordance with the selection command, wherein the screen editing processor changes a screen before enlargement that is the retrieval screen before the selection command is received to a first-middle screen obtained by deleting the content outside a selection area that is the area selected according to the selection command, changes the first-middle screen to a second-middle screen on which an interval between the plurality of pieces of content in the selection area is enlarge-displayed in a state where a relative positional relationship therebetween is secured on the map, and changes the second-middle screen to a screen after enlargement that is the retrieval screen on which the content in the selection area that has not been displayed on the screen before enlargement is displayed in a blank generated as the interval is enlarged.

[Appendix 4]

A content retrieval system that includes a content retrieval device that retrieves at least one piece of content from a plurality of pieces of content and a client terminal connected to the content retrieval device through a network, comprising:

a screen output control processor that controls output, on a display, of a retrieval screen having a map that includes at least one coordinate axis to which attribute information on the content is allocated and in which the content is placed at a position corresponding to the attribute information;

a command reception processor that receives a selection command for an area in the map through the retrieval screen; and a screen editing processor that performs a screen change of the retrieval screen in accordance with the selection command, wherein the screen editing processor changes a screen before enlargement that is the retrieval screen before the selection command is received to a first-middle screen obtained by deleting the content outside a selection area that is the area selected according to the selection command, changes the first-middle screen to a second-middle screen on which an interval between the plurality of pieces of content in the selection area is enlarge-displayed in a state where a relative positional relationship therebetween is secured on the map, and changes the second-middle screen to a screen after enlargement that is the retrieval screen on which the content in the selection area that has not been displayed on the screen before enlargement is displayed in a blank generated as the interval is enlarged.

The invention includes appropriate combinations of the above-described various embodiments and various modifications. Further, the invention is not limited to the above-described embodiments, and may employ various configurations in a range without departing from the concept of the invention. Further, the invention includes a storage medium on which a program is stored, in addition to the program.

EXPLANATION OF REFERENCES

10: content retrieval system
11: client terminal
12: content retrieval server (content retrieval device)
13: network
14: touch panel display (touch panel)
15: user
20: retrieval screen
20A, 20A-1, 20A-2: screen before enlargement
20B, 20B-1, 20B-2: screen after enlargement
21: image
21N-1, 21N-2: new image
22, 22-1, 22-2, 22-3: first map
23 to 26, 28, 28A, 28B, 96 to 99: coordinate axis
27, 27-2, 27-3, 27A, 27B, 60, 65: second map
30, 30B: storage device
31: memory
32, 32A, 32B: CPU
33: communication section
34: input/output device
35: data bus
40: browser controller
45: operating program
46, 75, 95: content file
47: first map template
48: second map template
50: screen output controller
51: reception section (command reception section)
52: information management section
53: screen editing section
61A to 61F: frame
62A to 62F: title of group
66A to 66D: image placed in direction orthogonal to coordinate axis
70: first map switch button
71, 71A, 71B: second map switch button
80: table
85, 85A, 85B: slide bar
86, 86A, 86B: bar
87, 87A, 87B: slider
90: radio button
100: frame
CL: clothes
SA, SA-1, SA-2, SA-3: selection area
F: user's finger
AR1 to AR7: arrow
BL-1, BL-2: blank
S100 to S250: step

What is claimed is:

1. A content retrieval device that retrieves at least one piece of content from a plurality of pieces of content, comprising:
a processor configured to:
control output, on a display, of a retrieval screen having a map that includes at least one coordinate axis to which attribute information on the content is allocated and in which the content is placed at a position corresponding to the attribute information;
receive a selection command for an area in the map through the retrieval screen, the area being directly designated by a user; and
upon reception of the selection command, change the retrieval screen from a screen before enlargement to a screen after enlargement through a first-middle screen and a second-middle screen in this order,
wherein the screen before enlargement is the retrieval screen before the selection command is received,
wherein the first-middle screen is generated by deleting the content outside a selection area that is the area selected according to the selection command,
wherein, on the second-middle screen, an interval between the plurality of pieces of content in the selection area is enlarge-displayed in a state where a relative positional relationship therebetween is secured on the map,
wherein the screen after enlargement is the retrieval screen on which the content in the selection area that has not been displayed on the screen before enlargement is displayed in a blank area generated as the interval is enlarged,
wherein the processor is configured to receive the selection command a plurality of times, and
wherein the processor is configured to perform a screen change for changing the screen before enlargement to the screen after enlargement through the first-middle screen and the second-middle screen a plurality of times, in accordance with the plurality of times that the selection commands are received.

2. The content retrieval device according to claim 1, wherein the attribute information includes first attribute information based on a sensible evaluation of the content, and
wherein the map includes a first map having the coordinate axis to which the first attribute information is allocated.

3. The content retrieval device according to claim 2, wherein the attribute information includes second attribute information based on an objective evaluation of the content, in addition to the first attribute information.

4. The content retrieval device according to claim 3, wherein the processor is configured to control the display to display a group designation user interface for designating a group in a range where the objective evaluations indicated by the second attribute information are the same on the retrieval screen having the first map, and set display forms of corresponding content that is the content corresponding to the group set by the group designation user interface and non-corresponding content that is the content that does not correspond to the group to be different from each other.

5. The content retrieval device according to claim 4,
wherein the processor is configured to control to display to display the corresponding content at the front in a case where the corresponding content and the non-corresponding content are displayed in an overlapping manner in the first map.

6. The content retrieval device according to claim 4,
wherein the processor is configured to set the non-corresponding content to be in a non-display state in the first map.

7. The content retrieval device according to claim 4,
wherein the processor is configured to control the display to display the group designation user interface on the screen after enlargement displayed after the selection command is received at least one time.

8. The content retrieval device according to claim 3,
wherein the map includes a second map having the coordinate axis to which the second attribute information is allocated, in addition to the first map, and
wherein the processor is configured to selectively perform switching between displays of the first map and the second map on the retrieval screen.

9. The content retrieval device according to claim 8,
wherein the processor is configured to control the display to display a map switching user interface for performing the switching between the displays of the first map and the second map on the retrieval screen, and to display one of the first map and the second map selected by the map switching user interface.

10. The content retrieval device according to claim 9,
wherein the processor is configured to receive the selection command a plurality of times,
wherein the processor is configured to perform a screen change for changing the screen before enlargement to the screen after enlargement through the first-middle screen and the second-middle screen a plurality of times, in accordance with the plurality of times of the selection commands, and
wherein the processor is configured to control the display to display the map switching user interface on the screen after enlargement displayed after the selection command is received at least one time.

11. The content retrieval device according to claim 8,
wherein the processor is configured to control the display to display the map in which the content is placed in a line at a position corresponding to the second attribute information, along the one coordinate axis to which one piece of the second attribute information is allocated, as the second map.

12. The content retrieval device according to claim 8,
wherein the processor is configured to control the display to display the map in which the content is placed in a plurality of lines at positions corresponding to the second attribute information, along the one coordinate axis to which one piece of the second attribute information is allocated, as the second map, and place the content of the group in the range where the objective evaluations indicated by the second attribute information are the same in a direction orthogonal to the coordinate axis.

13. The content retrieval device according to claim 8,
wherein the processor is configured to control the display to display the content in such a display form that the group in the range where the objective evaluations indicated by the second attribute information are the same is distinguishable in the second map.

14. The content retrieval device according to claim 1,
wherein the processor is configured to control the display to display the content to have the same size on the screen before enlargement and the screen after enlargement.

15. The content retrieval device according to claim 1,
wherein the processor is configured to deliver the retrieval screen to a mobile client terminal having the display in accordance with a delivery request from the mobile client terminal.

16. The content retrieval device according to claim 1,
wherein the selection area is designated by the user tracing an edge of the area.

17. A content retrieval device that retrieves at least one piece of content from a plurality of pieces of content, comprising:
a processor configured to:
control output, on a display, of a retrieval screen having a map that includes at least one coordinate axis to which attribute information on the content is allocated and in which the content is placed at a position corresponding to the attribute information;
receive a selection command for an area in the map through the retrieval screen; and
perform a screen change of the retrieval screen in accordance with the selection command,
change the screen before enlargement, that is the retrieval screen before the selection command is received, to a first-middle screen obtained by deleting the content outside a selection area that is the area selected according to the selection command,
change the first-middle screen to a second-middle screen on which an interval between the plurality of pieces of content in the selection area is enlarge-displayed in a state where a relative positional relationship therebetween is secured on the map, and
change the second-middle screen to a screen after enlargement that is the retrieval screen on which the content in the selection area that has not been displayed on the screen before enlargement is displayed in a blank area generated as the interval is enlarged,
wherein the attribute information includes first attribute information based on a sensible evaluation of the content,
wherein the map includes a first map having the coordinate axis to which the first attribute information is allocated,
wherein the attribute information includes second attribute information based on an objective evaluation of the content, in addition to the first attribute information, and
wherein the map includes a second map having the coordinate axis to which the second attribute information is allocated, in addition to the first map, and
wherein the processor is configured to:
selectively perform switching between displays of the first map and the second map on the retrieval screen,
receive the selection command a plurality of times,
perform a screen change for changing the screen before enlargement to the screen after enlargement through the first-middle screen and the second-middle screen a plurality of times, in accordance with the plurality of times of the selection commands, and
control the display to display the first map until the number of times of reception of the selection command reaches a set number of times, and perform switching from the first map to the second map in a case where the number of times of reception reaches the set number of times.

18. An operating method of a content retrieval device that retrieves at least one piece of content from a plurality of pieces of content, comprising:

controlling output, on a display, of a retrieval screen having a map that includes at least one coordinate axis to which attribute information on the content is allocated and in which the content is placed at a position corresponding to the attribute information;

receiving a selection command for an area in the map through the retrieval screen, the area being directly designated by a user; and upon reception of the selection command, performing a screen change of the retrieval screen from a screen before enlargement to a screen after enlargement through a first-middle screen and a second-middle screen in this order, wherein the screen before enlargement is the retrieval screen before the selection command is received, wherein the first-middle screen is generated by deleting the content outside a selection area that is the area selected according to the selection command, wherein, on the second-middle screen, an interval between the plurality of pieces of content in the selection area is enlarge-displayed in a state where a relative positional relationship therebetween is secured on the map, wherein the screen after enlargement is the retrieval screen on which the content in the selection area that has not been displayed on the screen before enlargement is displayed in a blank area generated as the interval is enlarged, wherein the receiving receives the selection command a plurality of times, and wherein the screen change for changing the screen before enlargement to the screen after enlargement through the first-middle screen and the second-middle screen a plurality of times, is performed a plurality of times in accordance with the plurality of times that the selection commands are received.

19. A content retrieval system that includes a content retrieval device that retrieves at least one piece of content from a plurality of pieces of content and a client terminal connected to the content retrieval device through a network, comprising:

a processor configured to:

control output, on a display, of a retrieval screen having a map that includes at least one coordinate axis to which attribute information on the content is allocated and in which the content is placed at a position corresponding to the attribute information;

receive a selection command for an area in the map through the retrieval screen, the area being directly designated by a user; and upon reception of the selection command, a screen change the retrieval screen from a screen before enlargement to a screen after enlargement through a first-middle screen and a second-middle screen in this order, wherein the screen before enlargement is the retrieval screen before the selection command is received, wherein the first-middle screen is generated by deleting the content outside a selection area that is the area selected according to the selection command, wherein, on the second-middle screen, an interval between the plurality of pieces of content in the selection area is enlarge-displayed in a state where a relative positional relationship therebetween is secured on the map, wherein the screen after enlargement is the retrieval screen on which the content in the selection area that has not been displayed on the screen before enlargement is displayed in a blank area generated as the interval is enlarged, wherein the processor is configured to receive the selection command a plurality of times, and wherein the processor is configured to perform a screen change for changing the screen before enlargement to the screen after enlargement through the first-middle screen and the second-middle screen a plurality of times, in accordance with the plurality of times that the selection commands are received.

* * * * *